(12) United States Patent
Ishizuya et al.

(10) Patent No.: US 6,828,557 B2
(45) Date of Patent: Dec. 7, 2004

(54) RADIATION-DETECTION DEVICES

(75) Inventors: Tohru Ishizuya, Tokyo (JP); Junji Suzuki, Hachioji (JP); Keiichi Akagawa, Kamakura (JP)

(73) Assignee: Nikon Corporation, Tokyo (JP)

( * ) Notice: Subject to any disclaimer, the term of this patent is extended or adjusted under 35 U.S.C. 154(b) by 280 days.

(21) Appl. No.: 10/000,179

(22) Filed: Nov. 30, 2001

(65) Prior Publication Data

US 2002/0036265 A1 Mar. 28, 2002

Related U.S. Application Data

(63) Continuation-in-part of application No. 09/809,890, filed on Mar. 16, 2001.

(30) Foreign Application Priority Data

Jun. 8, 2000 (JP) ...................................... 2000-171627
Dec. 1, 2000 (JP) ...................................... 2000-366436

(51) Int. Cl.[7] .............................................. G01J 5/38
(52) U.S. Cl. ............................ 250/338.1; 250/339.01
(58) Field of Search ........................ 250/338.1, 339.01, 250/339.02, 370.01, 370.08, 330, 332, 352, 336.1, 338.4; 338/18, 23

(56) References Cited

U.S. PATENT DOCUMENTS

| | | | |
|---|---|---|---|
| 5,265,470 A | * 11/1993 | Kaiser et al. | ............. 73/178 R |
| 5,623,147 A | 4/1997 | Baert et al. | |
| 5,844,238 A | 12/1998 | Sauer et al. | |
| 5,929,440 A | 7/1999 | Fisher | |
| 5,965,886 A | 10/1999 | Sauer et al. | |
| 6,080,988 A | * 6/2000 | Ishizuya et al. | ......... 250/338.1 |
| 6,133,569 A | * 10/2000 | Shoda et al. | ................. 250/332 |
| 6,288,388 B1 | * 9/2001 | Zhang et al. | ............. 250/214.1 |
| 6,339,219 B1 | * 1/2002 | Ishizuya et al. | ............. 250/330 |
| 6,469,301 B1 | * 10/2002 | Suzuki et al. | ............. 250/338.1 |

FOREIGN PATENT DOCUMENTS

| | | |
|---|---|---|
| JP | 2-196457 | 8/1990 |
| JP | 8-193881 | 7/1996 |
| JP | 2000-326299 | 11/2000 |
| JP | 2001-41823 | 2/2001 |

OTHER PUBLICATIONS

U.S. patent application Ser. No. 09/570,767, Suzuki et al., filed May 12, 2000.

* cited by examiner

*Primary Examiner*—Constantine Hannaher
*Assistant Examiner*—Otilia Gabor
(74) *Attorney, Agent, or Firm*—Klarquist Sparkman, LLP

(57) ABSTRACT

Radiation detectors are disclosed that include at least one element (pixel). In a pixel, a desired positional relationship between two "effecting" elements is maintained regardless of changes in temperature or other prevailing variable. The detectors can be "electrical capacitance" or "optical-readout" types. A pixel of the electrical capacitance type includes two electrodes (reference electrode and response electrode) that face each other and have a set gap therebetween. The electrodes are attached to respective displaceable members (configured as thermal bimorphs) having identical structures. A pixel of the optical readout type includes a half-mirror and a reflector that face each other and have a set gap therebetween. The half-mirror and reflector are attached to respective displaceable members. Radiation is absorbed by a radiation absorber that transfers the heat to certain displaceable members that bend to tilt accordingly. Other displaceable members are not heated and do not bend. The displaceable members are formable simultaneously during respective fabrication steps.

52 Claims, 56 Drawing Sheets

RADIATION-DETECTION DEVICES

CROSS REFERENCE TO RELATED APPLICATION

This application is a continuation-in-part of, and claims the benefit of, co-pending U.S. patent application Ser. No. 09/809,890, filed on Mar. 16, 2001.

FIELD

This disclosure pertains, inter alia, to radiation-detection devices, such as thermal infrared sensors and the like. The sensors can be of several types. One type encompasses so-called electrical-capacitance radiation detectors that convert incident radiation, such as infrared radiation, to a corresponding physical displacement of two opposing electrodes relative to each other and "read out" the displacement as a corresponding change in electrical capacitance. Another type encompasses so-called optical-readout radiation detectors that convert incident radiation, such as infrared radiation, to a corresponding physical displacement and "read out" the displacement as a corresponding change in readout light.

BACKGROUND

Radiation detectors are useful for a wide variety of contemporary applications in various fields of endeavor. Various types of conventional radiation detectors are sensitive to different wavelengths of incident radiation. For example, many conventional radiation detectors are sensitive to infrared (IR) radiation and are useful for surveillance, security, heat sensing, imaging, and other applications.

An exemplary IR-radiation detector is disclosed in U.S. Pat. No. 5,623,147 to Baert et al. This conventional detector is a so-called "electrical capacitance" type of detector. The detector comprises a substrate, a first bimetallic arm, and a second bimetallic arm. One end of each of the first and second bimetallic arms is mounted to the substrate. To the other end of the first bimetallic arm is affixed a first capacitor electrode. The second bimetallic arm is parallel to and structured similarly to the first bimetallic arm. To the other end of the second bimetallic arm is affixed a second capacitor electrode that faces the first electrode. A radiation-absorbing layer is thermally coupled to the first bimetallic arm but not to the second bimetallic arm. Each of the first and second bimetallic arms includes two layers made of respective materials having different coefficients of thermal expansion. Each layer extends in a respective plane that is parallel to the plane of the radiation-absorbing film. The first and second bimetallic arms (and respective electrodes) are separated from each other by an air gap extending in a "stacking direction" (i.e., a direction normal to the substrate and to the radiation-absorbing layer). Hence, when viewed from a direction normal to the plane of the radiation-absorbing layer (and thus normal to the electrodes of the first and second bimetallic arms), the first and second bimetallic arms overlap each other.

Further regarding the Baert et al. detector, whenever infrared radiation from an object is incident to the radiation-absorbing layer, the radiation is absorbed by the radiation-absorbing layer and converted to heat. The first bimetallic arm deforms (exhibits bending) in response to the heat. The second bimetallic arm exhibits substantially no deformation because essentially no heat absorbed by the radiation-absorbing layer is conducted or otherwise transmitted to the second bimetallic arm. Hence, as the first bimetallic arm deforms from absorption of heat, the gap between the first and second electrodes changes (typically becomes smaller). The magnitude of change of the gap is a function of the quantity of incident infrared radiation absorbed by the radiation-absorbing layer. As the gap changes, the electrical capacitance between the first and second electrodes correspondingly changes.

In the Baert et al. detector, since the second electrode is affixed to the second bimetallic arm (which is structured identically to the first bimetallic arm), whenever the first bimetallic arm deforms from a change in ambient temperature, the second bimetallic arm ideally deforms by the same amount. Thus, ideally, the relative positional relationship between the first and second electrodes is unchanged with a change in ambient temperature. Purportedly, with such a configuration, infrared radiation from an object is detected accurately without the electrical capacitance between the first and second electrodes changing or being affected adversely by changes in ambient temperature. Also, especially with control of the substrate temperature being unaffected by changes in ambient temperature, strict temperature control of the overall detector is unnecessary.

However, actual fabrication and operation experience with the Baert et al. detector reveals that the detector is not without significant problems. For example, in the Baert et al. detector, the first and second bimetallic arms are disposed so as to overlap each other when viewed from a normal direction, as noted above. As a result, during manufacture of the detector, one bimetallic arm must be produced displaced above the substrate and the other bimetallic arm must be produced displaced above the first bimetallic arm. Hence, the respective fabrication steps for forming the bimetallic arms must be performed separately, which substantially increases costs.

More importantly, because the first and second bimetallic arms are produced in separate fabrication steps, it is difficult to establish a desired "baseline gap" (existing gap whenever no infrared radiation is incident on the detector) between the first and second electrodes. It also is difficult to impossible to establish a consistent baseline gap from one pixel to another on the same radiation detector. The two film layers that comprise each bimetallic arm are formed extremely thin to decrease their thermal capacity and to increase responsiveness of the bimetallic arms. But, these conditions render the bimetallic arms susceptible to bending upward or downward relative to the substrate in response to residual internal stress in either film. Stress in a film can result from minute changes in film-forming conditions from one fabrication step to another that are extremely difficult to control to a sufficiently strict degree. Furthermore, because the bimetallic arms are produced in separate fabrication steps, the respective initial deformed conditions of the first and second bimetallic arms are different. Again, this difference makes it difficult to establish a desired positional relationship (e.g., gap) of the first and second electrodes. Hence, the desired sensitivity and dynamic range of infrared detection cannot be obtained on a sufficiently consistent basis to be practical.

Furthermore, the electrical capacitance between the first and second electrodes is inversely proportional to the distance between the first and second electrodes. Hence, the capacitance increases with decreasing gap. Also, the capacitance increases with changes in temperature caused by incident infrared radiation. Hence, the narrower the gap, the greater the sensitivity with which infrared radiation can be detected. But, if the electrodes were to touch each other, then any changes that may further increase the capacitance between the electrodes would not occur, thereby restricting the dynamic range.

It is preferable that the gap between the electrodes be as narrow as possible without allowing the electrodes to touch each other. But, due to the difficulty in setting the gap to a desired dimension, as discussed above, the gap usually is made larger than desired or it is accepted that the electrodes are vulnerable to touching each other, thereby decreasing detection sensitivity and undesirably limiting the dynamic range of the detector.

Another difficulty with manufacturing the first and second bimetallic arms in separate fabrication steps, as taught by Baert et al., is the difficulty in sufficiently suppressing changes in electrical capacitance between the electrodes due to changes in ambient temperature. Namely, in fabricating the first and second bimetallic arms by conventional methods, the characteristics of the films (e.g., film thickness) comprising the bimetallic arms cannot be maintained completely identical in both bimetallic arms. Since the characteristics of arm deformation caused by changes in temperature depend upon the film characteristics, the respective deformations of the first and second arms from temperature changes are not identical. This difference causes a corresponding change in capacitance between the electrodes with changes in ambient temperature. The capacitance change, unfortunately, can be relatively large, which renders the conventional device impractical for many uses.

Another exemplary type of IR-radiation detector is disclosed in U.S. Pat. No. 6,080,988 to Ishizuya et al. This detector is a so-called "optical readout" type of detector. The detector comprises a substrate, a first displaceable member supported by the substrate, and a second displaceable member supported by the substrate. A readout-light half-mirror is fixed with respect to the first displaceable member, and a readout-light reflector fixed with respect to the second displaceable member. A radiation absorber, that absorbs radiation such as IR radiation, is thermally connected to the first displaceable member but substantially not thermally connected to the second displaceable member.

Each of the first and second displaceable members comprises two layers of respective materials having different coefficients of thermal expansion, in the manner of a bimetallic structure. The direction of superposition of the two layers is normal to the substrate. The first and second displaceable members are disposed parallel to each other, but spaced apart from each other in the normal direction, so as to be superposed with each other when viewed in the normal direction. The first and second displaceable members have the same configuration, for example, so that the difference in the coefficients of thermal expansion of the upper and lower layers of the first displaceable member is the same as the difference in the coefficients of thermal expansion of the upper and lower layers of the second displaceable member.

The readout-light half-mirror and the readout-light reflector are disposed so as to face each other. They are configured to receive the readout light (e.g., visible light), impart a change to the received light, and produce an emitted readout light having an interference characteristic corresponding to the relative displacement between the readout-light half-mirror and the readout-light reflector.

Whenever IR radiation or the like from an object is incident on the radiation absorber, the rays of incident radiation are absorbed by the radiation absorber and converted into heat. The heat is conducted to the first displaceable member, which exhibits a bending response. The heat is substantially not transmitted to the second displaceable member. As a result, the second displaceable member does not bend, and the distance between the readout-light half-mirror and the readout-light reflector varies as a function of the amount of incident radiation. Accordingly, the radiation from the object can be detected as the intensity of interference light returning from the readout-light half-mirror and the readout-light reflector that were irradiated with readout light.

With this conventional optical-readout type of radiation detector, as with the conventional electrical capacitance type of radiation detector summarized above, the first and second displaceable members are disposed such that they exactly superpose each other when viewed in the normal direction. As a result, the same problems encountered during manufacture of the conventional electrical capacitance type of radiation detector are also encountered during manufacture of the conventional optical-readout type of radiation detector. More specifically, the first and second displaceable members are produced in separate manufacturing steps, which makes it difficult to set a proper and consistent gap ("initial gap") between the readout-light half-mirror and the readout-light reflector whenever no radiation is incident.

In other words, because this conventional optical-readout radiation detector relies on the principle of interference of readout light, a change in interference intensity of readout light varies periodically as a sinusoidal waveform with changes in the gap between the readout-light half-mirror and the readout-light reflector. Consequently, the radiation-detection characteristics of the detector, such as the change in interference intensity of the readout light (i.e., sensitivity of radiation detection), vary depending upon the initial gap. This variation arises regardless of whether the incident radiation increases or decreases steadily or reverses at some point, or whether the interference intensity of the readout light increases or decreases with respect to an increase in the amount of incident radiation. Hence, desired radiation-detection performance cannot be obtained with this detector because of the difficulty in setting the initial gap to a desired value.

Also, because the first and second displaceable members are produced in separate manufacturing steps, it is very difficult in actual practice to adequately suppress changes in the gap caused by changes in ambient temperature.

SUMMARY

In view of the shortcomings of the prior art as summarized above, this invention provides, inter alia, radiation detectors including one or more pixels, in which a pixel includes first and second "effecting elements" between which a gap can be set to a desired distance consistently from one pixel to the next. The subject detectors provide desired sensitivity characteristics and a desired dynamic range in radiation detection. The subject radiation detectors also exhibit superior suppression of changes in the "effecting parameter" between the effecting elements due to changes in ambient temperature, thereby providing improved detection accuracy than conventional detectors.

According to a first aspect of the invention, radiation detectors are provided that achieve the objects noted above. Such a radiation detector includes a substrate on which at least one "unit pixel" (detection unit) is formed. An embodiment of such a radiation detector comprises first and second displaceable members attached to the substrate. The displaceable members have similar respective thermally bimorphous structures. A first "effecting element" is attached to the first displaceable member, and a second "effecting element" is attached to the second displaceable member such that at least a portion of the second effecting element faces the first effecting element.

One exemplary "effecting element" is an electrode or analogous component that can be used to impart a change to a measurable electrical parameter. For example, a change in distance between two electrodes yields a change in electrical capacitance that can be measured. Another exemplary effecting element is an optical component such as a reflector or analogous component that can be used to impart a change to a measurable optical parameter. For example, the first and second effecting elements can be reflectors of a "readout light," wherein a change in distance between the two reflectors yields a change in optical interference of readout light that can be measured. In the foregoing examples, the electrical capacitance and optical interference are respective exemplary "effecting parameters."

In this embodiment, the radiation detector includes a radiation absorber configured to absorb incident radiation (e.g., IR radiation, ultraviolet radiation, visible radiation, X-rays) to be detected. The radiation absorber is thermally coupled to the first displaceable member but substantially not to the second displaceable member. As a result, the radiation absorber, when heated by absorption of incident radiation, transfers heat to the first displaceable member but substantially not to the second displaceable member. Each of the first and second displaceable members includes at least a first and a second layer laminated together in a "stacking direction" (normal to the substrate) to form the respective thermally bimorphous structure. The first and second layers are formed of respective first and second materials having different respective coefficients of thermal expansion so as to cause the respective displaceable member to exhibit a bending response when heated. The bending response occurring in one displaceable member (typically the first displaceable member thermally coupled to the radiation absorber) but substantially not in the other results in a corresponding change in a gap distance between the first and second effecting elements. (The amount of bending exhibited by the displaceable member exhibiting "substantially" no bending response does not, within an acceptable tolerance, alter the apparent quantity of radiation corresponding to the bending exhibited by the displaceable member coupled to the radiation absorber.)

The first and second effecting elements are configured to allow measurement of the effecting parameter, which exhibits a change with a corresponding change in the gap distance. In addition, the first and second displaceable members are disposed so as not to overlap each other when viewed in the stacking direction.

As noted above, the first and second effecting elements can be first and second electrodes, wherein the first and second electrodes can be configured to allow an electrical capacitance to be measured between them. Alternatively, for example, the first and second effecting elements can be a reflector and half-mirror, respectively, of a readout light.

The first and second displaceable members desirably are situated relative to each other such that the first and second layers of each are formable simultaneously during respective fabrication steps. Further desirably, the second displaceable member is substantially parallel to the first displaceable member.

In radiation detectors in which the effecting parameter is electrical capacitance, a first electrode is attached to the first displaceable member, and a second electrode is attached to the second displaceable member such that at least a portion of the second electrode faces the first electrode. The radiation absorber, when heated by absorption of incident radiation, transfers heat to the first displaceable member but substantially not to the second displaceable member. The resulting bending response in the first displaceable member but substantially not in the second displaceable member results in a change in a gap distance between the first and second electrodes. The change in gap produces a corresponding change in an electrical parameter (e.g., capacitance) of the first and second electrodes. The first and second displaceable members are disposed so as not to overlap each other when viewed in the stacking direction.

In radiation detectors in which the effecting parameter is an optical parameter, a particularly advantageous parameter is optical interference of a readout light, wherein a particular change in interference corresponds to a respective amount of absorbed radiation. A first optically effecting element is attached to the first displaceable member, and a second optically effecting element is attached to the second displaceable member. The first and second optically effecting elements receive readout light, impart a change to the readout light corresponding to the relative displacement between the first and second optically effecting elements, and emit the changed readout light.

The first and second displaceable members desirably are situated relative to each other such that the first and second layers of each of the first and second displaceable members are formable simultaneously during respective steps. As a result, the first and second displaceable members are situated such that they do not overlap each other when viewed from the stacking direction. (As noted above, the "stacking direction" is normal to the substrate. The "stacking" referred to is the stacking or lamination of the first and second layers of the displaceable members. Hence, the stacking direction is the direction in which the second layer is formed relative to the first layer.) "Formable simultaneously" as used above means that, for example, the first (also termed "lower") layer of both displaceable members is formed during a single fabrication step. Similarly, the second (also termed "upper") layer of both displaceable members is formed during a different, but nevertheless single, fabrication step.

By fabricating the first and second displaceable members in the manner summarized above, even if the first and second displaceable members should exhibit an initial warp due to stress in one or both the first and second layers, the degree of warp of both displaceable members is substantially identical. Consequently, the "baseline" gap distance between the first and second effecting elements is unchanged by the initial warp. (A "baseline" gap distance is the distance between the first and second effecting elements whenever the subject pixel is not receiving any significant amount of incident radiation to be measured.) Desirably, the first and second displaceable members are situated close to each other, such as laterally adjacent each other (and hence parallel to each other) on the substrate so as to reduce further any relative displacements of the first and second displaceable members due to stress arising at one location during layer formation but not at another location.

Another advantage in forming the first and second layers during the same respective fabrication steps is that any differences in layer characteristics (e.g., layer thickness) of the first and second displaceable members are reduced to insignificant levels. Consequently, differences in bending characteristics of the first and second displaceable members due to temperature changes are considerably reduced compared to conventional radiation detectors. Hence, even if the substrate temperature is not controlled strictly during use of the radiation detector, changes in the effecting parameter between the first and second effecting elements due to changes in ambient temperature are reduced appreciably, compared to conventional radiation detectors. As a result, incident radiation is detected with greater accuracy than obtainable using a conventional radiation detector. Again, the first and second displaceable members desirably are situated adjacent each other to avoid stress differences from one location to another on the substrate.

When using a radiation detector according to the invention, the effects of changes in ambient temperature can be eliminated by placing the radiation detector in a vacuum chamber or by strictly controlling substrate temperature during use of the detector. Even under such conditions, the second displaceable member continues to preserve the gap distance between the first and second electrodes whenever no radiation to be measured is incident to the radiation absorber.

The radiation detector of this embodiment further can comprise a radiation reflector. In such a configuration, the radiation absorber reflects a portion of radiation incident to it. In general, the radiation reflector desirably is situated relative to the radiation absorber so as to define a gap of substantially $n\lambda_0/4$ between the radiation absorber and the radiation reflector. In this expression, n is an odd integer and $\lambda_0$ is the center (median) wavelength of a wavelength band of radiation detectable by the radiation detector. Hence, for example, whenever radiation is incident to the radiation absorber from an opposite side of the radiation reflector, part of the incident radiation is absorbed by the radiation absorber, while the remainder is reflected by the radiation reflector. The latter reflected radiation is reflected back and forth in the gap between the radiation absorber and the radiation reflector to produce interference. Since the gap is roughly an odd-integer multiple of one-fourth of the central (median) wavelength of the desired wavelength band of incident radiation, radiation absorption by the radiation absorber is maximized according to the "optical cavity" principle. This increases the efficiency of radiation absorption and detection even with reduction in the thickness and/or thermal capacity of the radiation absorber.

By way of example, the percentage of incident radiation reflected from the radiation absorber is approximately 33% (approximately ⅓), to increase further the percentage of radiation absorbed at the radiation absorber.

In embodiments comprising first and second electrodes that operate on the principle of electrical capacitance, the radiation reflector desirably is one of the first and second electrodes. With such a configuration, the radiation absorber is situated in the stacking direction relative to the first and second electrodes. In addition to simplifying the overall structure of the radiation detector, disposing the radiation absorber in the stacking direction increases the respective surface areas of the radiation absorber and/or of the electrodes, thereby improving detector sensitivity. The first and second electrodes and the radiation absorber can be aligned with each other and arranged in the stacking direction in an order of: (a) radiation absorber, first electrode, then second electrode, or (b) radiation absorber, second electrode, then first electrode. In either of these configurations, the first displaceable member, when heated, exhibits a bending response that that displaces the second electrode away from the first electrode. The bending response also can be characterized by a so-called "knee characteristic," in which sensitivity of the detector at room temperature to incident radiation is relatively high while sensitivity at higher temperatures is relatively low. In addition, by situating the first electrode between (in the stacking direction) the radiation absorber and the second electrode, even though the radiation absorber is thermally coupled (and consequently also mechanically coupled) to the first electrode, circumstances can be avoided in which the bending range of the first displaceable member is restricted by the radiation absorber touching the second electrode, or similar conditions. This allows the dynamic range of detection to be enlarged appreciably over conventional radiation detectors.

The first effecting element desirably comprises a planar portion (desirably parallel to the substrate) and a side portion extending at least partially around the periphery of the planar portion. Similarly, the second effecting element comprises a planar portion and a side portion that extends at least partially around the periphery of the planar portion. By configuring both effecting elements with respective planar portions and side portions, the effecting elements are reinforced structurally by the side portions. This allows the thickness of each effecting element to be reduced, with concomitant reductions in the respective thermal capacities of the effecting elements, without compromising strength. The respective side portions can be configured to extend away from each other, thereby preventing the side portions from interfering with each another during instances in which the gap between the first and second effecting elements is narrowed. This, in turn, allows the gap between the first and second effecting elements to be made narrower, with accompanying increases in detector sensitivity compared to conventional detectors.

One of the first and second effecting elements can be affixed via a support frame to the respective first or second displaceable member. The support frame desirably is made of a thermally insulative material and comprises a planar portion and a side portion extending from the planar portion along at least a portion of the periphery of the planar portion. The side portion serves to strengthen the planar portion of the support frame in a manner as described above with respect to the first and second effecting elements.

Radiation-detector embodiments comprising first and second electrodes can further comprise an electrically insulative film situated "between" the first electrode and the second electrode. E.g., the insulative film can be situated on one or the other of the electrodes. The insulative film serves to prevent electrical shorts between the first and second electrodes even whenever the gap between the electrodes is reduced to zero. The total surface area of the insulative film desirably is low relative to the area of either of the electrodes to avoid significant alteration of the thermal capacity of the respective electrode. Hence, the insulating film can be configured as small regions ("spots") provided at multiple disparate locations.

The radiation detector further can comprise first and second legs, wherein the first displaceable member is mounted to the substrate via the first leg, and the second displaceable member is mounted to the substrate via the second leg. As described in detail herein, each leg has a respective length direction, a start point, and an end point. With respect to the first leg, the distance along the respective length direction from the respective start point to the respective end point can be substantially equal to, with respect to the second leg, the distance along the respective length direction from the respective start point to the respective end point. By configuring these distances to be equal, the elevations and angles (relative to the substrate) of the respective end points of the first and second legs (and consequently, the respective start points of the first and second displaceable members) can be kept equal, even whenever the first and second legs are initially warped from stress generated during fabrication.

In this configuration, the end point of the first leg can be located in the first displaceable member, and the end point of the second leg can be located in the second displaceable member. The "start point of a displaceable member" means an edge point on the substrate side of the respective displaceable member, or alternatively an edge point on the effecting-element side of the respective displaceable member. The lengths desirably are equal because, in such a configuration, the angles at the end points of the first and second displaceable members, relative to the substrate, are equal in an initial state of the detector in which there is no radiation incident on the detector.

Alternatively, with respect to the second leg, the distance along the respective length direction from the respective start point to the respective end point can be shorter than, with respect to the first leg, a distance along the respective length direction from the respective start point to the respective end point. This modification includes configurations in which the second leg has zero length, along the length direction, between the start point and the end point. These configurations are especially effective in instances in which the first and second legs are not warped, wherein the respective elevations (above the substrate) and angles at the respective end points of the first and second legs (and, consequently, the start points of the first and second displaceable members) are equal. By reducing the length of the second leg, even to zero length, the area normally occupied by the second leg is eliminated.

In yet another alternative configuration, the start point of the first displaceable member and the start point of the second displaceable member have substantially identical positions when viewed from the width direction of the first and second displaceable members. In such a configuration, the heights of the first and second displaceable members, relative to the substrate, are equal in an initial state of the detector in which no radiation is incident on the detector. This can be advantageous because the relative positional relationship between the first and second effecting elements is virtually unchanged with changes in ambient temperature.

In yet another alternative configuration, the start point of the first displaceable member and the start point of the second displaceable member are shifted relative to each other to form a gap between the first and second displaceable members. The gap is narrowed when viewed from the width direction of the first and second displaceable members. With such a configuration, the gap distance between the first and second effecting elements can be made very narrow, which serves to increase the detection sensitivity of the radiation detector.

The radiation detector can be configured such that the first and second legs, the first and second displaceable members, the first and second effecting elements, and the radiation absorber are disposed in the stacking direction with respective intervening spaces therebetween. With such a configuration, the respective surface areas of the radiation absorber and/or both effecting elements inside any given area can be increased, thereby improving detection sensitivity. However, the overall structure does not exhibit substantial horizontal "spread," which allows an increase in fill factor without sacrificing strength.

Any of the radiation detectors according to the invention can include one or multiple unit pixels. In detectors comprising multiple unit pixels, the unit pixels may be arranged one- or two-dimensionally. Detectors comprising only one pixel can be used to detect the presence or absence of radiation. Detectors comprising multiple pixels (especially arranged in two dimensions) can be used to detect images.

In embodiments including first and second optically effecting elements wherein one of the optically effecting elements is a readout-light reflector, the other optically effecting element can be a half-mirror that faces the reflector. The "half-mirror" is an element that reflects only part of the readout-light radiation incident to it. In this configuration, the reflector and half-mirror reflect the received readout light and produce therefrom an interference light. Alternatively, both the first and second optically effecting elements can be respective reflectors, wherein the reflectors collectively constitute a reflection-type diffraction grating for reflecting the received readout light as diffracted light.

According to another aspect of the invention, methods are provided for fabricating, on a substrate, a radiation detector including at least one unit pixel. In an embodiment of such a method, a first layer-forming step comprises forming a first layer, of a first material having a respective coefficient of thermal expansion, of each of first and second displaceable members. In a second layer-forming step, a second layer, of a second material having a respective coefficient of thermal expansion that is different from the coefficient of thermal expansion of the first material, is formed of each of the first and second displaceable members to form respective thermally bimorphous structures in which the respective first and second layers are laminated together. A first effecting element is formed, attached to the first displaceable member. A second effecting element also is formed, attached to the second displaceable member such that at least respective portions of the first and second effecting elements face each other in a stacking direction with a space therebetween. Also, the effecting elements are formed such that an effecting parameter associated therewith can be measured (e.g., electrical capacitance or interference of received readout light). A radiation absorber is formed in a manner and location such that the radiation absorber is thermally coupled to the first displaceable member but not to the second displaceable member. The radiation absorber is formed of a material that absorbs incident radiation that causes heating of the radiation absorber with resultant conduction of the heat to the first displaceable member.

The first and second effecting elements and the radiation absorber can be formed in any of various orders of steps. One example order is, from the substrate in a stacking direction, first effecting element, second effecting element, then radiation absorber. Another example order is, from the substrate in a stacking direction, second effecting element, first effecting element, then radiation absorber. Yet another example order is, from the substrate in a stacking direction, radiation absorber, first effecting element, then second effecting element. Yet another example order is, from the substrate in a stacking direction, radiation absorber, second effecting element, then first effecting element.

The foregoing and additional features and advantages of the invention will be more readily apparent from the following detailed discussion, which proceeds with reference to the accompanying drawings.

DETAILED DESCRIPTION

This invention is described below in the context of representative embodiments that are not intended to be limiting in any way. Also, the invention is described in the context of the incident radiation being infrared radiation. However, it will be understood that the incident radiation alternatively can have any of various wavelengths, other than infrared, (e.g., visible, ultraviolet, X-ray) capable of causing heating of a radiation-absorbing material on which the radiation is incident.

First Representative Embodiment

Figure 1:
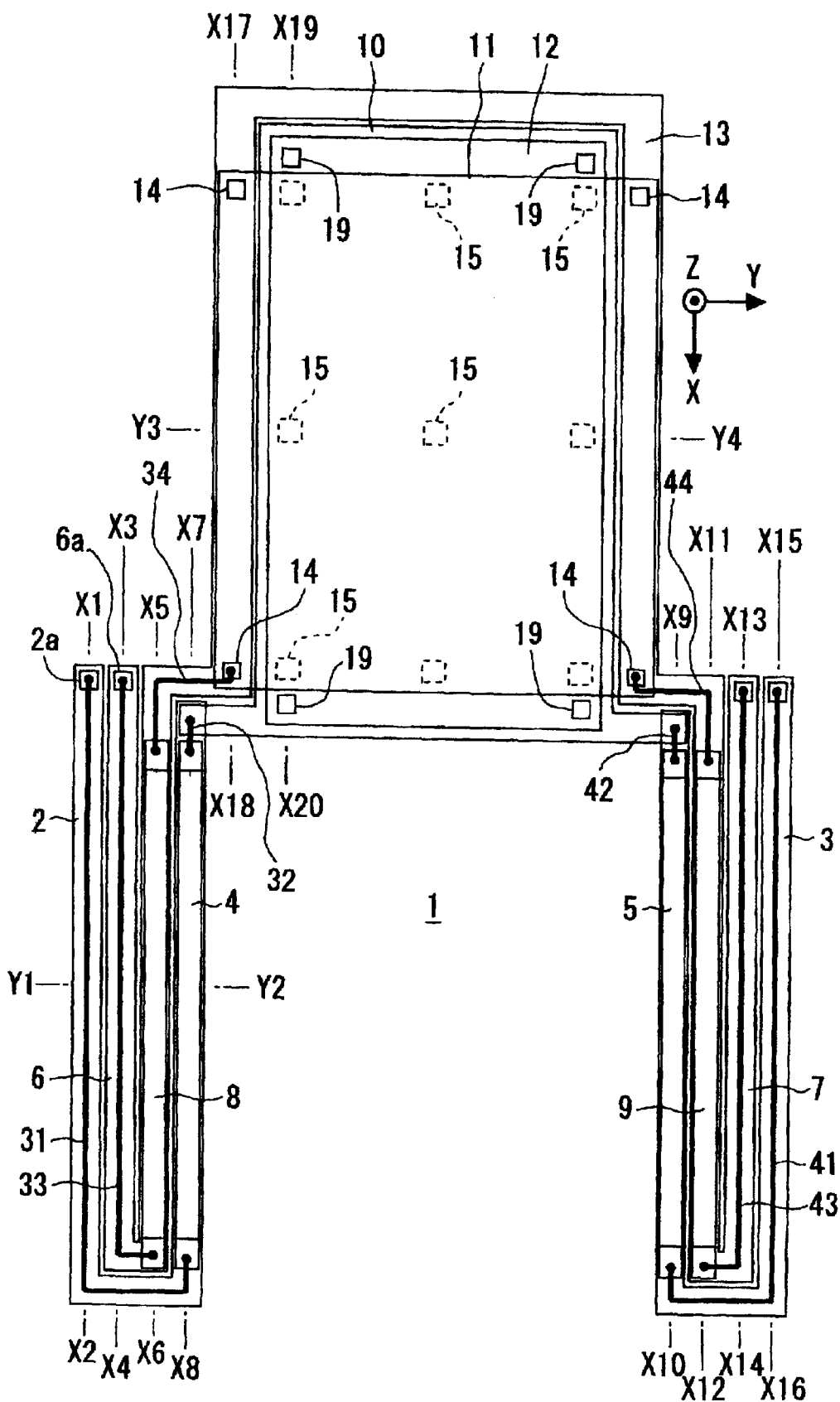
FIG. 1 is a schematic plan view of a unit pixel of a first representative embodiment of a radiation detector according to the invention.

FIG. 1 is a schematic plan view drawing showing a unit "pixel" (unit element) of a radiation detector according to this embodiment. To aid the discussion, in FIG. 1, hidden lines that otherwise would be indicated as broken lines are shown as solid lines, and lines denoting a difference in "height" (elevation from the plane of the page) have been omitted. The mutually orthogonal X-axis, Y-axis, and Z-axis referred to below are as indicated in FIG. 1.

Figure 2:
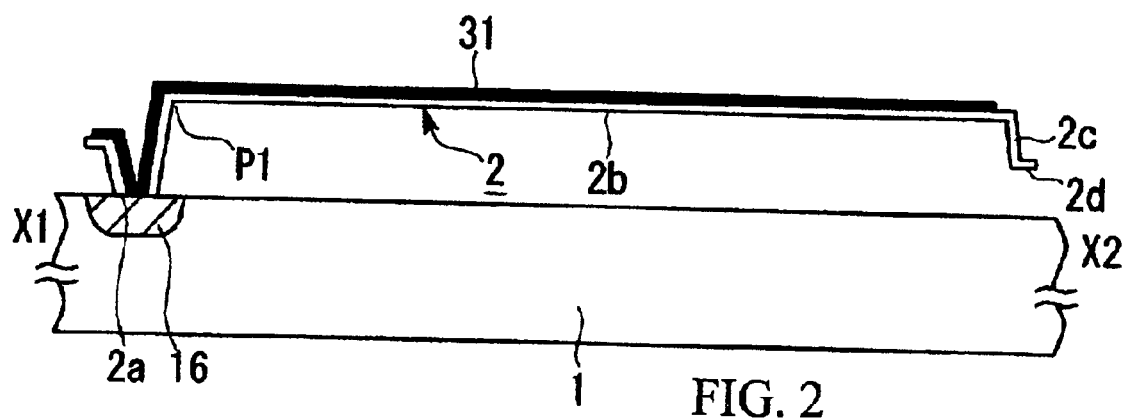
FIG. 2 is a schematic elevational section along the line X1–X2 in FIG. 1.
Figure 3:
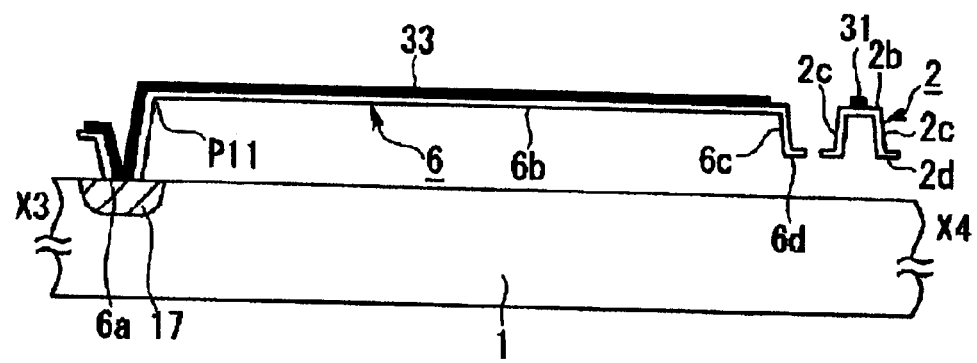
FIG. 3 is a schematic elevational section along the line X3–X4 in FIG. 1.
Figure 4:
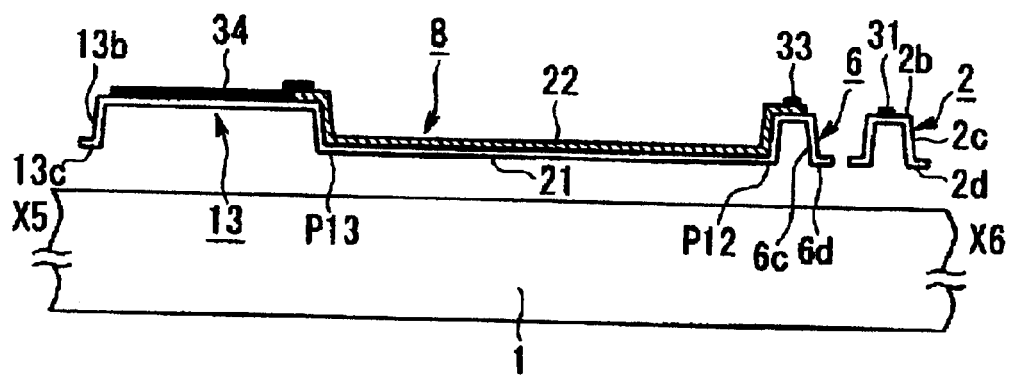
FIG. 4 is a schematic elevational section along the line X5–X6 in FIG. 1.
Figure 5:
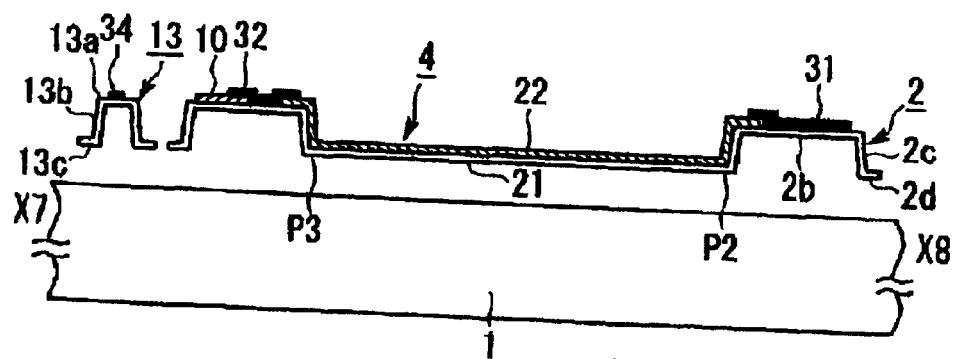
FIG. 5 is a schematic elevational section along the line X7–X8 in FIG. 1.
Figure 6:
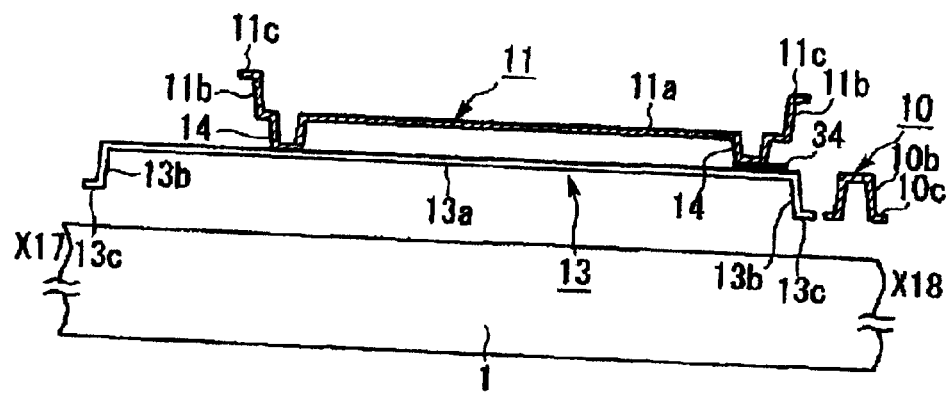
FIG. 6 is a schematic elevational section along the line X17–X18 in FIG. 1.
Figure 7:
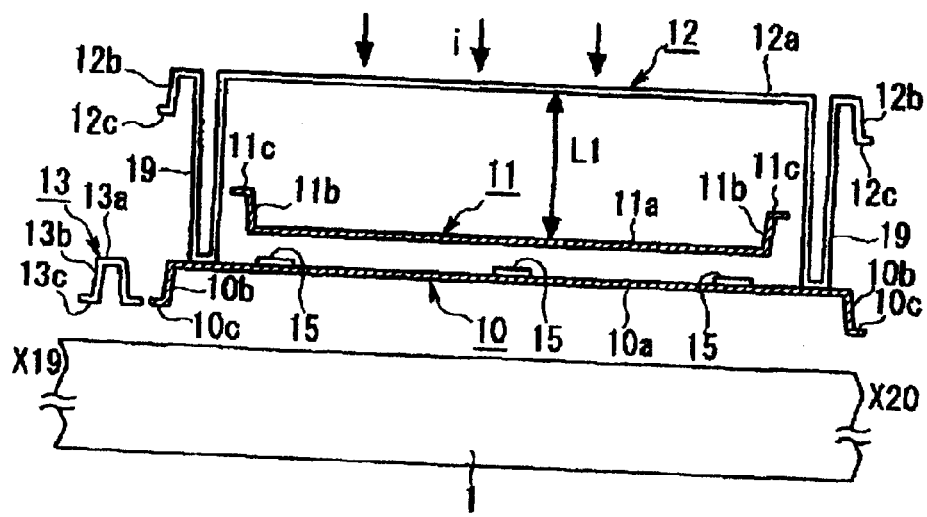
FIG. 7 is a schematic elevational section along the line X19–X20 in FIG. 1.
Figure 8:
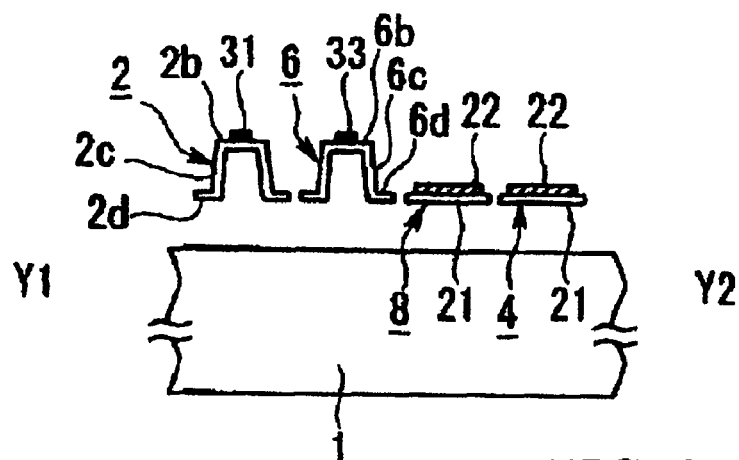
FIG. 8 is a schematic elevational section along the line Y1–Y2 in FIG. 1.
Figure 9:
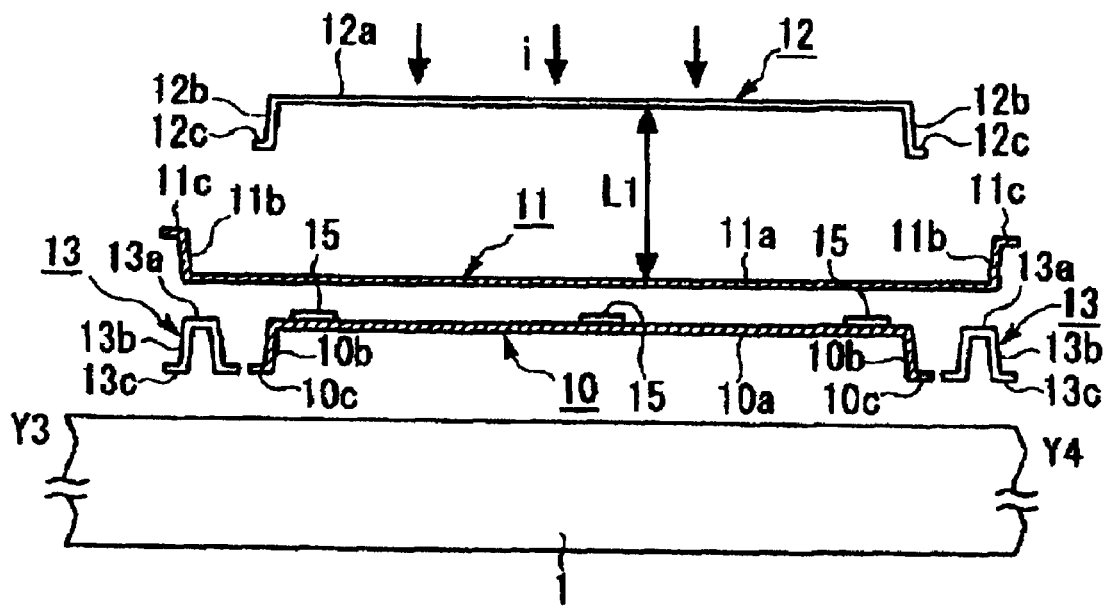
FIG. 9 is a schematic elevational section along the line Y3–Y4 in FIG. 1.

FIG. 2 is a schematic elevational section along the line X1–X2 line in FIG. 1. FIG. 3 is a schematic elevational section along the line X3–X4 in FIG. 1. FIG. 4 is a schematic elevational section along the line X5–X6 in FIG. 1. FIG. 5 is a schematic elevational section along the line X7–X8 in FIG. 1. FIG. 6 is a schematic elevational section along the line X17–X18 in FIG. 1. FIG. 7 is a schematic elevational section along the line X19–X20 in FIG. 1. FIG. 8 is a schematic elevational section along the line Y1–Y2 in FIG. 1. FIG. 9 is a schematic elevational section along the line Y3–Y4 in FIG. 1. Although not illustrated in these figures, and with respect to FIG. 1, a schematic elevational section along the line X9–X10 would be similar to FIG. 5, a schematic elevational section along the line X11–X12 would be similar to FIG. 4, a schematic elevational section along the line X13–X14 would be similar to FIG. 3, and a schematic elevational section along the line X15–X16 would be similar to FIG. 2.

Figure 10:
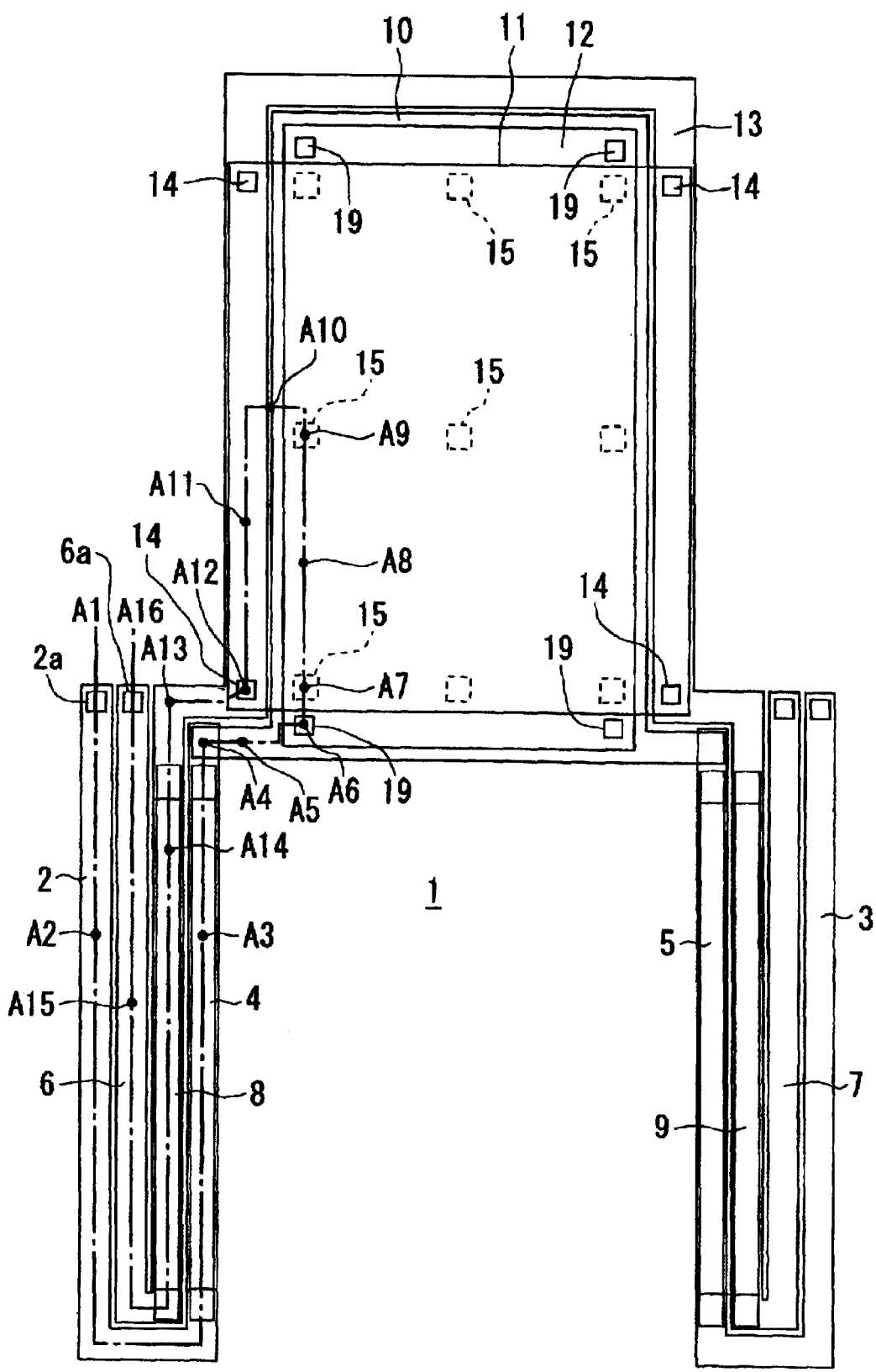
FIG. 10 is a schematic plan view of a unit pixel, of the first representative embodiment, corresponding to FIG. 1 but with additional sectional lines and points indicated.
Figure 11:
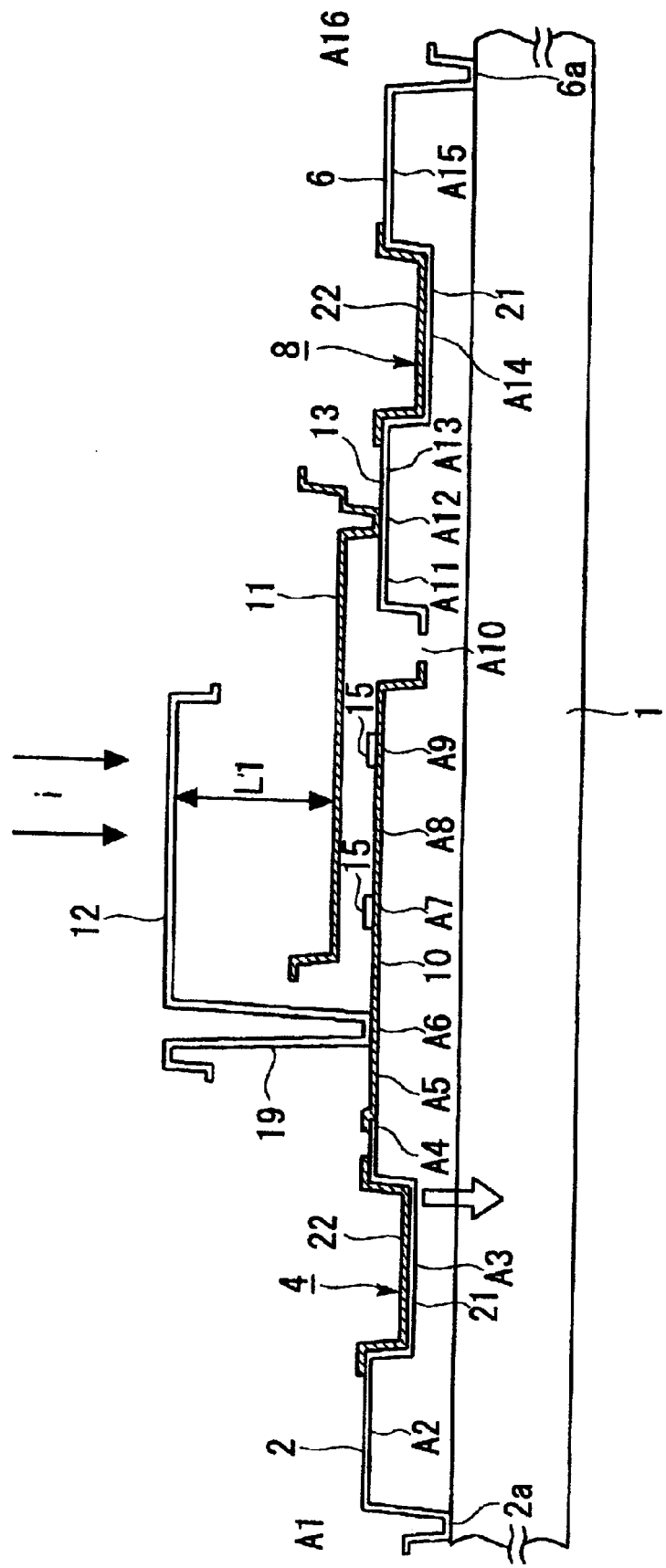
FIG. 11 is a schematic elevational section along the line A1–A16 in FIG. 10.

FIG. 10 is a schematic plan view that is identical to FIG. 1, except that the wiring layers 31–34 and 41–44 are omitted, and points A2–A15 have been added to denote respective points along a convoluted elevational section A1–A16 as shown in FIG. 11. In FIG. 11, the wiring layers 31–34 and 41–44 also have been omitted, and the points A2–A15 in FIG. 11 indicate the same points as respectively shown in FIG. 10.

The radiation detector of this embodiment comprises a substrate 1. The substrate is understood to be a substantially planar body presenting a major surface extending parallel with the X-Y plane, upon which various layers comprising the structure of the radiation detector are formed during respective fabrication steps. The substrate 1 typically is made of silicon (Si) or other suitable material that desirably is transmissive to infrared (IR) radiation. In the depicted pixel (FIG. 1), two legs 2, 3 extend upward (in the Z-axis direction) and extend substantially parallel to (mainly in the X-axis direction) the substrate 1. The legs 2, 3 support respective displaceable members 4, 5 that are supported on the substrate 1 by the legs 2, 3, respectively. Also extending upward from and substantially parallel to the substrate are two legs 6, 7 that support respective displaceable members 8, 9. A first electrode (hereinafter termed a "response electrode") 10 is affixed to the first displaceable members 4, 5, and a second electrode (hereinafter termed the "reference electrode") 11 is affixed to the second displaceable members 8, 9. At least a portion of the reference electrode 11 faces the response electrode 10 and is separated (in the Z-direction) from the response electrode 10 by a defined gap. A radiation absorber 12 (that absorbs incident radiation i) is thermally coupled to the first displaceable members 4, 5, but not to the second displaceable members 8, 9. As can be ascertained, the radiation i is incident on the detector without first passing through the substrate 1 (FIGS. 7 and 9).

The depicted pixel in FIG. 1 indicates that each constituent pixel in the radiation detector of this embodiment is bilaterally symmetrical. Hence, the legs 3, 7 and respective displaceable members 5, 9 correspond to the legs 2, 6 and displaceable members 4, 8, respectively. In view of these similarities, description of the legs 3, 7 and of the respective displaceable members 5, 9 is omitted in the discussion below. However, it will be understood that discussion below pertaining to the legs 2, 6 and displaceable members 4,8 also is applicable to the legs 3,7 and displaceable members 4, 8, respectively.

In this embodiment, two sets (each consisting of two respective legs and two respective displaceable members) are provided to confer mechanical stability to the pixel structure. More generally, the radiation detector can comprise one or more sets of legs per pixel.

The legs 2, 6 are constructed of a highly adiabatic (thermally insulative) material (e.g., SiN). Desirably, each leg 2, 6 is constructed of the same material and has the same width (in the Y-direction) and thickness (in the Z-direction). The legs 2, 6 are attached to the substrate 1 by respective contact points 2a, 6a. Thus attached to the substrate, the legs 2, 6 have respective planar portions 2b, 6b that extend substantially parallel to the substrate 1. The planar portions 2b, 6b have respective L-shaped configurations in which the respective long portion extends primarily in the X-axis direction. Extending from the planar portions 2b, 6b toward the substrate 1 are respective "vertical" side portions 2c, 6c (FIGS. 2–5 and 8). The side portions 2c, 6c can be edged with respective "horizontal" edge portions 2d, 6d that extend outward from the respective side portion 2c, 6c parallel to the substrate. In an alternative configuration, the edge portions 2d, 6d are deleted.

Since the planar portions 2b, 6b are reinforced structurally by the side portions 2c, 6c, the layers constituting the planar portions 2b, 6b can be made thinner than conventionally, while still providing substantial mechanical strength to the planar portions 2b, 6b. Consequently, deformation of the legs 2, 6 due to insufficient mechanical strength is prevented, and the heat-insulating properties of the legs 2, 6 are increased compared to conventional devices. Since the heat-insulating properties of the leg 2 (and leg 3) are increased, displacement of the displaceable member 4 (and displaceable member 5) accurately corresponds to the amount of incident radiation that is absorbed. This allows the signal-to-noise (S/N) ratio of radiation detection using this embodiment to be increased compared to conventional radiation detectors.

As shown in FIGS. 4 and 5, each of the displaceable members 4, 8 is constructed of two films 21, 22 layered superposedly in the Z-axis direction (the "vertical" direction in the figure). As discussed later below, the films 21 and 22 of each displaceable member 4, 8 are formed simultaneously during respective fabrication steps to ensure that each film 21, 22 of the radiation detector is formed under identical respective conditions. One end of each displaceable member 4, 8 is connected to and supported by a respective leg 2, 6 to form a respective cantilevered structure (see especially FIG. 5) in which the respective displaceable member 4, 8 is "horizontally" suspended (i.e., "floating") above the substrate 1. The displaceable members 4, 8 extend parallel to each other longitudinally along the X-axis. Thus, in this embodiment, the displaceable members 4, 8 are not arranged superposedly relative to each other when viewed from a Z-axis direction, but rather are disposed side-by-side, as shown in FIG. 1.

The films 21, 22 are constructed of different materials with mutually different coefficients of thermal expansion. Hence, the displaceable members 4, 8 effectively comprise respective so-called "thermally bimorphous" structures (also termed "bimetallic" elements). Whenever the coefficient of thermal expansion of the "lower" film 21 is lower than the coefficient of thermal expansion of the "upper" film 22, heating a displaceable member 4, 8 causes the respective displaceable member to bend or deflect "downward" (toward the substrate 1). Conversely, whenever the coefficient of thermal expansion of the lower film 21 is greater than the coefficient of thermal expansion of the upper film 22, heating a displaceable member 4, 8 causes the respective displaceable member to bend or deflect "upward" (away from the substrate). The degree of bending is a function of the amount of heating experienced by the respective displaceable member.

By way of example, in this embodiment, the lower film 21 is SiN and the upper film 22 is Al (the thermal expansion coefficient of Al is greater than the thermal expansion coefficient of SiN). The films 21, 22 constituting the displaceable member 4 are identical to respective films 21, 22 constituting the displaceable member 5. This identity extends not only to respective materials of which the films are made but also to respective widths, lengths, and thicknesses of the films.

In this embodiment, the SiN lower film 21 of the displaceable member 4 is formed as an extension of the SiN film used to form the leg 2. Similarly, the SiN lower film 21 of the displaceable member 8 is formed as an extension of the SiN film used to form the leg 6.

The response electrode 10 is configured as a metal (desirably aluminum) layer that is suspended above the substrate 1. To such end, the response electrode 10 is attached at respective locations to free ends of the displaceable members 4 and 5 (these "free" ends are opposite respective ends that are connected to the legs 2 and 3). As shown in FIG. 1, to facilitate such attachment of the response electrode 10, the aluminum (Al) layer comprising the response electrode 10 has two opposing ears that overlap the respective free ends of the displaceable members 4, 5. This overlap is achieved at the time the Al layer of the response electrode 10 is formed, wherein the ears of the response electrode are layered over the SiN free ends of the displaceable members 4, 5 (see also FIGS. 5 and 6).

Referring to FIG. 7, the response electrode 10 comprises a planar portion 10a that extends roughly parallel with the substrate 1 and a "vertical" side portion 10b that extends around nearly the entire periphery of the planar portion 10a. The side portion 10b extends toward the substrate 1. The response electrode 10 also can include an edge portion 10c extending outward, parallel to the substrate 1, from the "lower" edge of the side portion 10b. The edge portion 10c is optional and may be omitted. The side portion 10b serves to reinforce the planar portion 10a structurally, allowing the planar portion 10a to be made thinner than conventionally without sacrificing the strength of the response electrode 10.

The reference electrode 11 is situated so as to face the "upper" surface of the response electrode 10 with a gap between the electrodes 10, 11. The reference electrode 11 is attached at respective locations to free ends of the displaceable members 8, 9 (these free ends are opposite respective ends of the displaceable members that are connected to the legs 6, 7 respectively). More specifically, the reference electrode 11 is attached to a support frame 13 that, in turn, is attached to the free ends. The support frame 13 is configured from a layer of SiN or other suitable adiabatic material.

During fabrication, the support frame 13 is formed as an extension of the lower SiN films 21 of the displaceable members 8, 9. More specifically, the support frame 13 extends from the free ends of the displaceable members 8, 9, as shown in FIG. 1 (see also FIGS. 4–7 and 9). The support frame 13 thus extends in a squared U-shaped profile (FIG. 1) around the periphery of the response electrode 10. The support frame 13 includes a planar portion 13a extending roughly parallel to the substrate 1 and a side portion 13b extending along nearly the entire inner and outer periphery of the planar portion 13a. The side portion 13b extends roughly in the Z-direction from the planar portion 13a toward the substrate 1. The side portion 13b optionally can be edged with an edge portion 13c that extends parallel to the substrate slightly outward from the side portion 13b. The edge portion 13c may be omitted if desired. Since the planar portion 13a is reinforced structurally by the side portion 13b, the planar portion 13a can be made thinner than conventionally, without sacrificing the mechanical strength of the planar portion 13a.

The reference electrode 11 comprises an aluminum (Al) layer defining a planar portion 11a that is roughly parallel with the substrate 1. The reference electrode also includes a side portion 11b extending along nearly the entire edge of the planar portion 11a and projecting roughly in the Z-direction from the planar portion away from the substrate 1 and response electrode 10 (FIGS. 6, 7, and 9). The side portion 11b optionally can be edged with an edge portion 11c that extends parallel to the substrate slightly outward from the side portion 11b. The edge portion 11c can be omitted if desired. Since the planar portion 11a is reinforced structurally by the side portion 11b, the planar portion 11a can be made thinner than conventionally, without sacrificing the mechanical strength of the planar portion 11a. Moreover, because the side portion 11b of the reference electrode 11 extends in a direction opposite the direction in which the side portion 10b of the response electrode 10 extends, the side portions 10a, 11a do not obstruct each other whenever the gap between the first and second electrodes 10, 11 narrows. This allows IR-detection sensitivity to be increased by narrowing the gap between the electrodes 10, 11.

The reference electrode 11 is attached at each of its corners to the planar portion 13a of the support frame 13 via connecting posts 14 extending from the planar portion of the reference electrode 11. Thus, the reference electrode is attached to the free ends of the displaceable members 8, 9 via the support frame 13. The connecting posts 14 are extensions (roughly in the Z-direction) of the Al layer comprising the reference electrode 11.

Localized regions (pads) 15 of an electrically insulating film are disposed on the "upper" surface of the planar portion 10a so as to be located "between" the response electrode 10 and reference electrode 11, as shown in FIGS. 1, 7, and 9. The pads 15 of insulating film prevent electrical shorts that otherwise could result if the electrodes 10, 11 were to contact each other. The insulating film desirably is made of SiN, and the pads 15 desirably are small relative to the area of the planar portion 10a to minimize any adverse effect of the pads 15 on the thermal capacity of the response electrode 10.

Respective diffusion zones 16, 17 are situated in the substrate 1 "below" the contact points 2a, 6a of the legs 2, 6, respectively, as shown in FIGS. 2 and 3. The leg 2 includes a wiring layer 31 (FIGS. 1–5 and 8) that electrically connects the diffusion zone 16 with the upper film 22 of the displaceable member 4. The contact point 2a defines an opening through which the wiring layer 31 is connected electrically to the diffusion zone 16. The upper film 22 of the displaceable member 4 is connected electrically with the response electrode 10 by a wiring layer 32, as shown in FIGS. 1 and 5. Thus, the response electrode 10 is connected electrically to the diffusion zone 16.

Likewise, a wiring layer 33 is formed on the leg 6, as shown in FIGS. 1, 3, and 4, that electrically connects the diffusion zone 17 with the upper film 22 of the displaceable member 8. The contact point 6a defines an opening through which the wiring layer 33 is connected electrically to the diffusion zone 17. The upper film 22 of the displaceable member 8 is connected electrically with one of the connecting posts 14 by a wiring layer 34, as shown in FIGS. 1, 4–6, and 8. Thus, the reference electrode 11 is connected electrically to the diffusion zone 17.

In a manner as discussed above, wiring layers 41–44 (corresponding with the wiring layers 31–34, respectively) make respective electrical connections with respect to the legs 3, 7 and the displaceable members 5, 9. Desirably, the material of the wiring layers 31–34, 41–44 is an electrically conductive material with a relatively low coefficient of thermal conductivity, such as titanium (Ti) or the like.

The radiation absorber 12 comprises a SiN layer of a desired thickness and that is reflective to a portion of the incident radiation i. Desirably, the reflectance of the radiation absorber 12 is about 33%. The radiation absorber 12 includes a planar portion 12a, that is roughly parallel with the substrate 1, and a side portion 12b extending along nearly the entire periphery of the planar portion 12a and extending roughly in the Z-axis direction toward the substrate 1. The side portion 12b optionally can be edged with an edge portion 12c that extends roughly parallel to the substrate slightly outward from the side portion 12b. The edge portion 12c can be omitted if desired. Since the planar portion 12a is reinforced structurally by the side portion 12b, the planar portion 12a can be made thinner than conventionally, without sacrificing the mechanical strength of the planar portion 12a.

The radiation absorber 12 is attached to the planar portion 10a of the response electrode 10 by connecting posts 19, one near each corner of the radiation absorber 12 (FIGS. 1 and 7). Thus, in this embodiment, the radiation absorber 12 is thermally coupled to the displaceable member 4 via the connecting posts 19 and the response electrode 10. The connecting posts 19 desirably comprise extensions (in the Z-direction) of the layer (e.g., SiN layer) comprising the radiation absorber 12.

The radiation absorber 12 is disposed so that the gap L1 between the radiation absorber 12 and the reference electrode 11 is substantially equal to $n\lambda_0/4$, wherein n is an odd number and $\lambda$ is the center wavelength of the desired bandwidth of incident radiation i. For example, if $\lambda_0$ is 10 $\mu$m and n is 1, then the gap L1 is approximately 2.5 $\mu$m. In this embodiment, the reference electrode 11 also is used as a reflector that nearly completely reflects the incident radiation i. Hence, the radiation absorber 12 and the reference electrode 11 define an optical cavity therebetween.

The radiation detector according to the invention can be provided separately from the reference electrode 11. In addition, metal black or the like can be used as the radiation absorber instead of the type of radiation absorber 12 discussed above. The metal blacking can be formed on the lower surface of the response electrode 10, wherein incoming radiation is incident from the underside (as shown) of the substrate 1.

Although not illustrated in the figures, in a radiation detector according to this embodiment, the displaceable members 4, 5, 8, 9, the legs 2, 3, 6, 7, the response electrode 10, the reference electrode 11, and the radiation absorber 12 constitute a unit element (pixel). Normally, multiple pixels are arrayed one-dimensionally or two-dimensionally on the substrate 1. Also, although not illustrated, a "readout circuit" as known in the art can be formed on the substrate 1 that reads out the electrical capacitance's between the diffusion zones 16, 17 of each pixel (i.e., the electrical capacitance's between the electrodes 10, 11).

Figure 14:
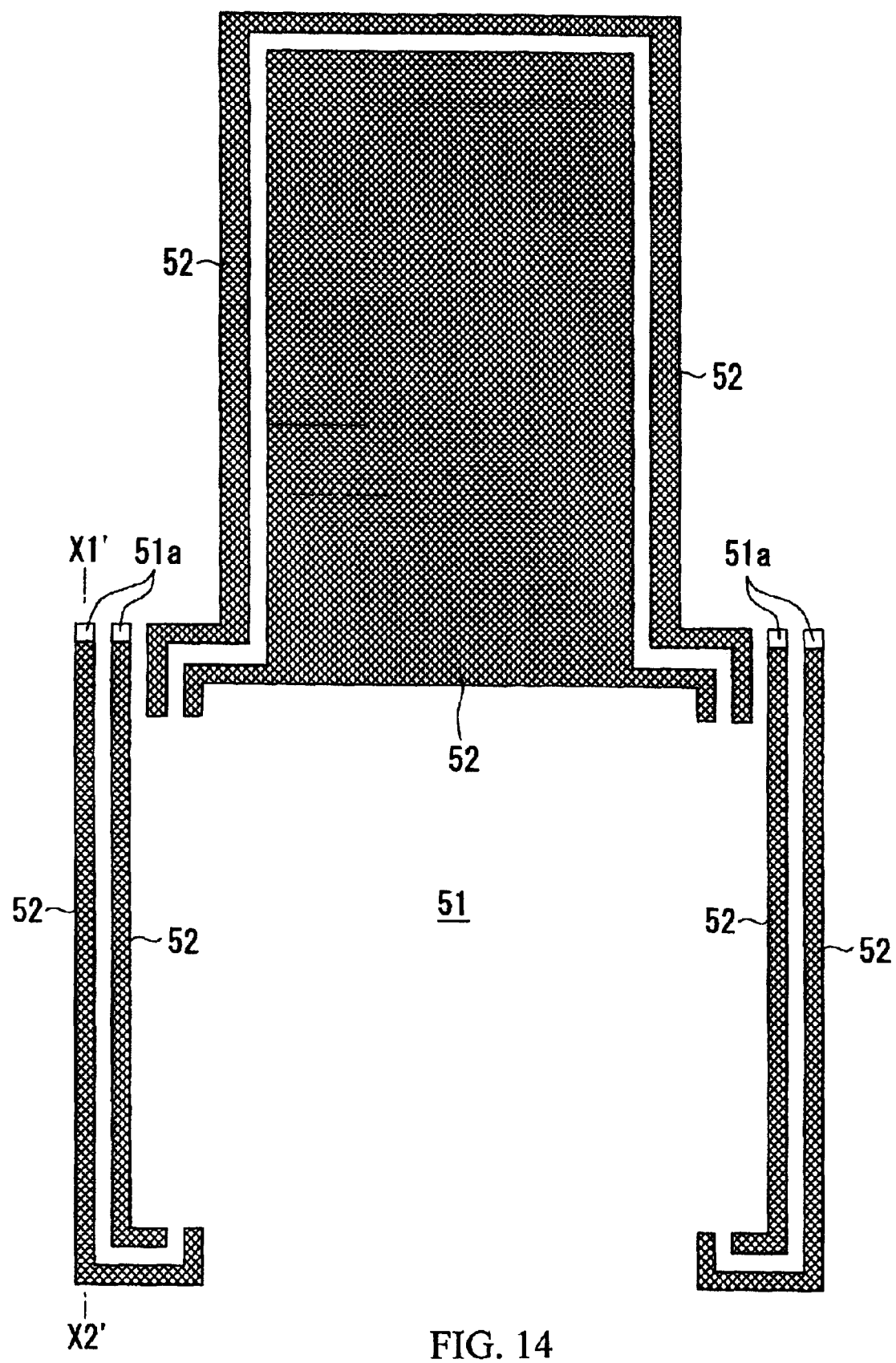
FIG. 14 is a schematic plan view showing results of a step, subsequent to the step shown in FIG. 12, in the method for fabricating a radiation detector according to the first representative embodiment.
Figure 15:
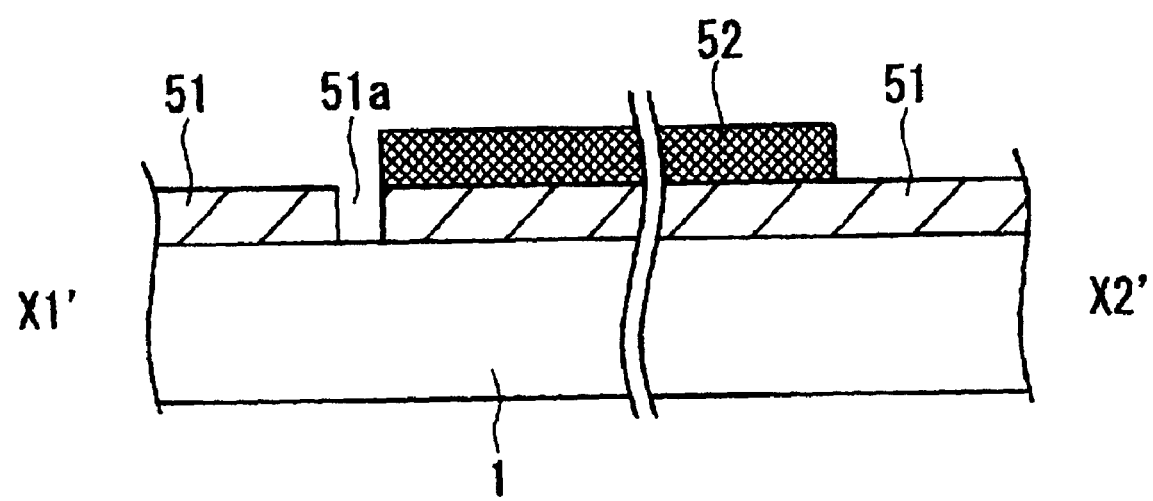
FIG. 15 is a schematic elevational section along the line X1'–X2' in FIG. 14.
Figure 24:
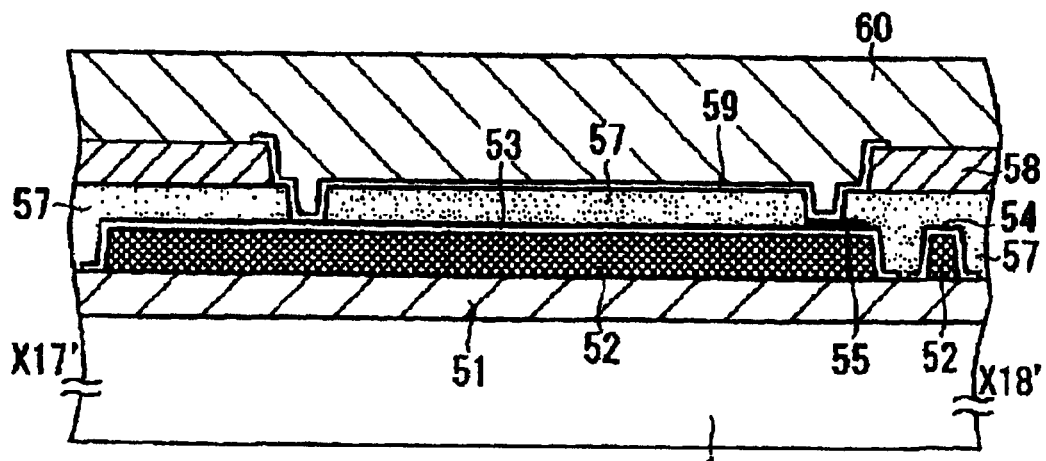
FIG. 24 is a schematic elevational section along the line X17'–X18' in FIG. 23.
Figure 25:
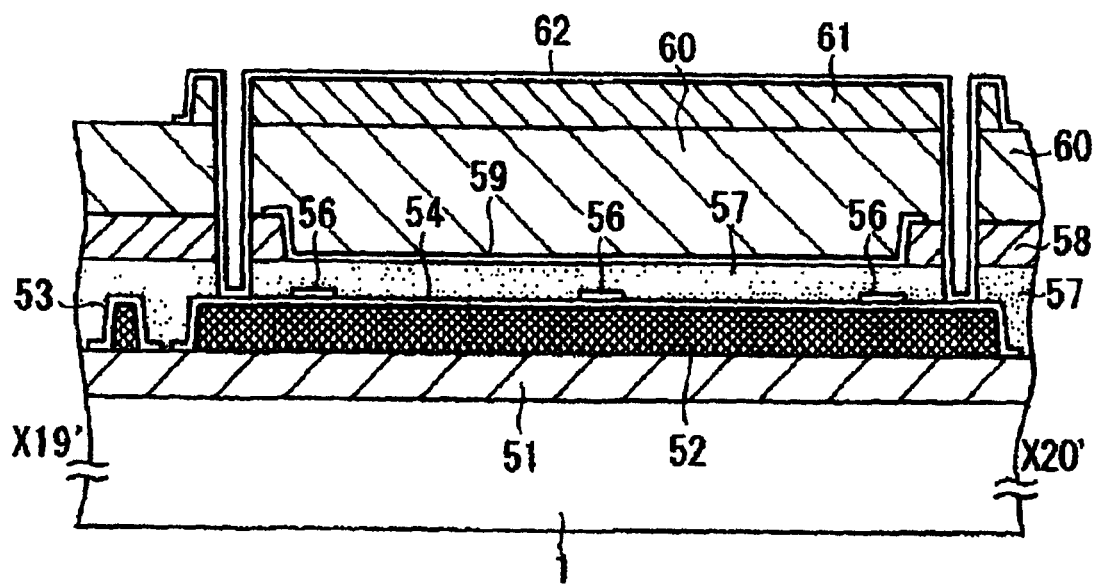
FIG. 25 is a schematic elevational section along the line X19'–X20' in FIG. 23.
Figure 26:
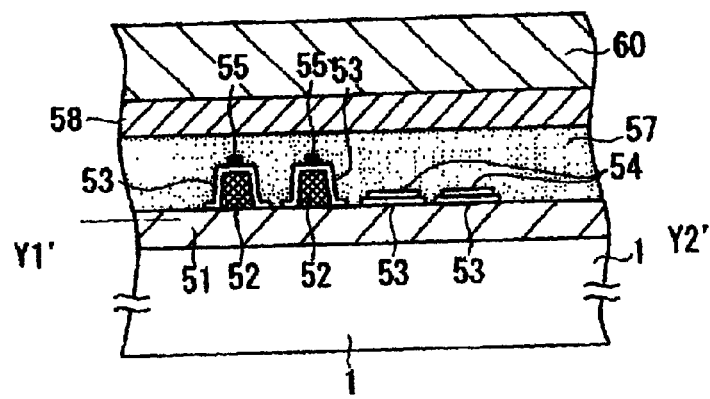
FIG. 26 is a schematic elevational section along the line Y1'–Y2' in FIG. 23.

A representative method for fabricating a radiation detector according to this embodiment is described below with reference to FIGS. 12–26. FIGS. 12, 14, and 16–23 are respective schematic plan-view drawings illustrating the respective results of certain steps in the subject method. FIG. 13 is a schematic elevational section along the line Y5–Y6 in FIG. 12. FIG. 15 is a schematic elevational section along the line X1'–X2' in FIG. 14. FIG. 24 is a schematic elevational section along the line X17'–X18' in FIG. 23; FIG. 25 is a schematic elevational section along the line X19'–X20' in FIG. 23; and FIG. 26 is a schematic elevational section along the line Y1'–Y2' in FIG. 23. In each of these drawings, only one exemplary pixel (or portion thereof) is shown.

First, a silicon (Si) substrate 1 is prepared that includes the diffusion zones 16, 17 and optionally the readout circuit (not shown). A resist layer 51 is applied to the entire surface of the substrate 1. Using photolithography, openings 51 a are formed in the resist 51 at locations corresponding to the contact points 2a, 6a for the respective legs 2, 6 and to contact points for the respective legs 3, 7 (FIGS. 12 and 13).

Figure 12:
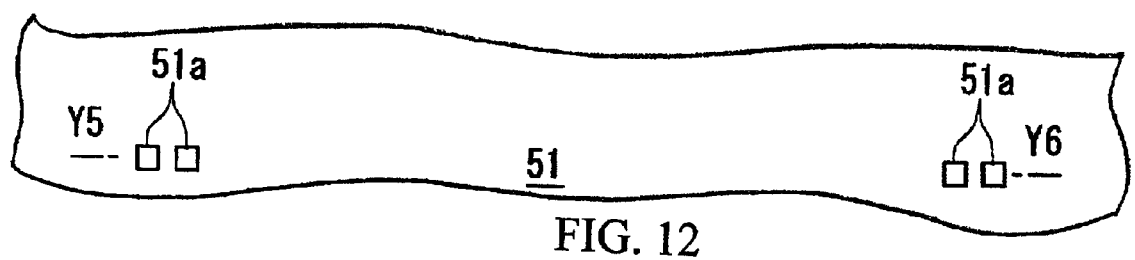
FIG. 12 is a schematic plan view showing results of a first step in a method for fabricating a radiation detector according to the first representative embodiment.
Figure 13:
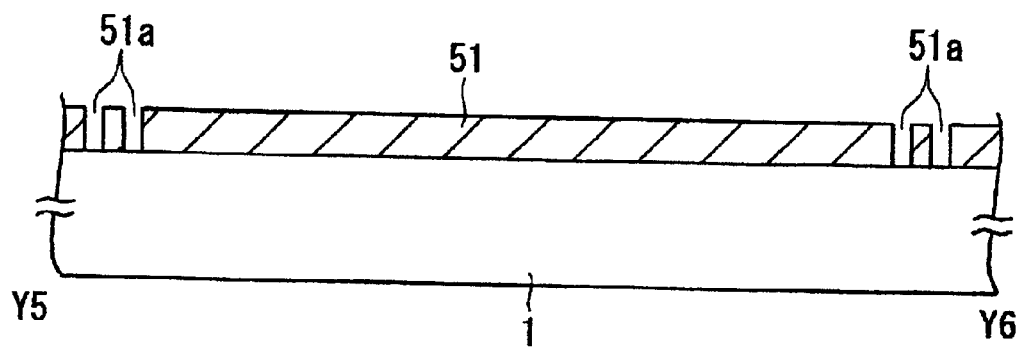
FIG. 13 is a schematic elevational section along the line Y5–Y6 in FIG. 12.

Next, the entire surface of the substrate, in the condition shown in FIGS. 12 and 13, is coated with a "sacrificial" (temporary) layer 52 of polyimide applied by spin coating or analogous procedure. As used herein, "sacrificial" and "temporary," when used in the context of a layer, are synonymous and denote that the subject layer will be removed later. Meanwhile, the sacrificial layer serves as, e.g., a "spacer" layer that facilitates formation of other layers above and below having a desired spacing between them. Selected portions of the polyimide layer 52 (including portions situated over the openings 51a) are removed by photolithography and etching to leave "islands" of the polyimide layer 52 in regions corresponding to the planar portions of the legs 2, 3, 6, 7, the planar portion of the support frame 13, and the planar portion of the response electrode 10 (FIGS. 14 and 15).

Figure 16:
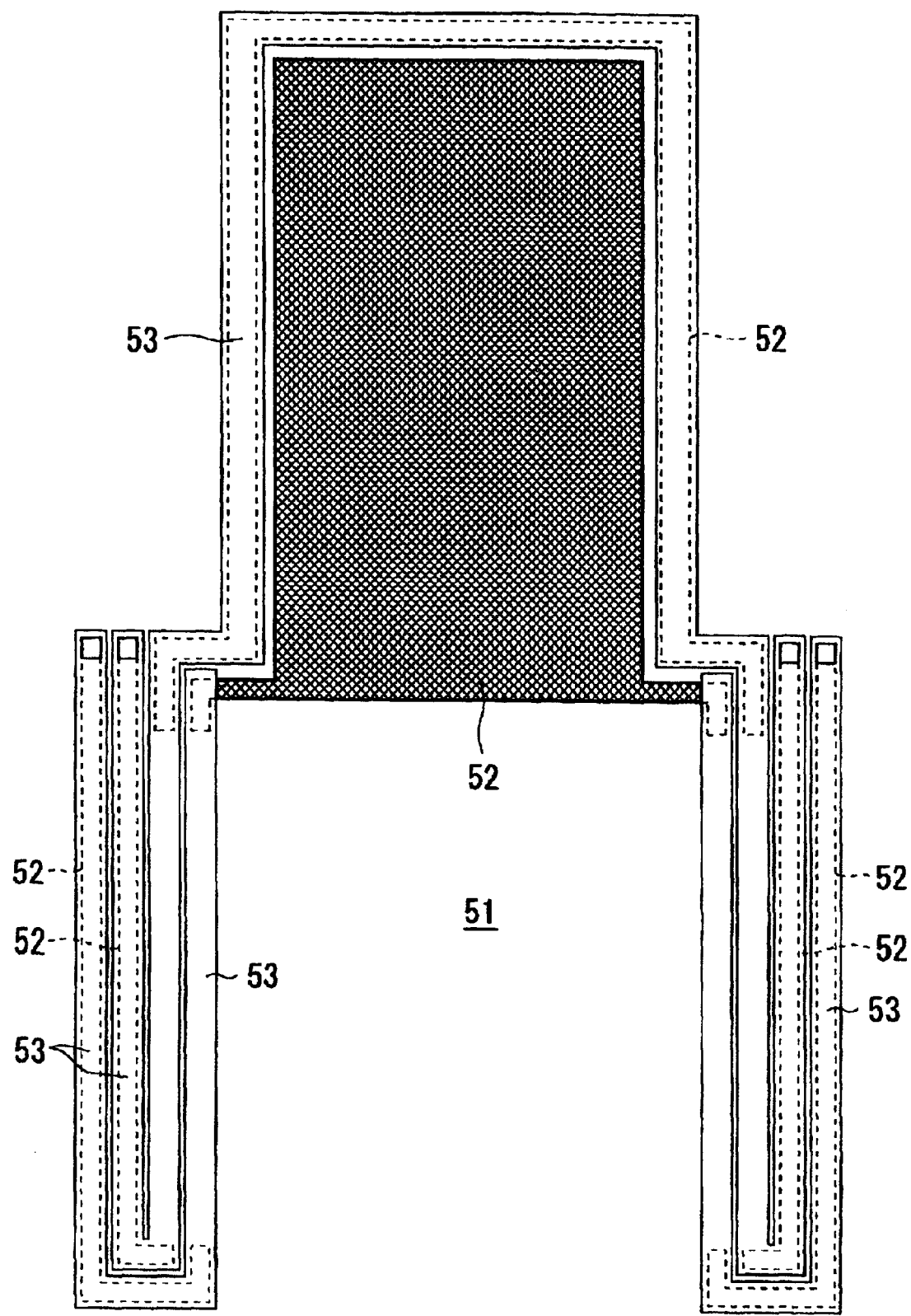
FIG. 16 is a schematic plan view showing results of a step, subsequent to the step shown in FIG. 14, in the method for fabricating a radiation detector according to the first representative embodiment.

Next, a layer 53 of SiN (destined to be the support frame 13, the lower film 21 of each leg 2, 3, 6, 7, and the displaceable members 4, 5, 8, 9) is deposited by P-CVD or other suitable procedure. The SiN layer 53 is patterned by photolithography and etching in the intended respective profiles of the support frame 13, the lower film 21 of each leg 2, 3, 6, 7, and the displaceable members 4, 5, 8, 9 (FIG. 16). After the photolithographic patterning, the remaining portions of the SiN layer 53 used to define the respective features have dimensions that are slightly larger than corresponding dimensions of the underlying polyimide islands, thereby forming not only the planar portions of the respective features but also the side portions and edge portions of these features.

Figure 17:
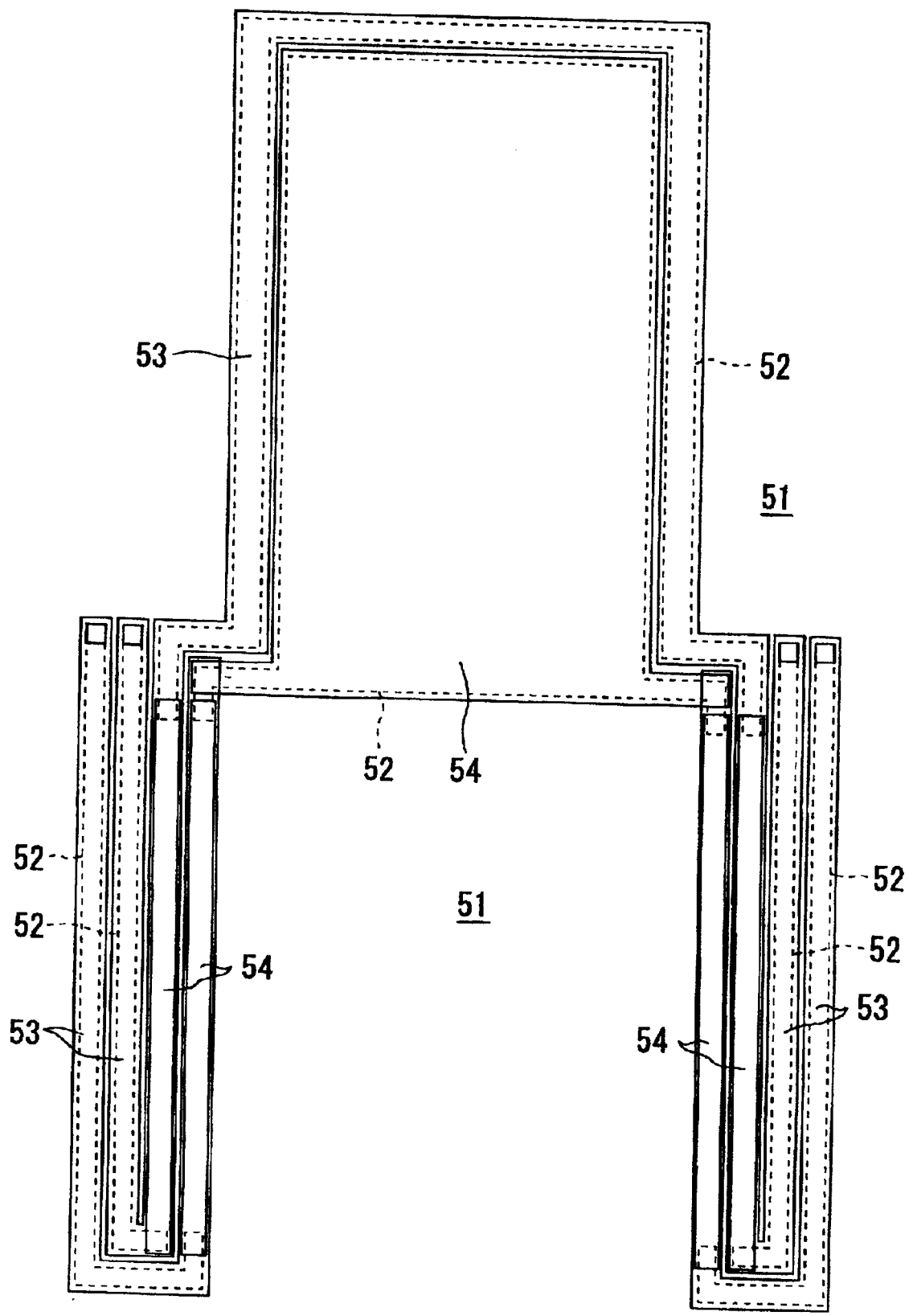
FIG. 17 is a schematic plan view showing results of a step, subsequent to the step shown in FIG. 16, in the method for fabricating a radiation detector according to the first representative embodiment.

Next, over the SiN layer, a layer 54 of aluminum (Al) is applied that is destined to become the response electrode 10 and the "upper" films 22 of the displaceable members 4, 5, 8, 9. The Al layer 54 is deposited by vapor deposition or the like. The Al layer 54 is patterned by photolithography and etching to define the respective profiles of the response electrode 10 and the upper films 22 of the displaceable members 4, 5, 8, 9 (FIG. 17). After the photolithographic patterning, the remaining portion of the Al layer 54 used to define the response electrode 10 has dimensions that are slightly larger than corresponding dimensions of the underlying polyimide island, thereby forming not only the planar portion 10a of the response electrode but also the side portions 10b and edge portions 10c of this feature.

Next, openings destined to become respective connection openings for the wiring layers 31, 33, 41, 43 at the contact points 2a, 6a on the legs 2, 6 and the contact points on the legs 3, 7 are formed in the SiN film 53 by photolithography and etching. A titanium (Ti) layer 55, destined to become the wiring layers 31–34, and 41–44, is deposited by vapor deposition or the like. The Ti layer 55 is patterned by photolithography and etching in the intended shapes of the wiring layers 31–34 and 41–44. A layer 56 of SiN 56 (destined to become the insulator pads 15) is deposited by P-CVD or the like. The SiN layer 56 is patterned by photolithography and etching to form the insulator pads 15 (FIG. 18).

Figure 18:
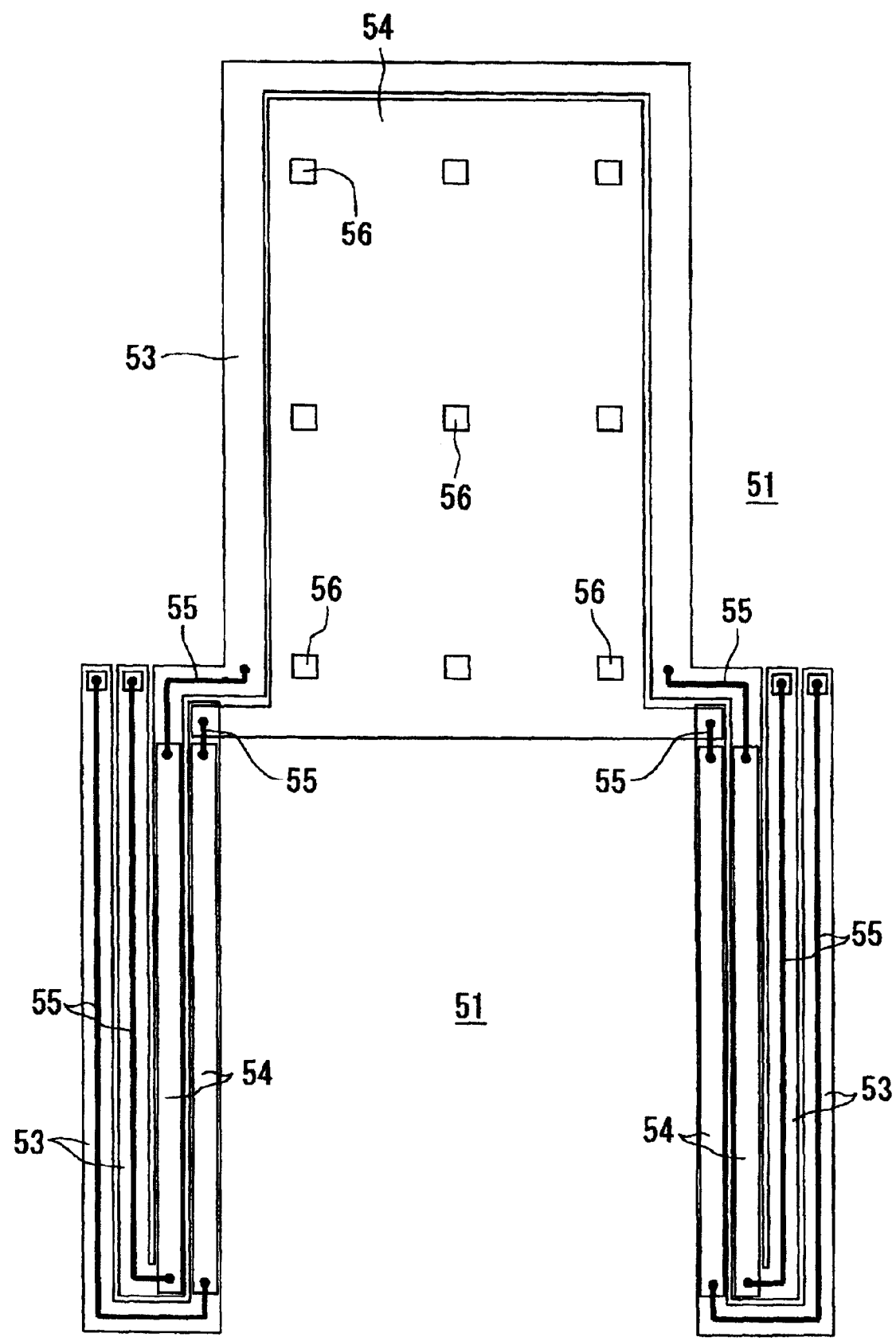
FIG. 18 is a schematic plan view showing results of a step, subsequent to the step shown in FIG. 17, in the method for fabricating a radiation detector according to the first representative embodiment.
Figure 19:
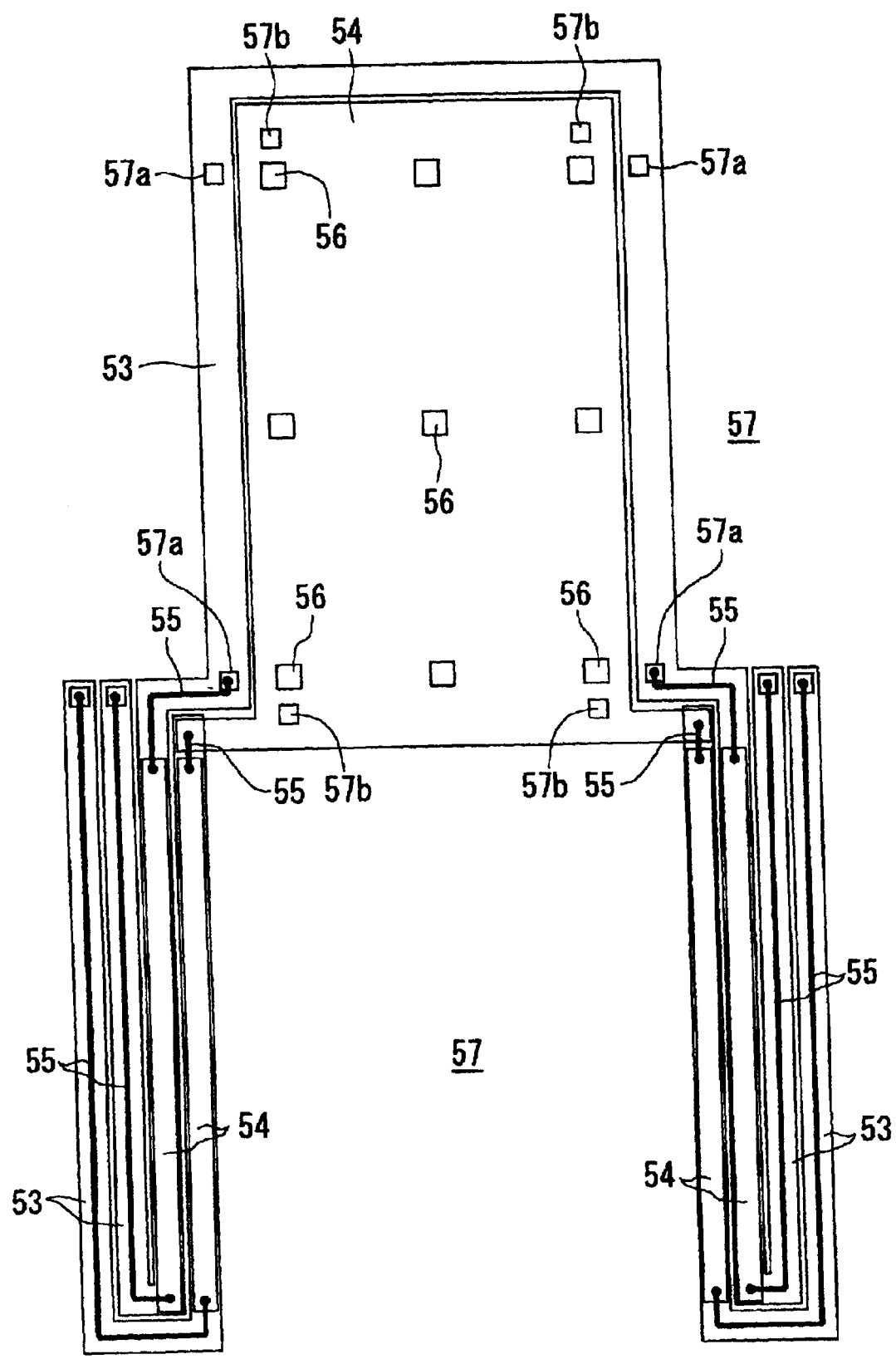
FIG. 19 is a schematic plan view showing results of a step, subsequent to the step shown in FIG. 18, in the method for fabricating a radiation detector according to the first representative embodiment.

Next, the entire surface of the substrate, in the condition shown in FIG. 18, is coated with a sacrificial polyimide film 57 applied by spin coating or the like. Photolithography and etching are performed to form openings 57a, 57b in the polyimide film 57 (FIG. 19). The locations of the openings 57a, 57b correspond with the intended locations of the connecting posts 14, 19.

In FIG. 19, lines that otherwise would be obscured by overlying structure (and that normally would be indicated by dashed lines), e.g., lines obscured by the polyimide film 57, are denoted using solid lines. Actual structure is depicted in FIGS. 24–26, discussed below.

The entire surface of the substrate, in the condition shown in FIG. 19, is coated with a "temporary" layer of resist 58. An opening 58a is formed in the resist layer 58 by photolithography and etching, and the exposed polyimide is removed. The profile of the opening 58a corresponds to the profile of the planar portion 11a of the reference electrode 11. At the same time, openings 57a, 57b are formed in the resist layer 58 (FIG. 20).

Figure 20:
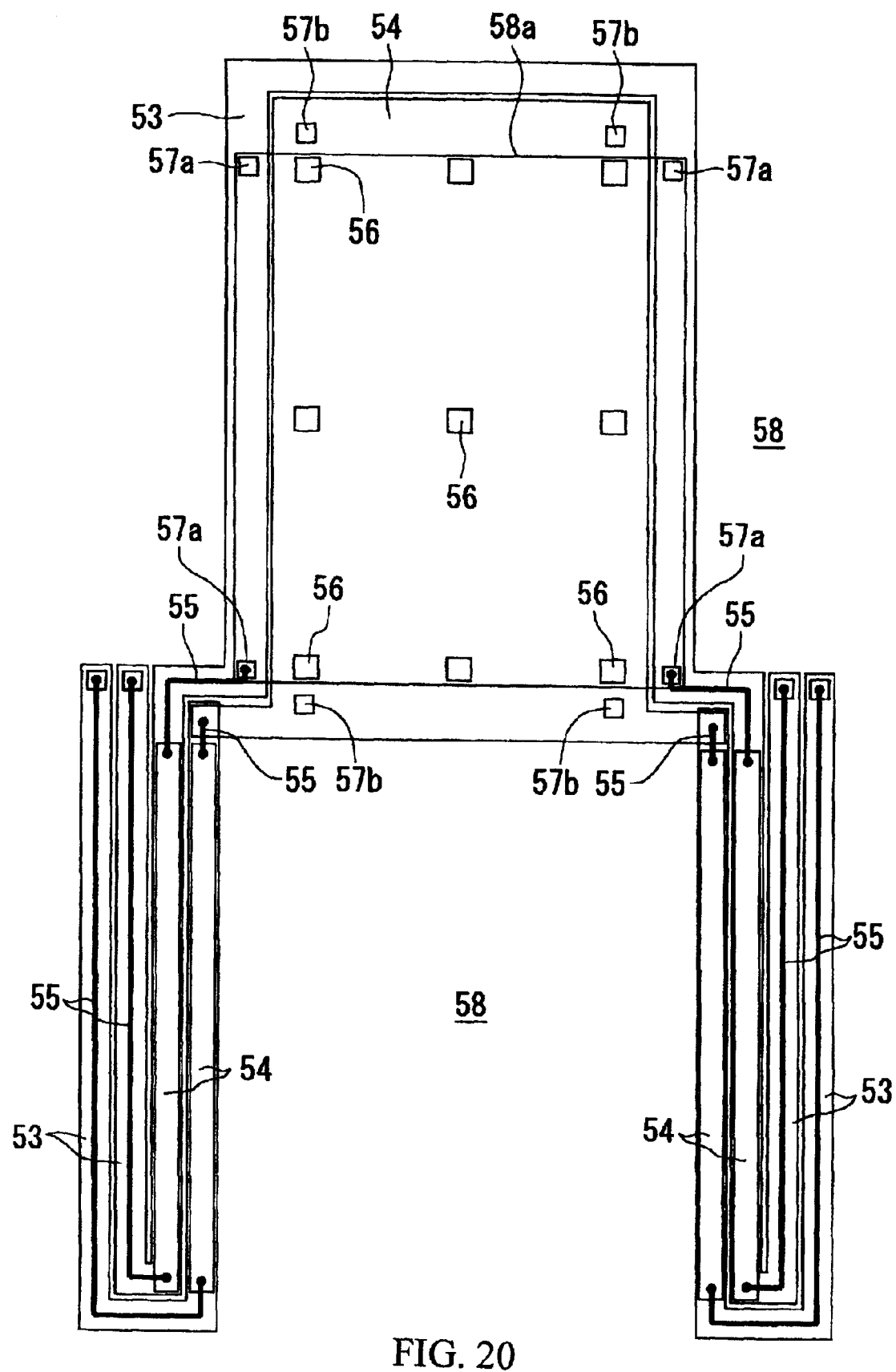
FIG. 20 is a schematic plan view showing results of a step, subsequent to the step shown in FIG. 19, in the method for fabricating a radiation detector according to the first representative embodiment.

In FIG. 20, lines that otherwise would be obscured by overlying structure (and that normally would be indicated by dashed lines), e.g., lines obscured by the resist layer 58, are denoted using solid lines. Actual structure is depicted in FIGS. 24–26, discussed below.

Figure 21:
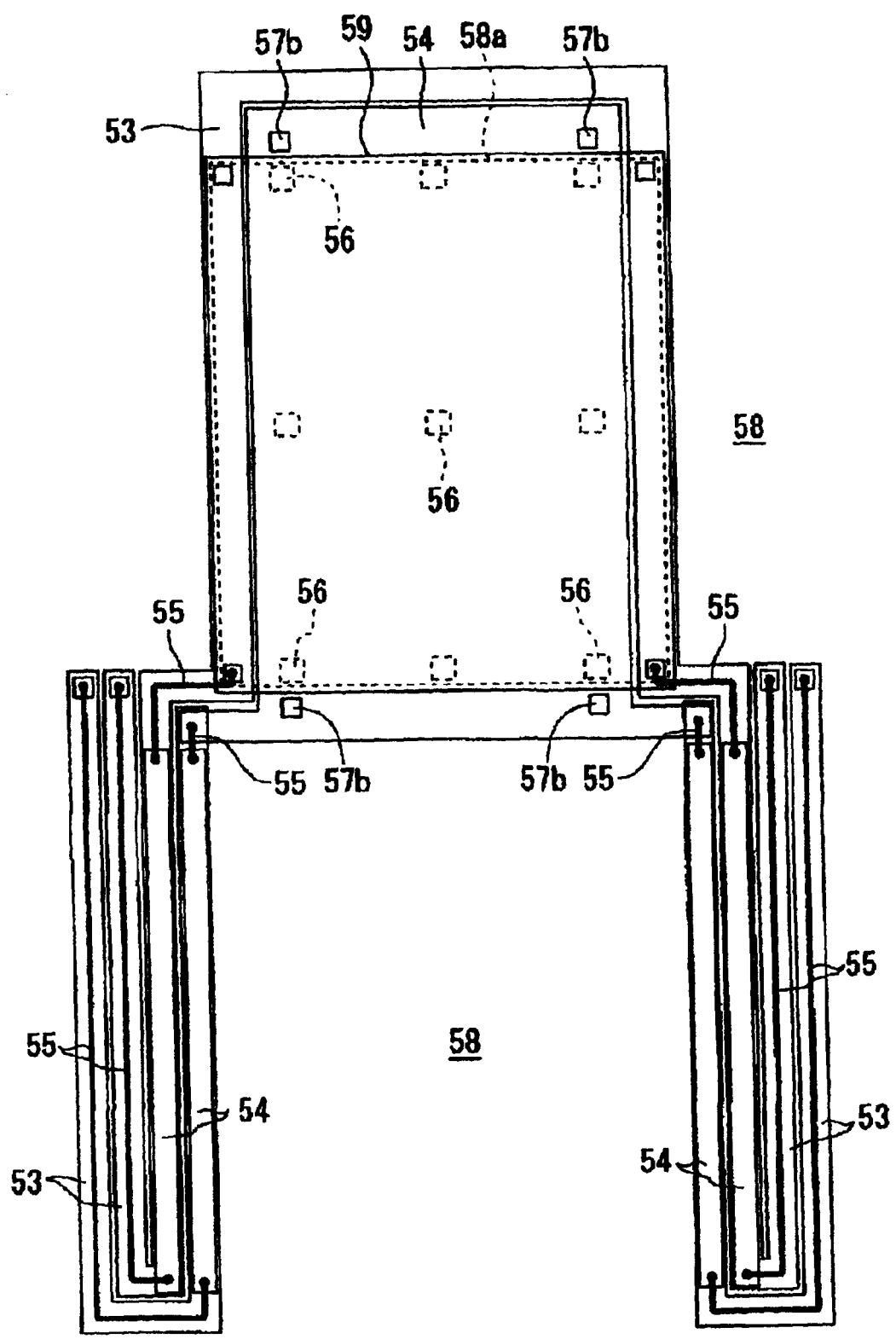
FIG. 21 is a schematic plan view showing results of a step, subsequent to the step shown in FIG. 20, in the method for fabricating a radiation detector according to the first representative embodiment.

According to the patterned resist, a layer 59 of aluminum (Al), destined to become the reference electrode 11 and connecting posts 14, is deposited by vapor deposition or the like. The Al layer 59 is patterned by photolithography and etching in the respective shapes of the reference electrode 11 and connecting posts 14 (FIG. 21). After photolithographic patterning, the remaining portion of the Al layer 59 used to define the reference electrode 11 has dimensions that are slightly greater than corresponding dimensions of the opening 58a, thereby forming not only the planar portion of the reference electrode but also the side portions 11b and edge portions 11c of this feature.

Figure 22:
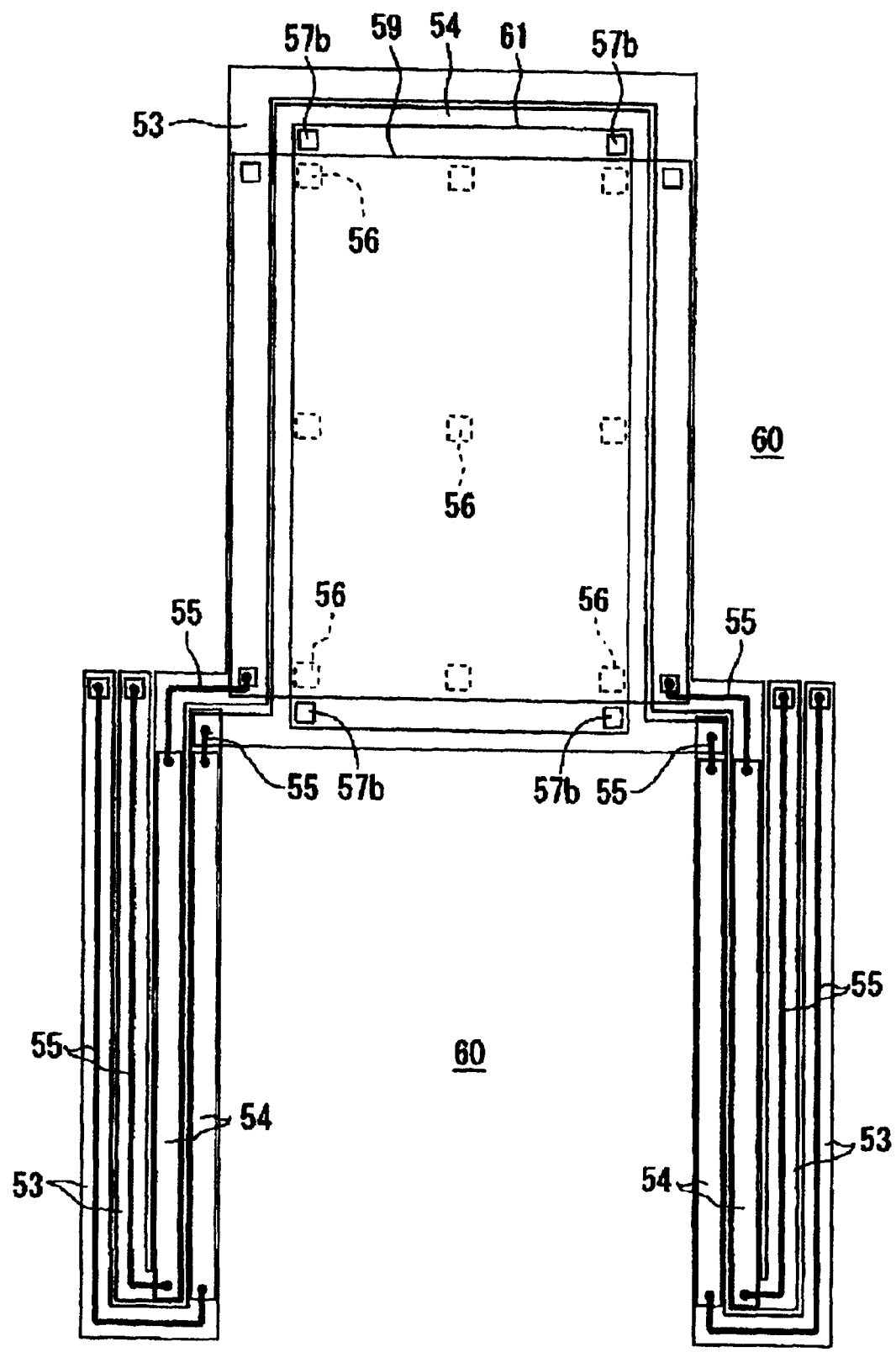
FIG. 22 is a schematic plan view showing results of a step, subsequent to the step shown in FIG. 21, in the method for fabricating a radiation detector according to the first representative embodiment.
Figure 23:
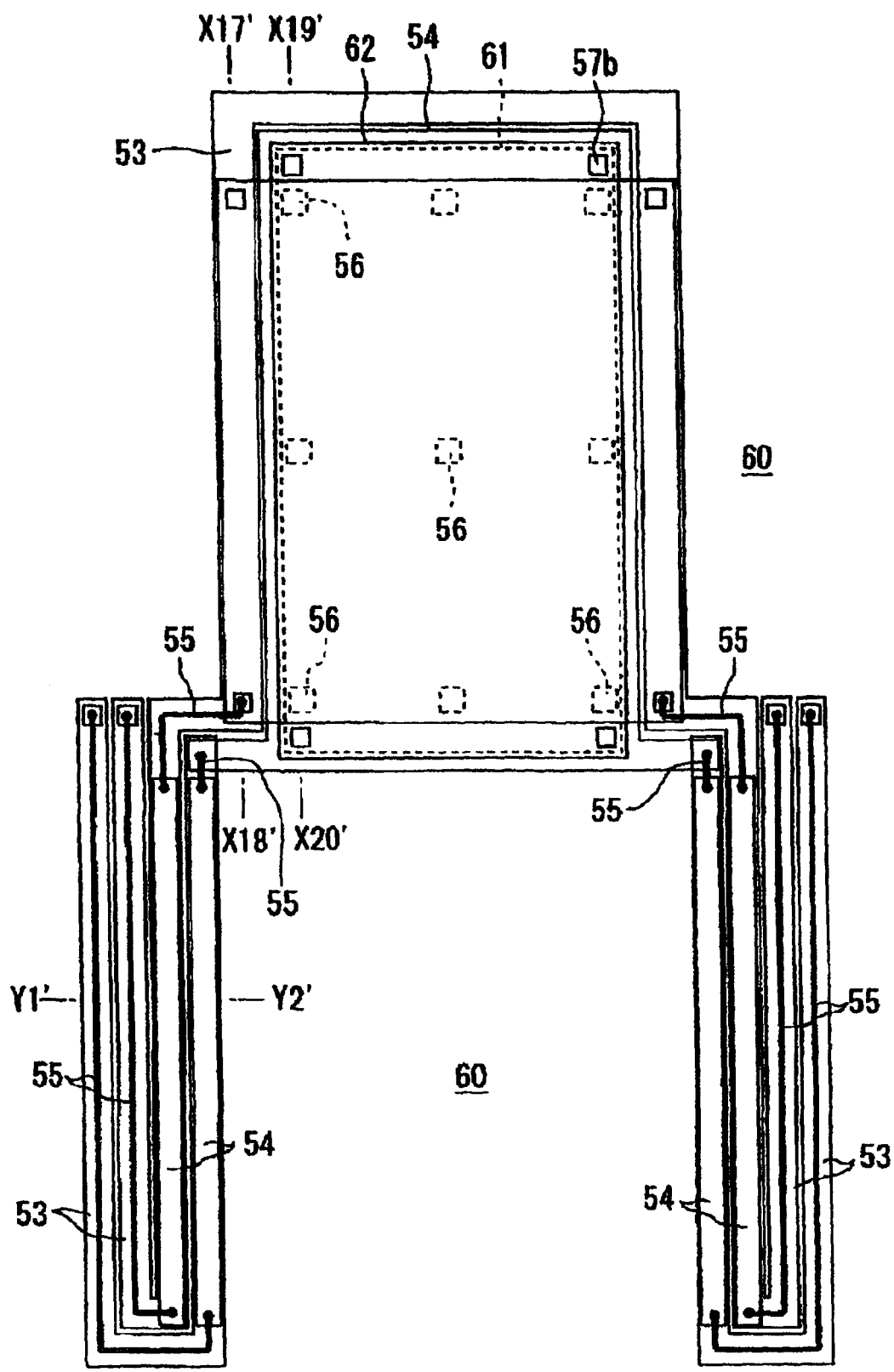
FIG. 23 is a schematic plan view showing results of a step, subsequent to the step shown in FIG. 22, in the method for fabricating a radiation detector according to the first representative embodiment.

Next, the entire surface of the substrate, in the condition shown in FIG. 21, is coated with a sacrificial polyimide film 60 using spin coating or the like (FIG. 22). Polyimide film 60 that has entered the openings 57b is removed by photolithography and etching. The entire surface of the substrate, in this condition, is coated with a layer 61 of a resist. Subsequently, portions of the resist layer 61 (including resist in the area of the openings 57b) and underlying polyimide are removed by photolithography and etching to form islands 60 of polyimide and resist. One of the islands corresponds to the planar portion of the radiation absorber 12.

Next, a layer 62 of SiN, destined to become the radiation absorber 12 and connecting posts 19, is applied by P-CVD or the like. The SiN layer 62 is patterned by photolithography and etching to form the radiation absorber 12 having dimensions that are slightly greater than corresponding dimensions of the respective island of the polyimide film 60, thereby forming not only the planar portion 12a of the radiation absorber but also the side portions 12b and edge portions 12c of this feature, as well as the connecting posts 19.

The substrate in this condition is "diced" (cut) into individual "chips", and all temporary layers of resist 51, 58, 61 and sacrificial polyimide films 52, 57, 60 are removed by ashing or the like. Thus, fabrication of the radiation detector is completed.

Whenever incident radiation i is incident from above on the radiation detector formed as described above (configured according to the first representative embodiment), some of the incident radiation i is absorbed by the radiation absorber 12. The remaining incident radiation is reflected by the reference electrode 11, serving as a radiation reflector, then reflected by the radiation absorber 12 so as to be incident again on the reference electrode 11. As a result, interference occurs in the gap between the radiation absorber 12 and the reference electrode 11. The magnitude of the gap L1 between the radiation absorber 12 and the reference electrode 11 is roughly an odd multiple of one-quarter of the central wavelength of the desired wavelength band of incident radiation i. Consequently, absorption of radiation by the radiation absorber 12 is nearly maximal, thereby increasing the efficiency of radiation absorption by the radiation absorber 12. Thus, the radiation-absorption efficiency of the radiation absorber 12 is increased even if the radiation absorber 12 is thinner than conventionally (a decrease in thickness tends to reduce the thermal capacity of the radiation absorber 12). As a result, both detection sensitivity and detection responsiveness of the radiation detector is increased.

Heat generated in the radiation absorber 12 by absorption of incident radiation is transmitted to the displaceable members 4, 5 via the connecting post 19. The transmitted heat causes the cantilevered displaceable members 4, 5 to bend downward in this embodiment. The resulting tilt of the response electrode 10 corresponds to the amount of incident radiation i absorbed by the radiation absorber 12. The heat generated in the radiation absorber 12 is not transmitted to the displaceable members 8, 9. Consequently, the displaceable members 8, 9 do not bend, and the change in the gap distance between the response electrode 10 and the reference electrode 11 corresponds only to the amount of incident radiation i absorbed. The change in distance between the response electrode 10 and the reference electrode 11 causes a corresponding change in the electrical capacitance between these two electrodes, allowing the incident radiation to be detected as a corresponding change in electrical capacitance, as measured across the diffusion layers 16, 17. The diffusion layers 16, 17 are connected to a read-out circuit (not shown but well understood in the art) that reads out the electrical capacitance across them. The unit pixels of the radiation detector are arranged in a one-dimensional or two-dimensional array, so that an image signal, based on respective amounts of incident radiation absorbed by the unit pixels, can be obtained from the read-out circuit.

In this embodiment, the first displaceable members 4, 5 and second displaceable members 8, 9 are disposed so as not to be layered over or under one another when viewed from a layering direction (i.e., Z-direction). This allows the respective "lower" films 21 of the first displaceable members 4, 5 and the respective "lower" films 21 of the second displaceable members 8, 9 to be formed simultaneously, and the respective "upper" films 22 of the first displaceable members 4, 5 and the respective "upper" films 22 of the second displaceable members 8, 9 to be formed simultaneously (FIG. 16). As a result, even if the first displaceable members 4, 5 and/or second displaceable members 8, 9 are warped by stress encountered during fabrication of the layers 21, 22, (1) the warping conditions are substantially the same in the first displaceable members 4, 5 as in the second displaceable members 8, 9, and (2) the gap (or other positional relationship) between the reference electrode 11 and the response electrode 10 always can be set to the desired distance (or other positional relationship). These characteristics greatly increase the success rate of achieving a desired radiation-detection sensitivity and desired dynamic range of radiation detection, compared to conventional devices. This point is discussed below, referring to FIGS. 27(a)–27(c) and 28(a)–28(c).

In the following discussion, the (X, Z) position (as viewed from the Y-axis direction) of the "start" point P1 of the leg 2 (FIG. 2) matches the (X, Z) position of the "start" point P11 of the leg 6 (FIG. 3). Also, the (X, Z) position of the "end" point P2 of the leg 2 (FIG. 5), which is the same as the "start" point of the displaceable member 4, is the same as the (X, Z) position of the "end" point P12 of the leg 6

(FIG. 4), which is the same as the "start" point of the displaceable member 8. Consequently, the distance in the length direction (as viewed in the Y-direction) of the leg 2 from its start point P1 to its end point P2 is equal to the distance in the length direction (as viewed in the Y-direction) of the leg 6 from its start point P11 to its end point P12. In addition, the length of the displaceable member 4 from its start point P2 to its end point P3 (FIG. 5) is equal to the length of the displaceable member 8 from its start point P12 to its end point P13 (FIG. 4). These respective relationships are similar for the legs 3, 7 and the displaceable members 5, 9.

Figure 27A:
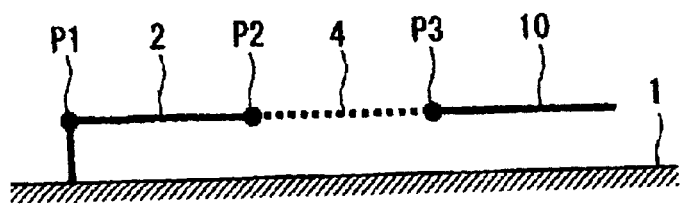
FIGS. 27(a)–27(c) depict a modeled example of an initial condition of the radiation detector of the first representative embodiment.
Figure 27B:
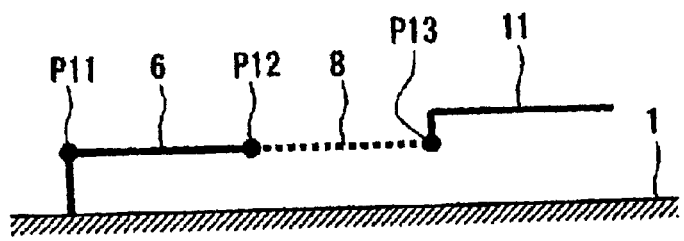
Figure 27C:
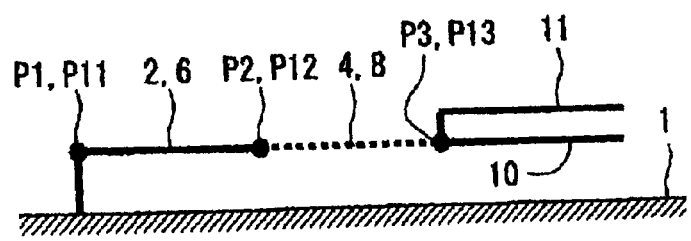

FIGS. 27(a)–27(c) show a modeled example of an initial condition of the radiation detector of this embodiment (i.e., a condition in which no radiation i is incident on the detector), taking into consideration the points described above. FIG. 27(a) is a simplified rendering of the leg 2, the displaceable member 4, and the response electrode 10 as viewed from the Y-axis direction. FIG. 27(b) is a simplified rendering of the leg 6, the displaceable member 8, and the reference electrode 11 as viewed from the Y-axis direction. FIG. 27(c) is a simplified rendering of both legs 2, 6, both displaceable members 4, 8, and both electrodes 10, 11, as viewed from the Y-axis direction. I.e., FIG. 27(c) is essentially an overlay of FIGS. 27(a) and 27(b). Whereas the legs 2, 6 in this embodiment are disposed so as to double-back on the displaceable members 4, 8, as shown in FIG. 1, the legs 2, 6 are depicted in FIGS. 27(a)–27(c) as extending straight from the displaceable members 4, 8. Also, in FIGS. 27(a)–27(c), the legs 2, 6 extend parallel to the substrate 1, and the displaceable members 4, 8 initially are parallel to the substrate 1.

Figure 28A:
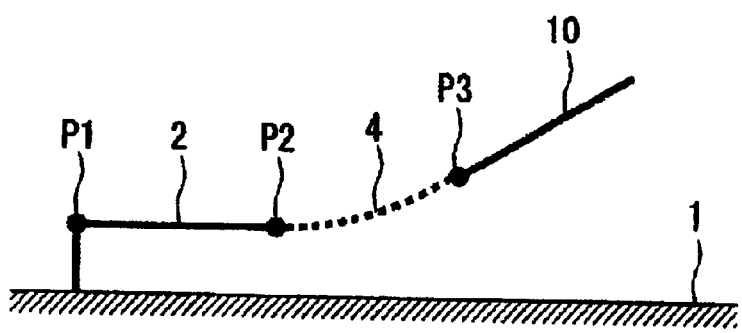
FIGS. 28(a)–28(c) depict another modeled example of an initial condition of the radiation detector of the first representative embodiment.
Figure 28B:
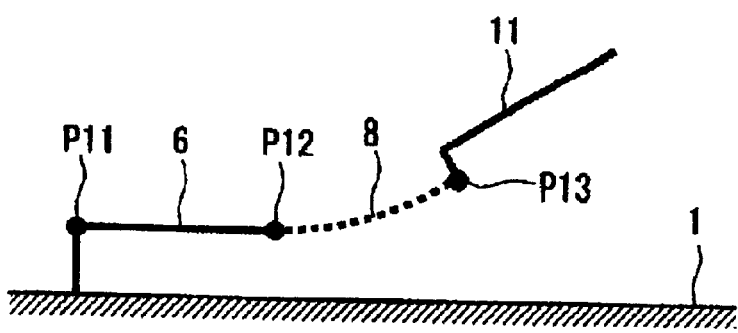
Figure 28C:
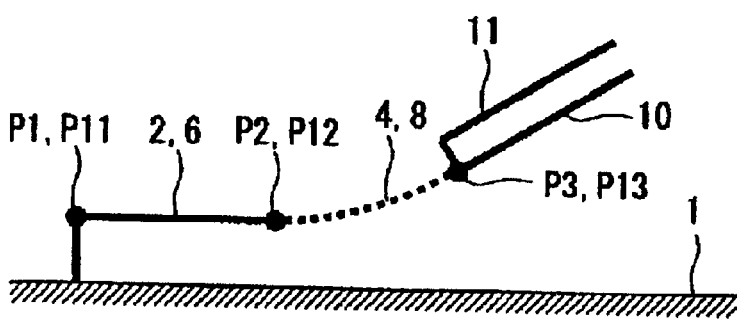

FIGS. 28(a)–28(c) depict another modeled example of an "initial" condition of the radiation detector of this embodiment. FIGS. 28(a)–28(c) correspond to FIGS. 27(a)–27(c), respectively. In FIGS. 28(a)–28(c), a condition is shown in which the displaceable members 4, 8 are bent initially upward due to stress encountered during formation of the films 21, 22 constituting the thermal bimorph structure of the displaceable members 4, 8. Since the displaceable members 4, 8 are manufactured at the same time, as discussed above, the initial bent conditions of both displaceable members 4, 8 are identical.

As can be seen from comparing FIGS. 27(a)–27(c) with FIGS. 28(a)–28(c), even if the displaceable members 4, 8 are initially bent from stress encountered during formation of the films 21, 22, the "initial" gap between the reference electrode 11 and the response electrode 10 remains the same as when the displaceable members 4, 8 initially have no stress. This means that the initial gap between the reference electrode 11 and the response electrode 10 always can be established and maintained (within an acceptable tolerance) to a desired distance even if the displaceable members 4, 8 are initially bent due to stress encountered during formation of the films 21, 22. Therefore, desired radiation-detection sensitivity and dynamic range of radiation detection can be obtained with this embodiment. In addition, variances in the respective initial positional relationships of the reference electrode 11 and response electrode 10 from one pixel to another of the radiation detector can be ameliorated with this embodiment.

Since the reference electrode 11 is attached to the second displaceable members 8, 9 (that are structured identically to the first displaceable members 4, 5 in this embodiment), even if the first displaceable members 4, 5 are deformed by a change in ambient temperature, the second displaceable members 8, 9 are deformed similarly. Consequently, the relative positional relationship of the reference electrode 11 to the response electrode 10 is unchanged by changes in ambient temperature. As a result, radiation i from an object can be detected with good accuracy without the electrical capacitance between the electrodes 10, 11 changing or being affected by ambient temperature. Although the temperature of the substrate can be controlled so as to be unaffected by changes in ambient temperature, such strict temperature control is not required, allowing for reduced cost of operation of the radiation detector.

Since the first displaceable members 4, 5 and second displaceable members 8, 9 are manufactured in the same manufacturing steps in this embodiment, as discussed above, differences in film characteristics (e.g., film thickness, etc.) of the first displaceable members 4, 5 and the second displaceable members 8, 9 essentially are eliminated. This offsets the differences in deflection characteristics of the first displaceable members 4, 5 and the second displaceable members 8, 9, observed with conventional radiation detectors. Hence, with a radiation detector made according to this embodiment, whenever strict temperature control of the substrate 1 is not being performed, changes in electrical capacitance between the electrodes 10, 11 due to changes in ambient temperature are decreased compared to conventional radiation detectors, yielding improved detection accuracy and precision compared to conventional radiation detectors.

Naturally, when using a radiation detector according to this and the first representative embodiments, any effects of changes in ambient temperature can be avoided by placing the radiation detector inside a vacuum chamber or by strictly controlling the temperature of the substrate.

In this embodiment, the radiation absorber 12, reference electrode 11, and response electrode 10 in a radiation detector are disposed (in a direction in which the films 21, 22 are layered, or Z-axis direction) in the stated order from the substrate 1, as shown in FIG. 11. The first displaceable member 4 is configured so as to move, as its temperature increases, the response electrode 10 away from the reference electrode 11 (i.e., the direction of the arrow in FIG. 11). Consequently, the electrical capacitance between the electrodes 10, 11 changes inversely proportionally to the distance between the electrodes 10, 11.

Figure 29A:
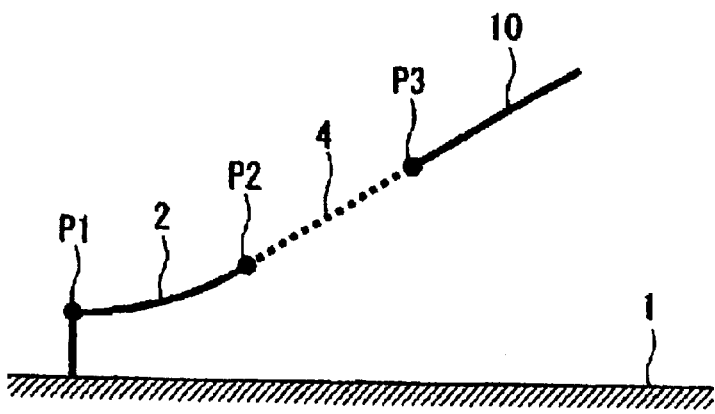
FIGS. 29(a)–29(c) depict yet another modeled example of an initial condition of the radiation detector of the first representative embodiment.
Figure 29B:
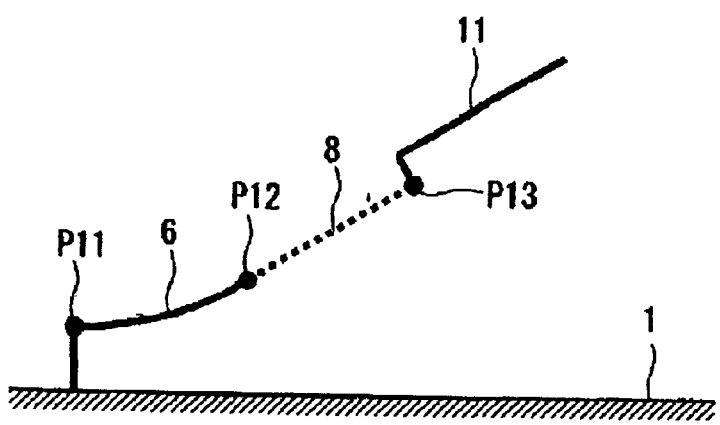
Figure 29C:
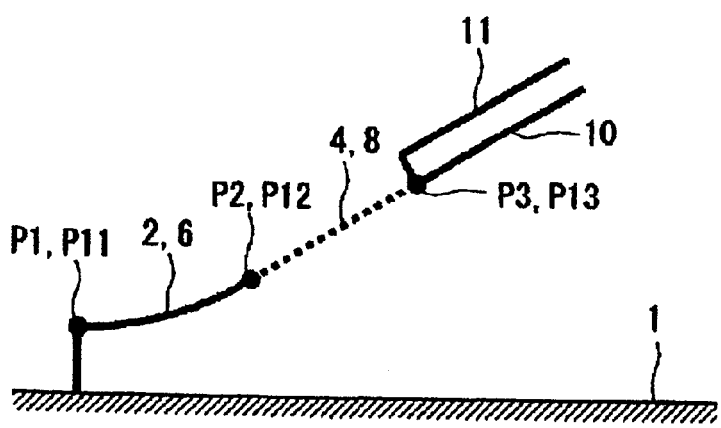

FIGS. 29(a)–29(c), corresponding with FIGS. 27(a)–27(c), respectively, depict yet another modeled example of an initial condition of the radiation detector of this embodiment. In this embodiment, the length of the leg 2 from its start point P1 to its end point P2 is equal to the length of the leg 6 from its start point P11 to its end point P12, as discussed above. Such a configuration is desired because the heights and angles, relative to the substrate 1, of the first and second legs 2, 6 at their respective end points P2, P12 are mutually equal even if the first and second legs 2, 6 are deflected initially due to stress encountered during formation of their respective films, as shown in FIGS. 29(a)–29(c).

Figure 30A:
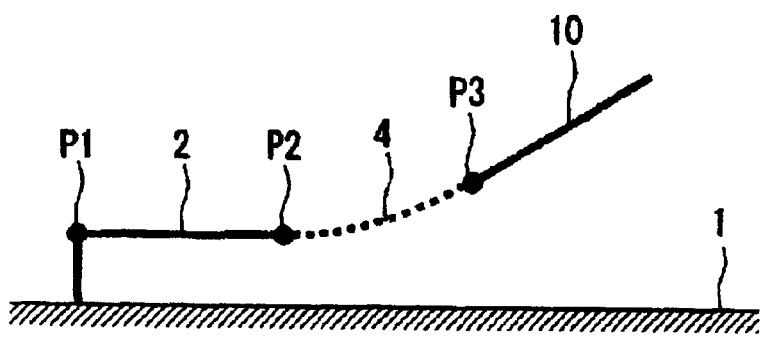
FIGS. 30(a)–30(c) depict a modeled example of an initial condition of the radiation detector of a first modification of the first representative embodiment.
Figure 30B:
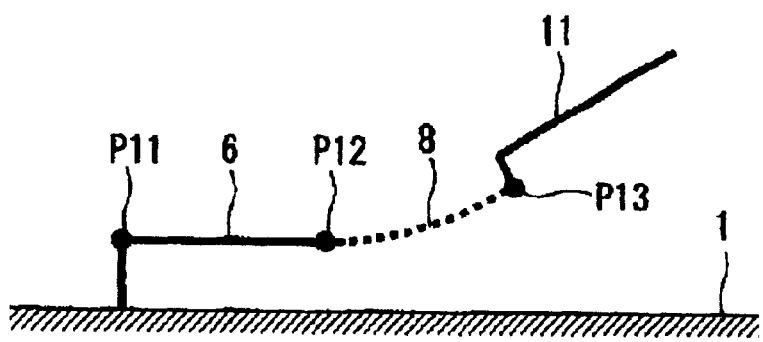
Figure 30C:
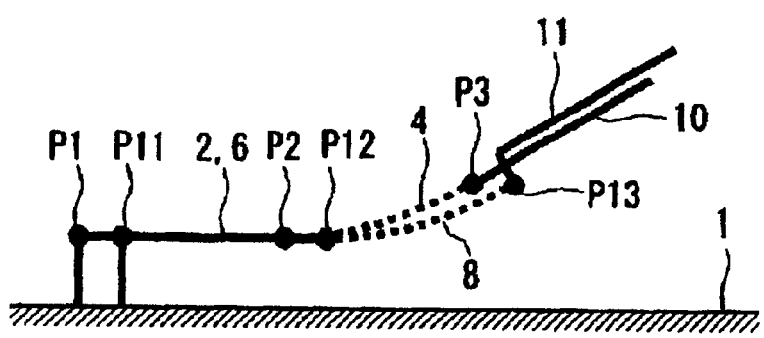

This initial condition can be modified as shown in FIGS. 30(a)–30(c), which show a modeled example of an initial condition of a modified radiation detector of this embodiment. FIGS. 30(a)–30(c) correspond to FIGS. 28(a)–28(c), respectively. In the situation shown in FIGS. 28(a)–28(c), the gap between the electrodes 10, 11 is equal to the thickness of the sacrificial polyimide layer 57 in FIGS. 24 and 25, and cannot be made thinner than the thickness of the layer 57. In contrast, in the situation shown in FIGS. 30(a)–30(c), the (X, Z) position of the start point P2 of the first leg 2 and the (X, Z) position of the start point P12 of the second leg 6 are shifted so as to narrow the gap between the electrodes. I.e., the gap between the electrodes 10, 11 is made narrower than the thickness of the layer 57, thereby increasing the IR-detection sensitivity.

Figure 31A:
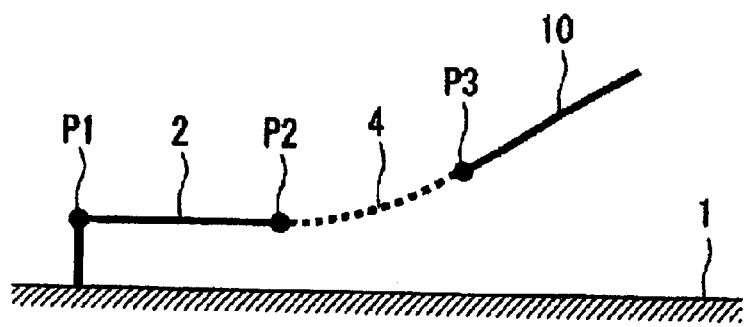
FIGS. 31(a)–31(c) depict a modeled example of an initial condition of the radiation detector of a second modification of the first representative embodiment.
Figure 31B:
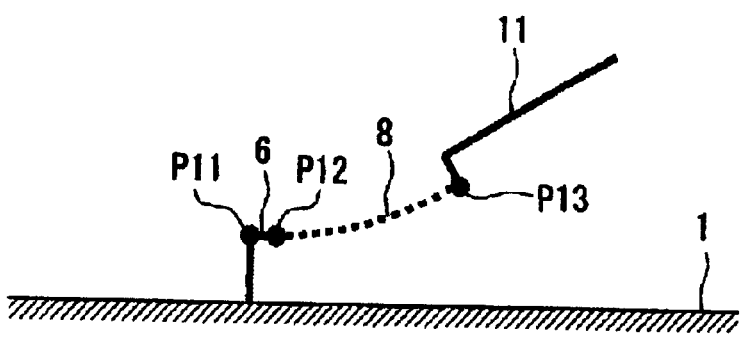
Figure 31C:
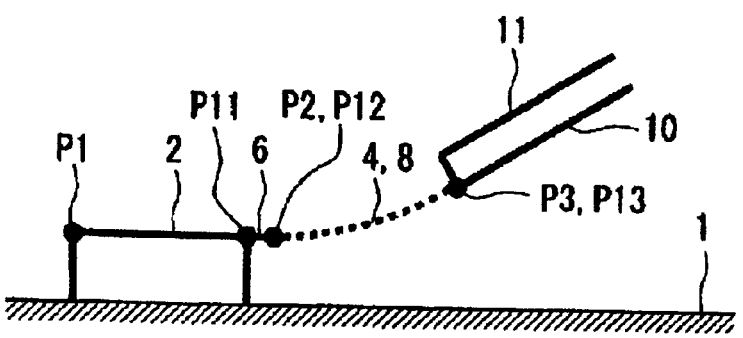

This embodiment can be modified further as shown in FIGS. 31(a)–31(c), showing a modeled example of an initial condition of the modified embodiment. FIGS. 31(a)–31(c) correspond to FIGS. 28(a)–28(c), respectively. Whenever the legs 2, 6 are parallel to the substrate 1, as in the case of FIG. 28(a), the same performance can be obtained even if the length of the leg 6 were essentially zero, as shown in FIG. 31(a). It is not desirable to make the length of the leg 2 equal to zero because such a configuration would make it easier for heat generated in the radiation absorber 12 and transmitted to the displaceable member 4 to escape to the substrate 1. However, this problem would not arise if the leg 6 had essentially zero length. Making the length of the leg 6 essentially equal to zero, as shown in FIGS. 31(a)–31(c), is desirable because it reduces the space occupied by the second leg 6 on the substrate.

Second Representative Embodiment

Figure 32:
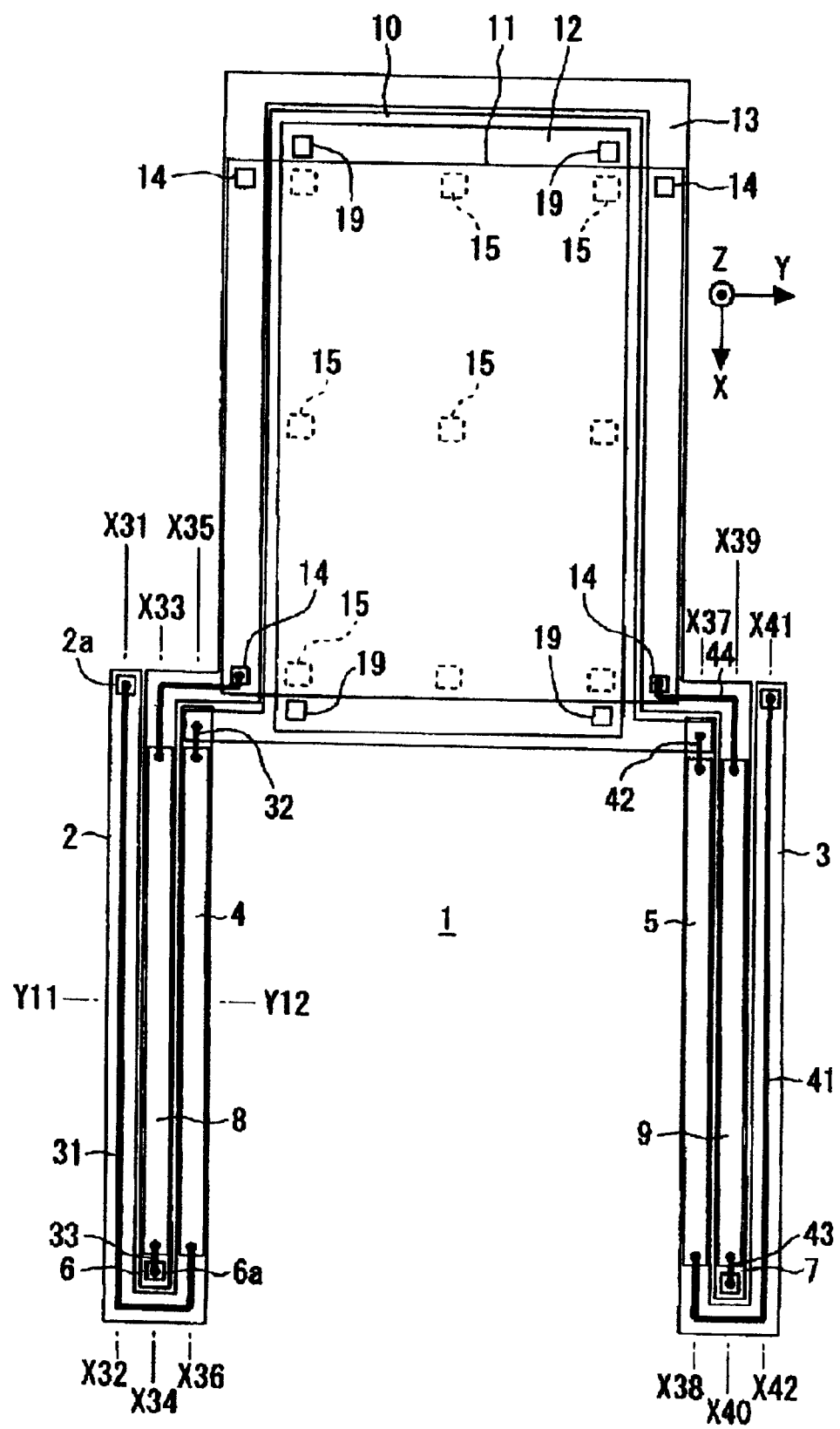
FIG. 32 is a schematic plan view of a unit pixel of a second representative embodiment of a radiation detector according to the invention.
Figure 33:
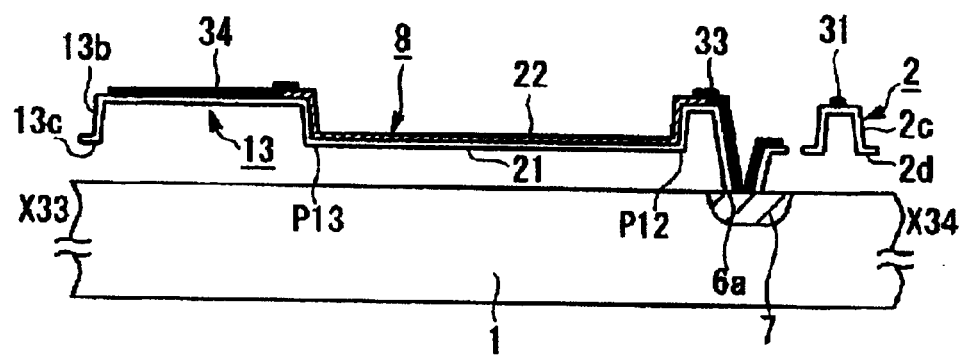
FIG. 33 is a schematic elevational section along the line X33–X34 in FIG. 32.
Figure 34:
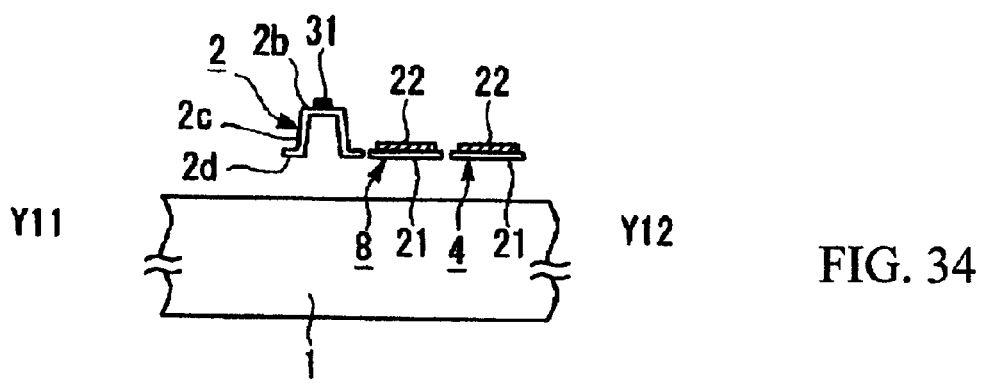
FIG. 34 is a schematic elevational section along the line Y11–Y12 in FIG. 32.

FIG. 32 is a schematic plan view of a unit "pixel" (unit element) of a radiation detector according to this embodiment. FIG. 33 is a schematic elevational section along the line X33–X34 in FIG. 32, and FIG. 34 is a schematic elevational section along the line Y11–Y12 in FIG. 32. In these figures, elements that are identical to or that correspond with respective elements in FIGS. 1–11 have the same respective reference numerals and are not described further below.

Although not included in the figures, respective schematic elevational sections along the lines X31–X32 and X41–X42 in FIG. 32 would be similar to FIG. 2, and respective schematic elevational sections along the lines X35–X36 and X37–X38 would be similar to FIG. 5. Also, respective schematic elevational sections along the lines X33–X34 and X39–X40 in FIG. 32 are similar (FIG. 33).

This embodiment differs from the first representative embodiment in that the legs 6, 7 have a length of zero in the second representative embodiment.

Consequently, the legs 2, 3 are disposed immediately adjacent, lengthwise, to the respective displaceable members 8, 9. By thus effectively eliminating the legs 6, 7, the width (in the Y-direction) of the pixel depicted in FIG. 32 is narrower than the pixel depicted in FIG. 1.

Third Representative Embodiment

Figure 35:
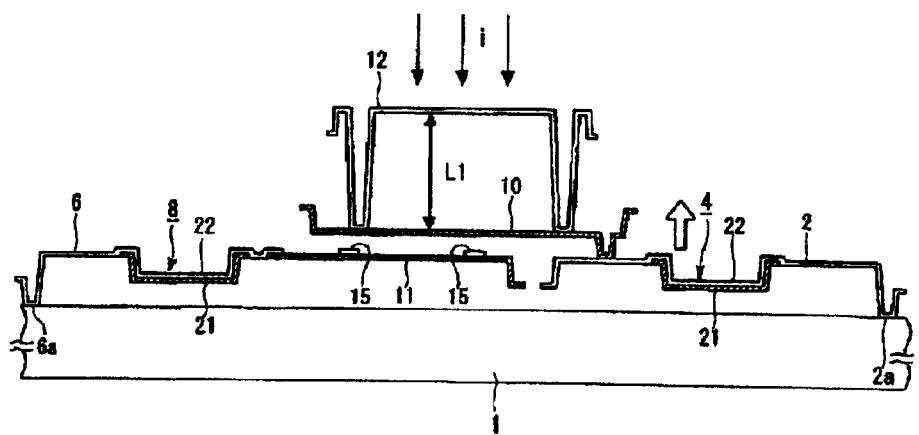
FIG. 35 is a schematic plan view of a unit pixel of a third representative embodiment of a radiation detector according to the invention.

FIG. 35 is a schematic elevational section of a unit pixel of a radiation detector according to this embodiment. The section shown in FIG. 35 corresponds to the section shown in FIG. 11. In FIG. 35, elements that are identical to or that correspond to respective elements shown in FIGS. 1–11 have the same respective reference numerals and are not described further below.

This embodiment differs from the first representative embodiment as follows. First, in this embodiment, the reference electrode 11 is closer (in the Z-direction) to the substrate 1 than the response electrode 10; in the first representative embodiment, the response electrode 10 is closer (in the Z-direction) to the substrate 1 than the reference electrode 11. In other words, in this embodiment, the stacking order (in the Z-direction, from the surface of the substrate 1) of the response electrode 10 and reference electrode 11 is reversed from that of the first representative embodiment. Second, in this embodiment, the "lower" films 21 of the displaceable members 4, 5, 8, 9 are Al films, and the "upper" films 22 are SiN films (in the first representative embodiment, in contrast, the lower films 21 are Al and the upper films 21 are SiN). Hence, in this embodiment, the first displaceable members 4, 5 when heated deflect so as to move the response electrode 10 away from, rather than toward, the reference electrode 11 (in the direction indicated by the large open arrow in FIG. 35). In addition, in this embodiment, the response electrode 10 is used also as a radiation reflector that almost totally reflects incident radiation i. Consequently, the radiation absorber 12 and response electrode 10 define an optical cavity therebetween.

Notwithstanding the differences between the first and third representative embodiments, as discussed above, the third representative embodiment provides the same advantages as provided by the first representative embodiment.

Fourth Representative Embodiment

Figure 36:
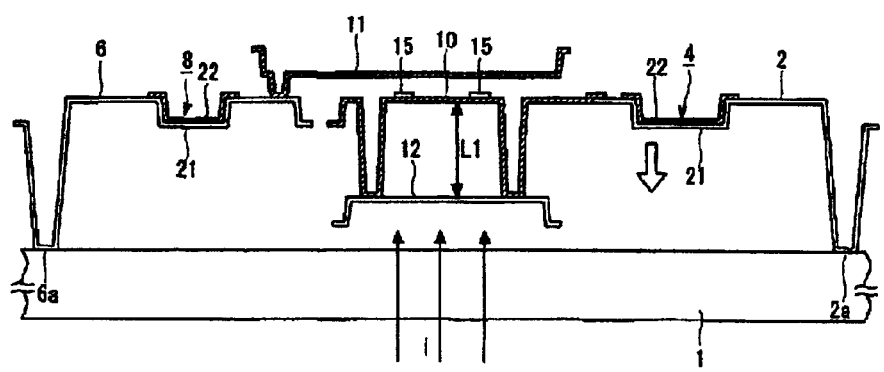
FIG. 36 is a schematic plan view of a unit pixel of a fourth representative embodiment of a radiation detector according to the invention.

FIG. 36 is a schematic elevational section of a unit pixel of a radiation detector according to this embodiment. The section shown in FIG. 36 corresponds to the section shown in FIG. 11. In FIG. 36, elements that are identical to or that correspond with respective elements shown in FIGS. 1–11 have the same respective reference numerals and are not described further below.

This embodiment differs from the first representative embodiment as follows. First, in this embodiment, the radiation absorber 12 is closest (in the Z-direction) to the substrate 1, and the response electrode 10 is situated between the radiation absorber 12 and the reference electrode 11. In other words, the stacking order (in the Z-direction, from the surface of the substrate 1) is first the radiation absorber 12, then the response electrode 10, and finally the reference electrode 11. Also, in this embodiment, the "lower" films 21 in the displaceable members 4, 5, 8, 9 are made of SiN, and the "upper" films 22 are made of Al. Hence, when heated, the first displaceable members 4, 5 deflect to as to move the response electrode 10 away from the reference electrode 11 (in the direction of the large open arrow in FIG. 36). In addition, in this embodiment, the response electrode 10 serves also as a reflector that almost totally reflects incident radiation i. As a result, the radiation absorber 12 and the response electrode 10 define an optical cavity therebetween. Finally, in this embodiment, the incident radiation i passes through the substrate 1 before impinging on the radiation absorber 12.

Notwithstanding the differences between the first and fourth representative embodiments, as discussed above, the fourth representative embodiment provides the same advantages as provided by the first representative embodiment.

Fifth Representative Embodiment

Figure 37:
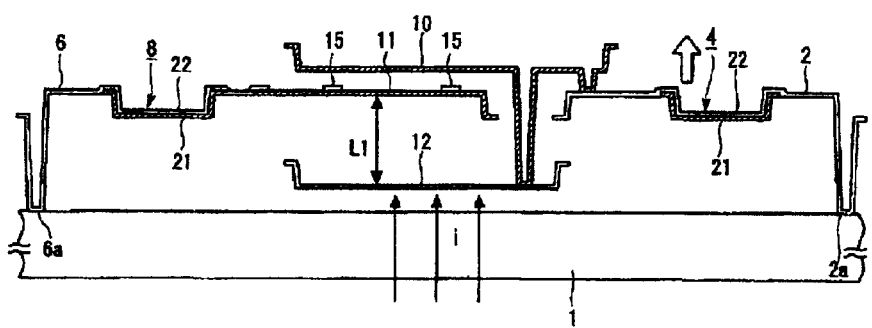
FIG. 37 is a schematic plan view of a unit pixel of a fifth representative embodiment of a radiation detector according to the invention.

FIG. 37 is a schematic elevational section of a unit pixel of a radiation detector according to this embodiment. The section shown in FIG. 37 corresponds to the section shown in FIG. 11. In FIG. 37, elements that are identical to or that correspond with respective elements shown in FIGS. 1–11 have the same respective reference numerals and are not described further below.

This embodiment differs from the first representative embodiment as follows. First, in this embodiment, the radiation absorber 12 is closest (in the Z-direction) to the substrate 1, and the reference electrode 11 is situated between the radiation absorber 12 and the response electrode 10. In other words, the stacking order (in the Z-direction, from the surface of the substrate 1) is first the radiation absorber 12, then the reference electrode 11, and finally the response electrode 10. Also, in this embodiment, the "lower" films 21 of the displaceable members 4, 5, 8, 9 are made of Al, and the "upper" films 22 are made of SiN. Hence, when heated, the first displaceable members 4, 5 deflect so as to move the response electrode 10 away from the reference electrode 11 (in the direction indicated by the large open arrow in FIG. 37). In addition, the reference electrode 11 in this embodiment serves also as a reflector that almost totally reflects incident radiation i. As a result, the radiation absorber 12 and reference electrode 11 define an optical cavity therebetween. Finally, in this embodiment, the incident radiation i passes through the substrate 1 before impinging on the radiation absorber 12.

Notwithstanding the differences between the first and fifth representative embodiments, as discussed above, the fifth representative embodiment provides the same advantages as provided by the first representative embodiment.

Sixth Representative Embodiment

Figure 38:
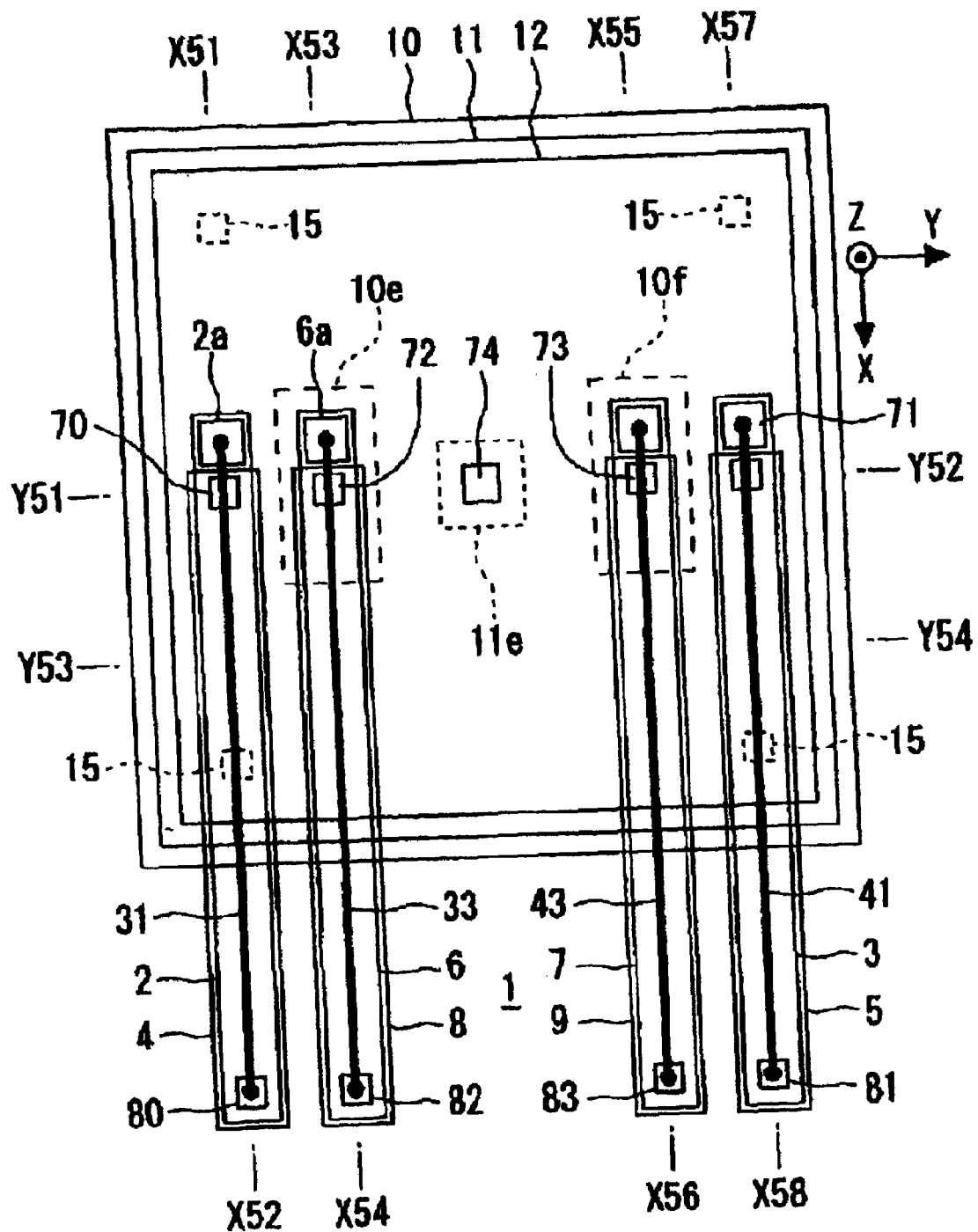
FIG. 38 is a schematic plan view of a unit pixel of a sixth representative embodiment of a radiation detector according to the invention.

A plan view of a unit pixel of a radiation detector according to this embodiment is shown in FIG. 38. In FIG. 38 hidden lines (that otherwise would be denoted by respective broken lines) are denoted by solid lines, and lines that otherwise would indicate a difference in height (from the plane of the page) are omitted. Mutually orthogonal X-, Y-, and Z-axes are as shown in FIG. 38.

Figure 39:
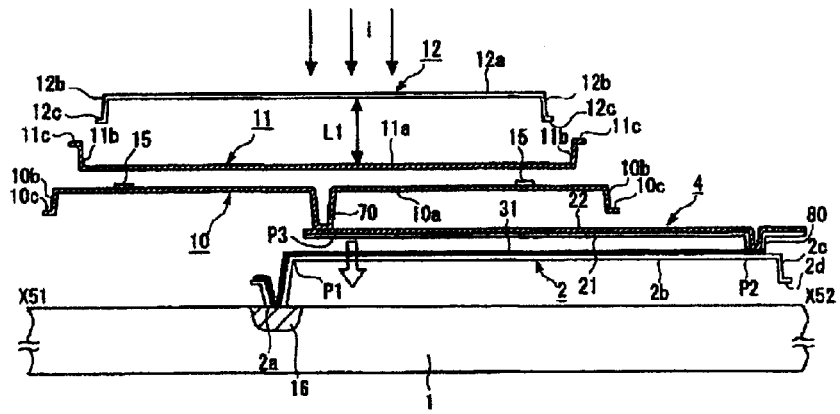
FIG. 39 is a schematic elevational section along the line X51–X52 in FIG. 38.
Figure 40:
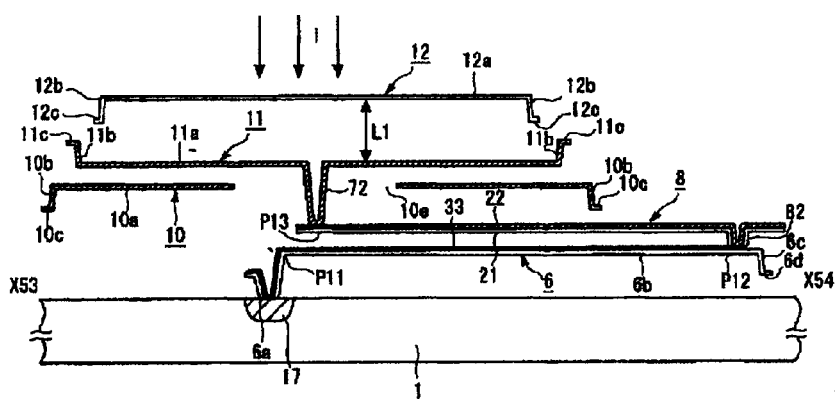
FIG. 40 is a schematic elevational section along the line X53–X54 in FIG. 38.
Figure 41:
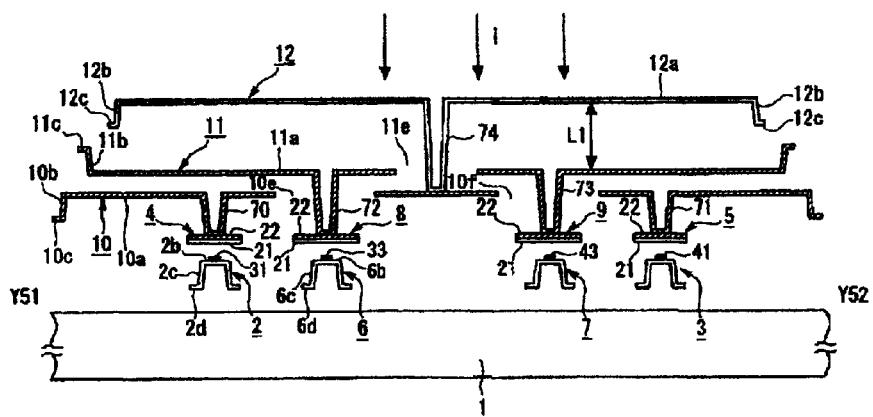
FIG. 41 is a schematic elevational section along the line Y51–Y52 in FIG. 38.
Figure 42:
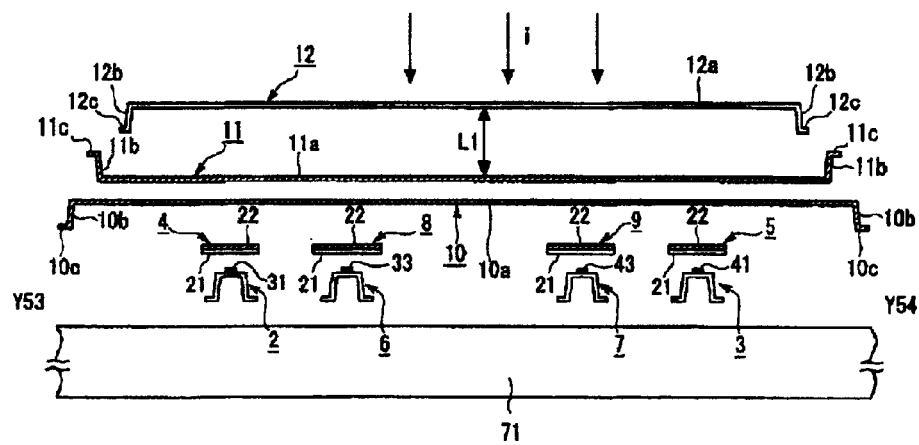
FIG. 42 is a schematic elevational section along the line Y53–Y54 in FIG. 38.

With respect to FIG. 38, FIG. 39 is a schematic elevational section along the line X51–X52, FIG. 40 is a schematic elevational section along the line X53–X54, FIG. 41 is a schematic elevational section along the line Y51–Y52, and FIG. 42 is a schematic elevational section along the line Y53–Y54. Although not shown in the figures, a schematic elevational section along the line X55–X56 in FIG. 38 would be similar to FIG. 40, and a schematic elevational section along the line X57–X58 in FIG. 38 would be similar to FIG. 39. In these figures, elements that are identical to or correspond with respective elements in FIGS. 1–11 have the same respective reference designators and are not described further below. Rather, the following description is directed to the significant differences of this embodiment from the first representative embodiment.

Whereas the legs 2, 3, 6, 7 and respective displaceable members 4, 5, 8, 9 in the first representative embodiment are situated laterally beside each other (see FIG. 1), the displaceable members 4, 5, 8, 9 in the sixth representative embodiment are situated directly "above" (in the "stacking direction" or Z-direction) respective legs 2, 3, 6, 7, with respective gaps between displaceable members and respective legs.

Hence, in this embodiment, the displaceable members 4, 5, 8, 9, the response electrode 10, the reference electrode 11, and the radiation absorber 12 have a different scheme of interconnection than in the first representative embodiment. Namely, in this embodiment, the displaceable members 4, 5, 8, 9 are attached to respective legs 2, 3, 6, 7 by respective connectors 80, 81, 82, 83 formed by extensions of the "upper" film (Al) 22 and "lower" film (SiN) 21 of the respective displaceable members 4, 5, 8, 9 (FIGS. 39 and 40). As discussed below, all the upper films 22 and lower films 21 are formed simultaneously during respective fabrication steps. The upper film 22 at the connection to the respective legs 2, 3, 6, 7 at the respective connectors 80, 81, 82, 83 are configured to connect to respective wiring layers 31, 41, 33, 43 (FIGS. 39 and 40).

The response electrode 10 is attached to "free" ends of the displaceable members 4, 5 by respective connectors 70, 71 formed by extensions of the upper (Al) film 22 constituting the respective displaceable members (FIG. 39). The reference electrode 11 is attached to "free" ends of the displaceable members 8, 9 by respective connectors 72, 73 formed by extensions of the upper (Al) film 22 constituting the respective displaceable members (FIG. 40). Openings 10e, 10f are defined in the response electrode 10 through which the respective connectors 72, 73 extend (FIGS. 38 and 40).

The radiation absorber 12 is attached to the center of the response electrode 10 by a connector 74 formed by an extension of the SiN film constituting the radiation absorber 12 (FIG. 41). An opening 11e is defined in the reference electrode 11 through which the connector 74 extends (FIGS. 38 and 41).

Figure 43:
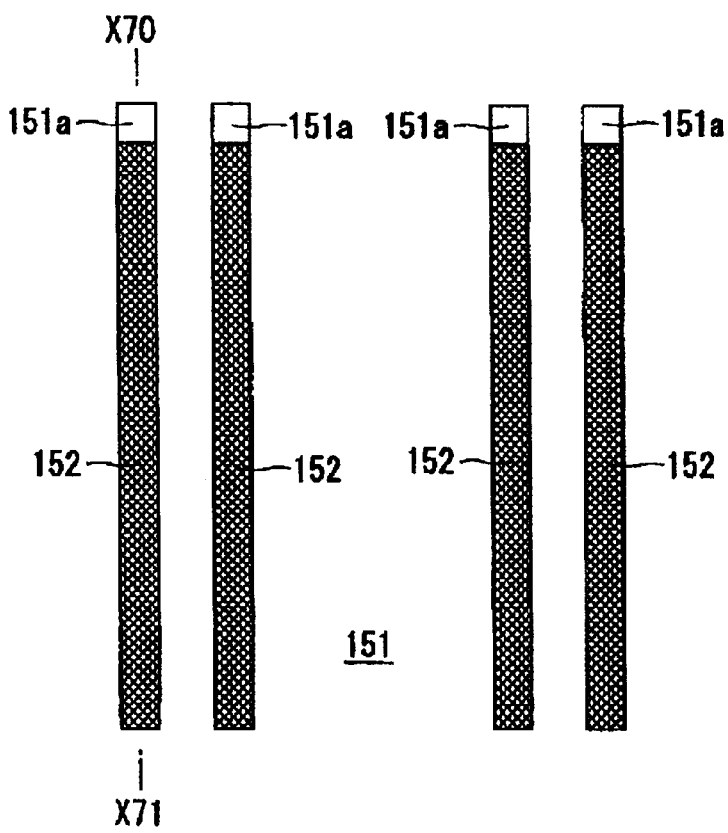
FIG. 43 is a schematic plan view showing results of a first step in a method for fabricating a radiation detector according to the sixth representative embodiment.
Figure 44:
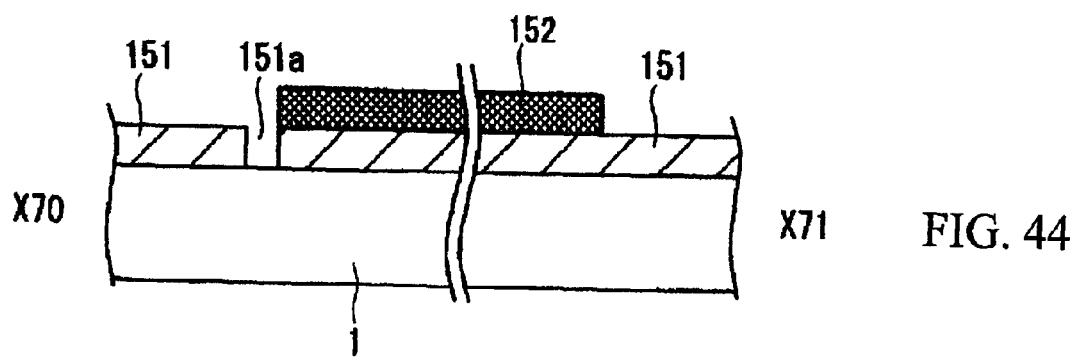
FIG. 44 is a schematic elevational section along the line X70–X71 in FIG. 43.
Figure 53:
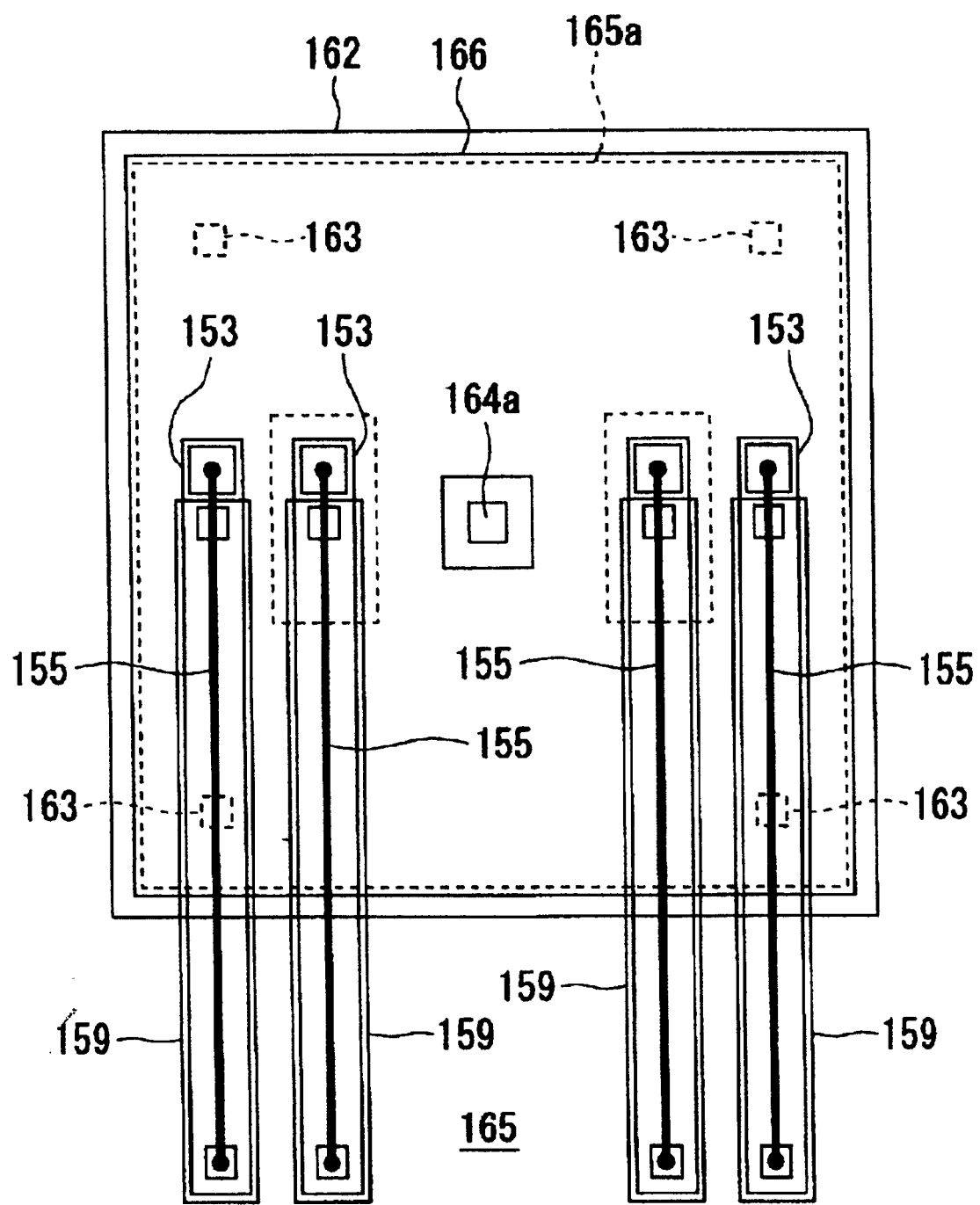
FIG. 53 is a schematic plan view showing results of a step, subsequent to the step shown in FIG. 52, in the method for fabricating a radiation detector according to the sixth representative embodiment.
Figure 54:
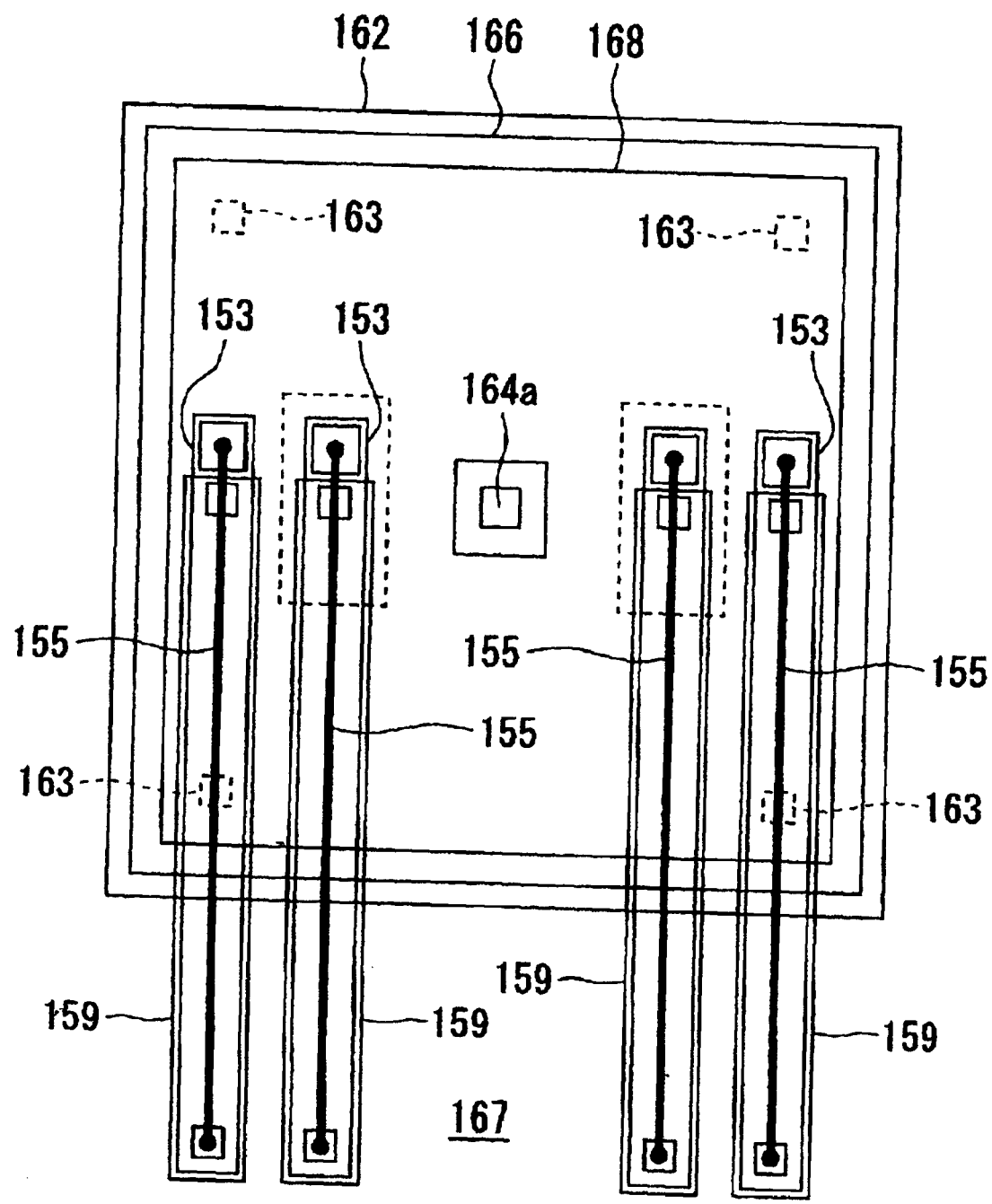
FIG. 54 is a schematic plan view showing results of a step, subsequent to the step shown in FIG. 53, in the method for fabricating a radiation detector according to the sixth representative embodiment.
Figure 55:
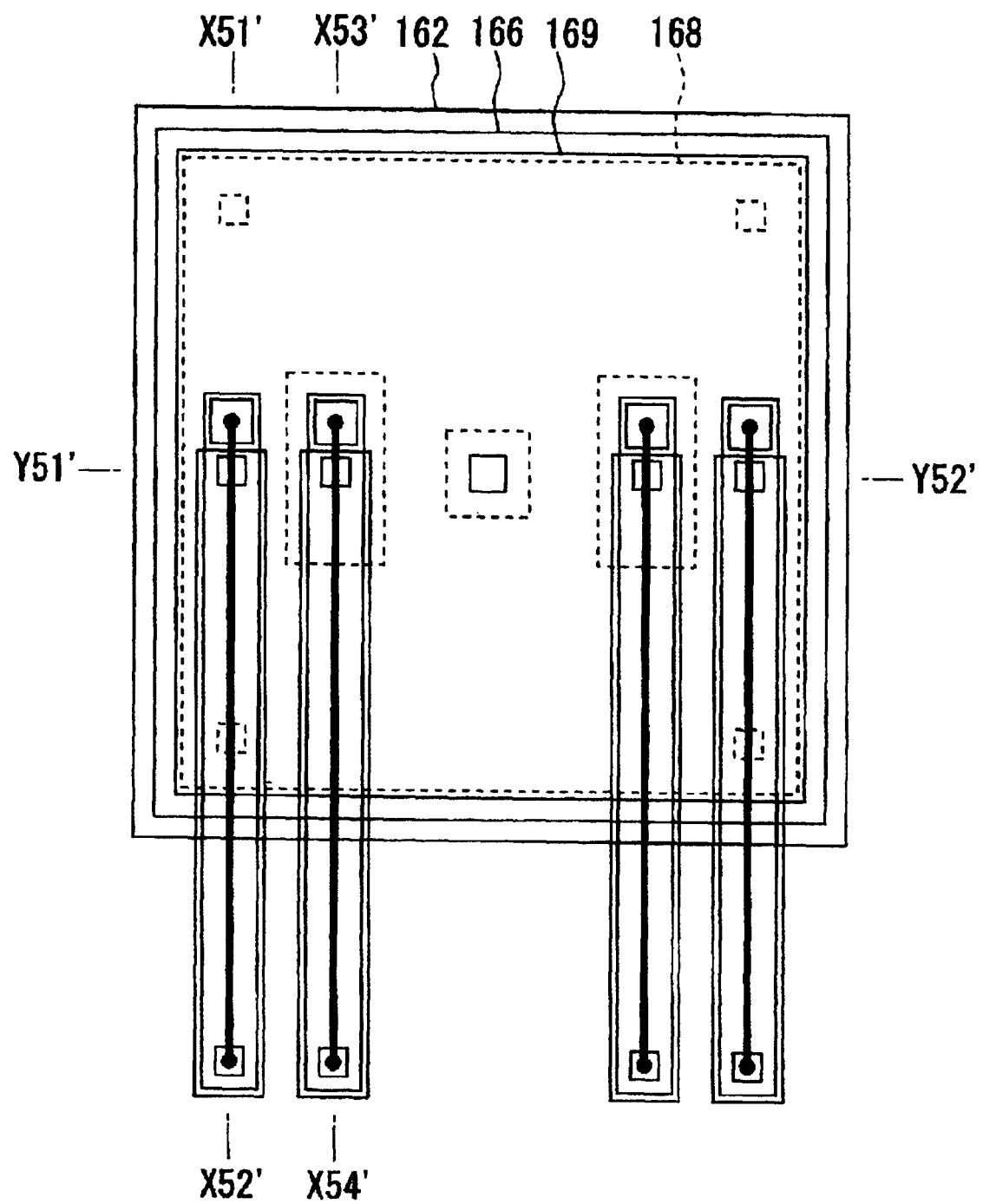
FIG. 55 is a schematic plan view showing results of a step, subsequent to the step shown in FIG. 54, in the method for fabricating a radiation detector according to the sixth representative embodiment.
Figure 56:
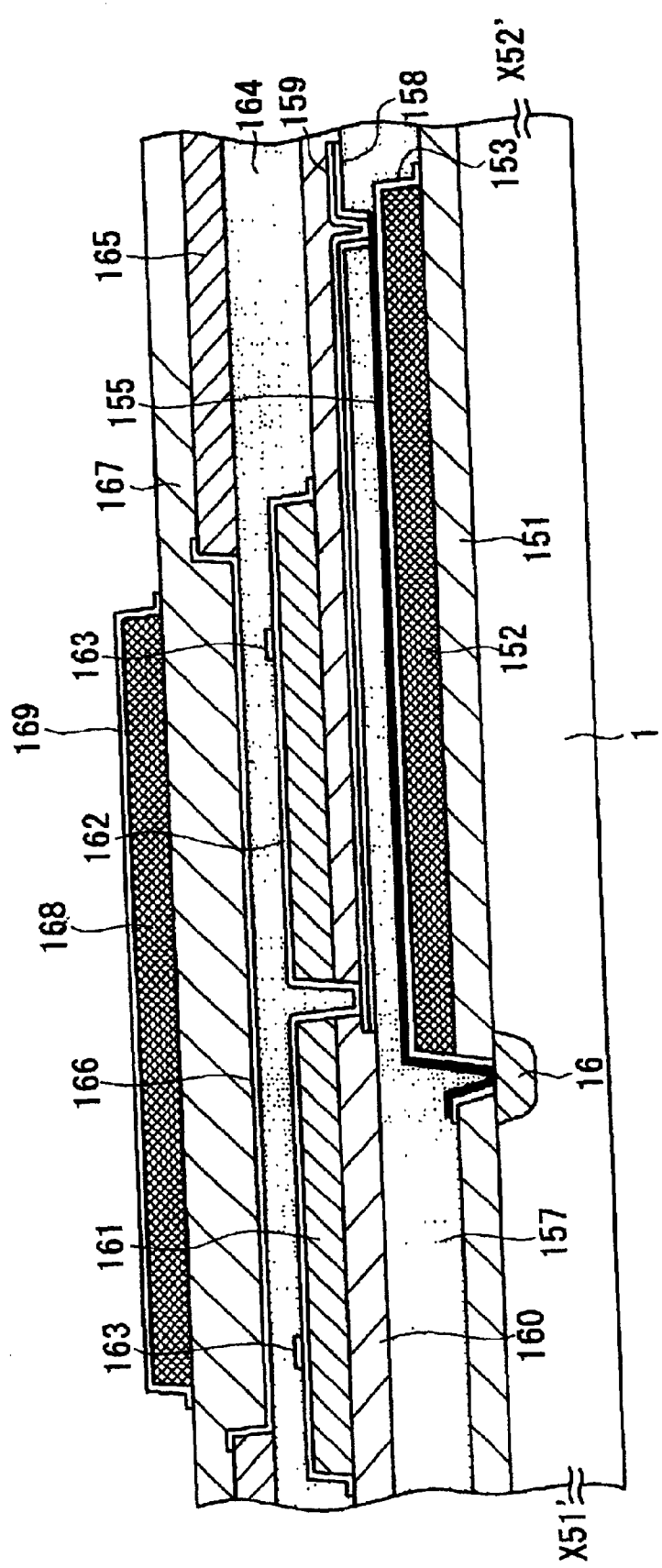
FIG. 56 is a schematic elevational section along the line X51'-X52' in FIG. 55.
Figure 57:
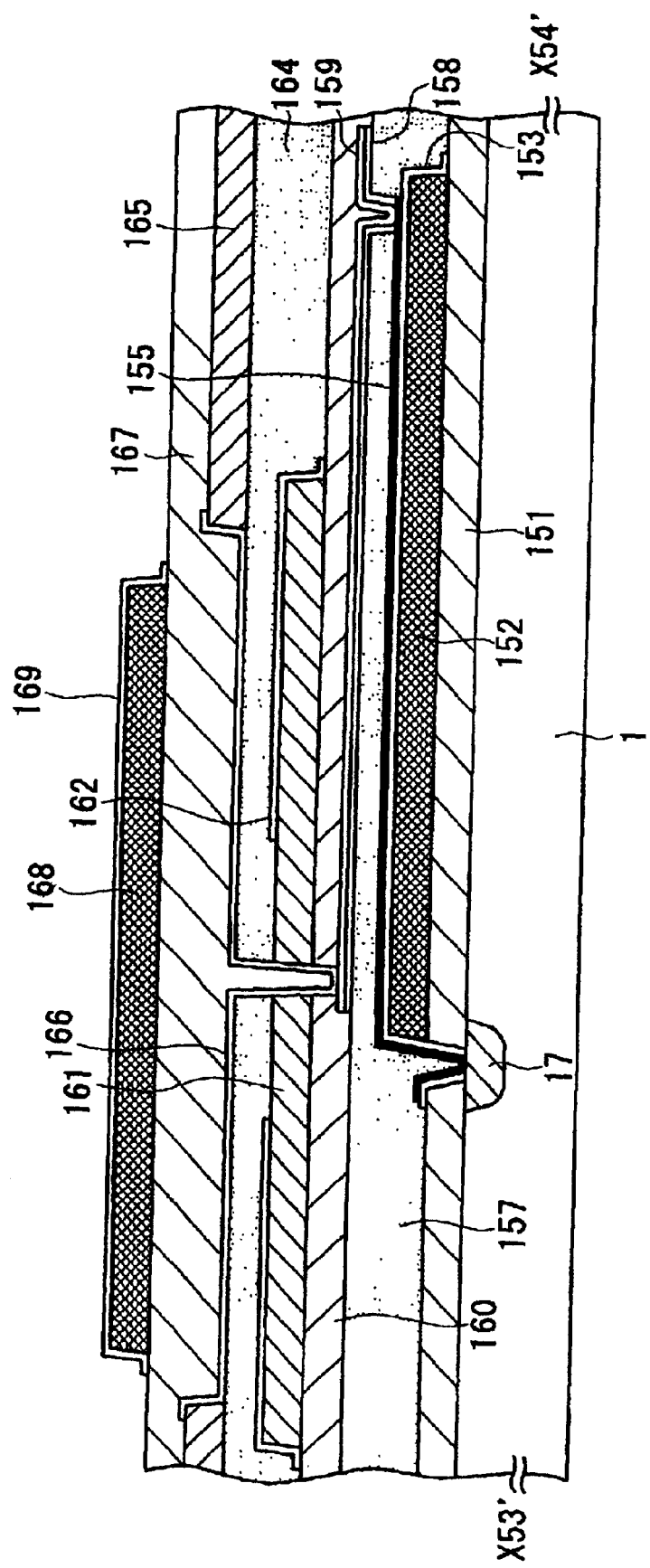
FIG. 57 is a schematic elevational section along the line X53'-X54' in FIG. 55.
Figure 58:
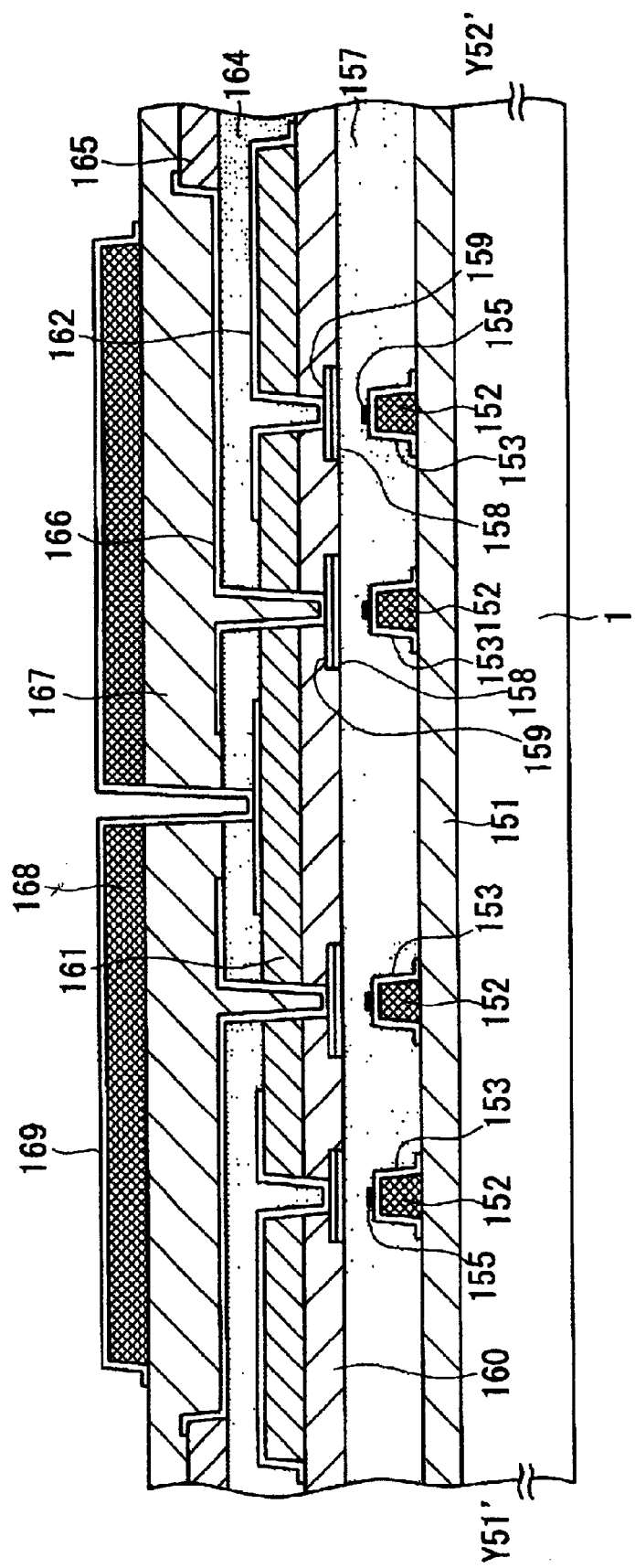
FIG. 58 is a schematic elevational section along the line Y51'-Y52' in FIG. 55.

An exemplary method for manufacturing the radiation detector of this embodiment is described below with reference to FIGS. 43–58. FIGS. 43 and 45–55 are respective schematic plan views illustrating the results of respective steps in the method. FIG. 44 is a schematic elevational section along the line X70–X71 in FIG. 43. With respect to FIG. 55, FIG. 56 is a schematic sectional drawing along the line X51'–X52', FIG. 57 is a schematic elevational section along the line X53'–X54', and FIG. 58 is a schematic elevational section along the line Y51'–Y52'. In these drawings, only one exemplary pixel is shown.

In a first step, a silicon (Si) substrate 1 is prepared in which diffusion layers 16, 17 and a readout circuit (not shown) have been formed. A "temporary" resist layer 151 is applied to the entire surface of the substrate 1. By photolithography, openings 151a are formed in the resist 151 at locations that correspond to respective locations of the contact points 2a, 6a for the legs 2, 6, respectively, as well as respective contact points for the legs 3, 7. Next, the entire surface of the substrate, in the condition shown in FIG. 43, is coated with a sacrificial polyimide film 152 applied by spin coating or the like. Portions of the polyimide film 152 (including polyimide film deposited over the openings 151a) are removed by photolithography and etching, leaving islands of polyimide film 152 in regions corresponding to the planar portions of the legs 2, 3, 6, 7 (FIGS. 43 and 44).

Figure 45:
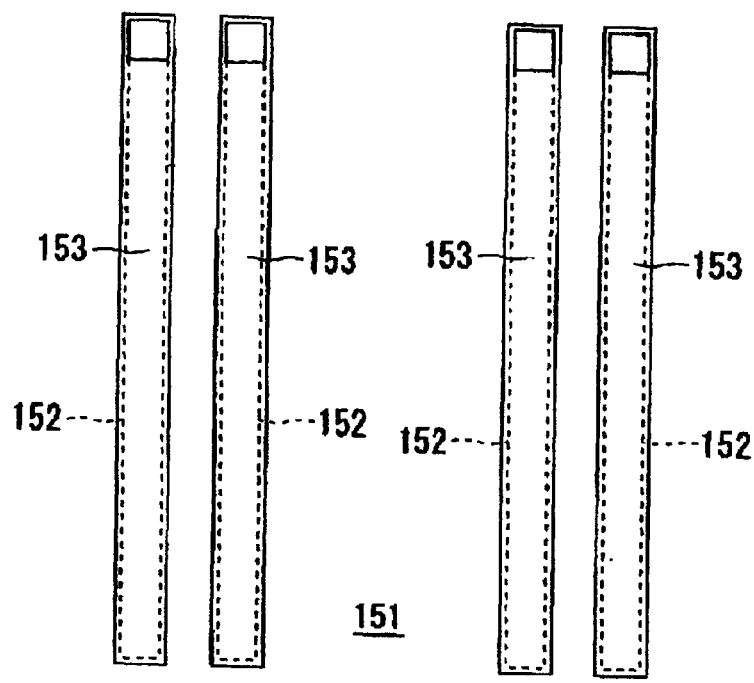
FIG. 45 is a schematic plan view showing results of a step, subsequent to the step shown in FIG. 43, in the method for fabricating a radiation detector according to the sixth representative embodiment.

Next, a layer 153 of SiN, destined to become the legs 2, 3, 6, 7, is deposited by P-CVD or the like. The SiN layer 153 is patterned by photolithography and etching to define the respective profiles of the legs 2, 3, 6, 7 (FIG. 45). To form side portions and (optionally) edge portions, in addition to the planar portions of the legs, the regions of the SiN layer 153 left after patterning are slightly larger than the respective polyimide islands 152.

Figure 46:
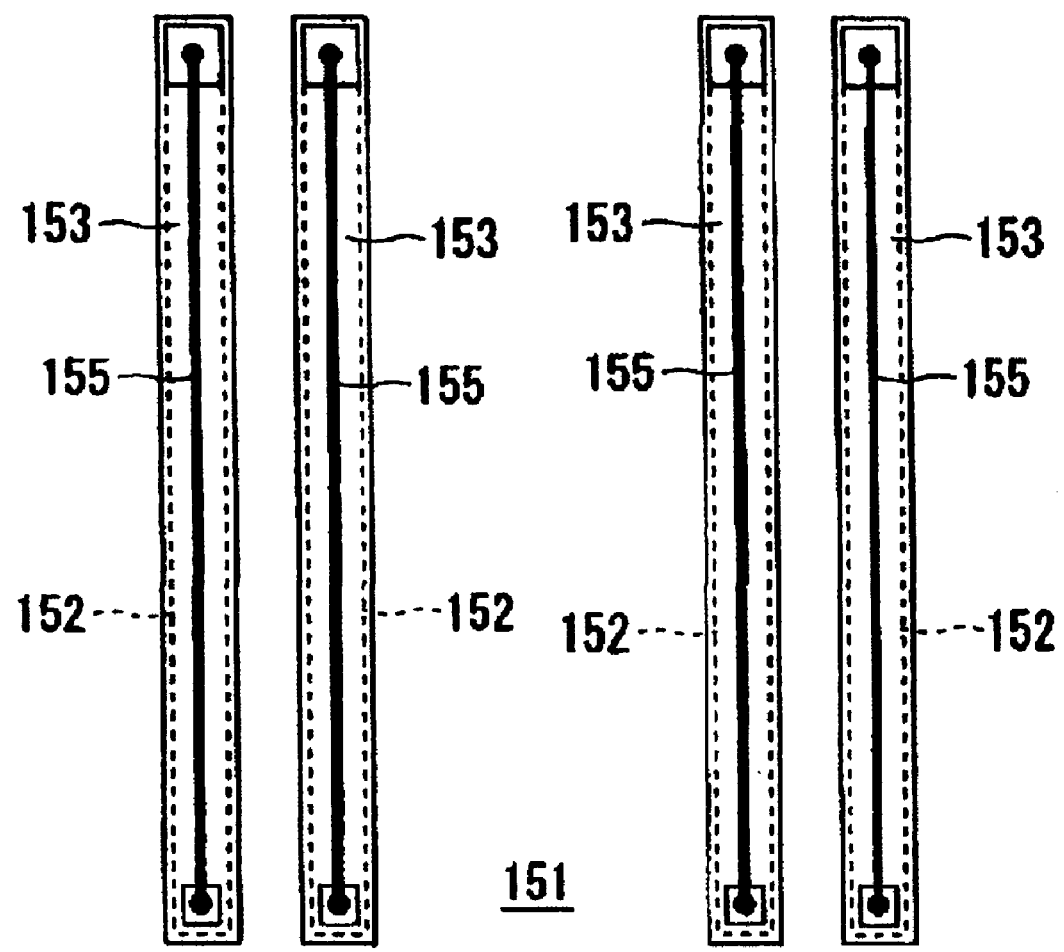
FIG. 46 is a schematic plan view showing results of a step, subsequent to the step shown in FIG. 45, in the method for fabricating a radiation detector according to the sixth representative embodiment.

Next, openings are formed, by photolithography and etching, in the SiN layer 153 that are destined to become respective connection openings for the wiring layers 31, 33, 41, 43. These openings are formed at the contact points 2a, 6a on the legs 2, 6, respectively, and at contact points on the legs 3, 7 by photolithography and etching. A layer 155 of titanium (Ti), destined to become the wiring layers 31, 33, 41, 43, is deposited by vapor deposition or the like. The titanium layer 155 is patterned by photolithography and etching in the desired respective profiles of the wiring layers 31, 33, 41, 43 (FIG. 46). The entire surface of the substrate, in the condition shown in FIG. 46, is coated with a sacrificial polyimide film 157 applied by spin coating or the like. Openings are formed, by photolithography and etching, in the polyimide film 157 at respective locations corresponding to the respective locations of the connectors 80–83 are formed in the polyimide film 157. Next, a layer 158 of SiN, destined to become the "lower" film 21 of the displaceable members 4, 5, 8, 9 and the connectors 80–83, is deposited by P-CVD or the like. The SiN layer 158 is patterned by photolithography and etching to the desired profiles of the lower film 21. Openings, destined to become the connection openings to the Ti layer 155 at the connectors 80–83, are formed in the SiN layer 158. Then, an Al layer 159, destined to become the connectors 80–83 and the "upper" film 22 of the displaceable members 4, 5, 8, 9, is deposited by vapor deposition or the like. The Al layer 159 is patterned by photolithography and etching in the desired profiles of the upper films 22 (FIG. 47).

Figure 47:
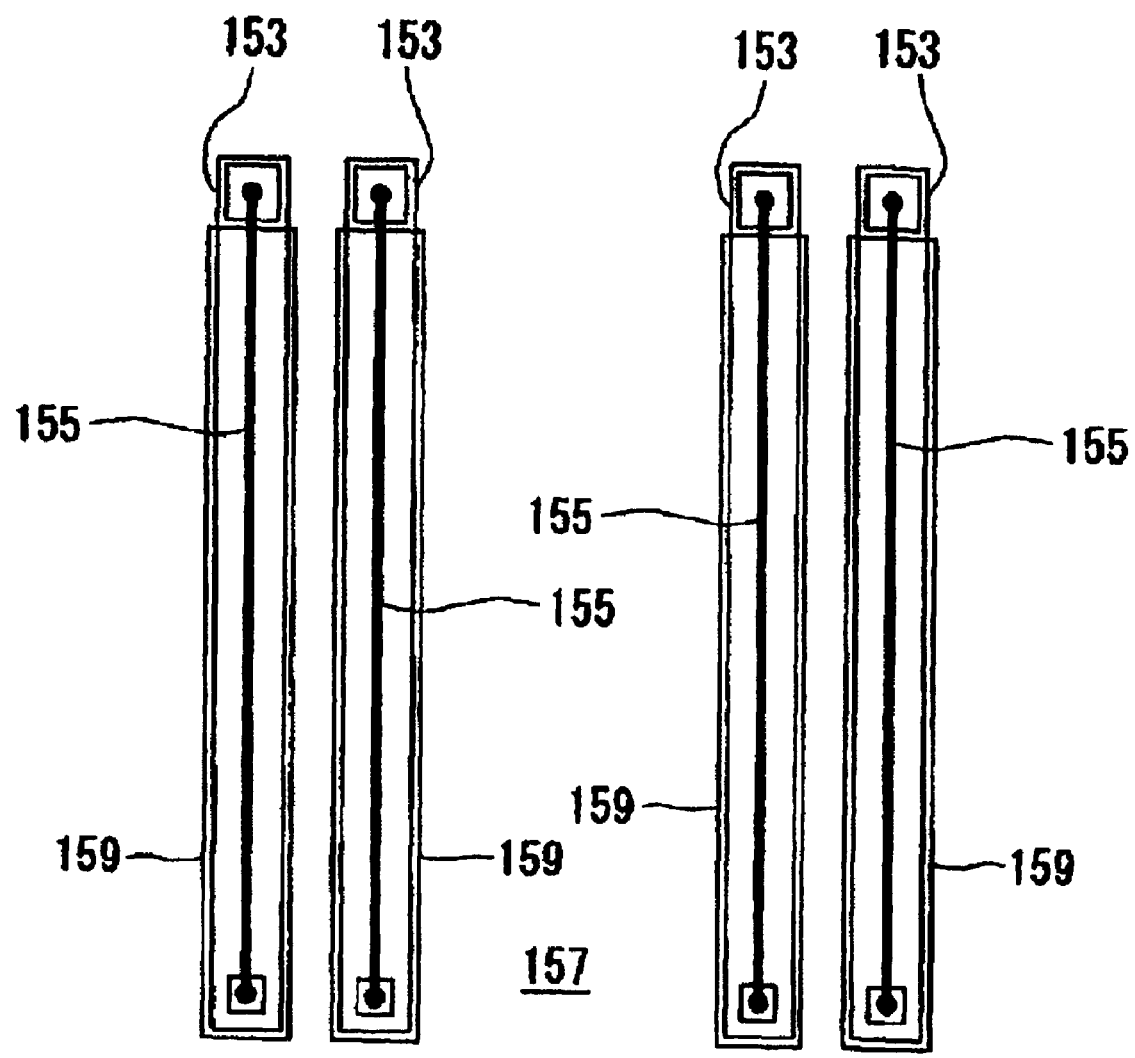
FIG. 47 is a schematic plan view showing results of a step, subsequent to the step shown in FIG. 46, in the method for fabricating a radiation detector according to the sixth representative embodiment.

In FIG. 47, lines corresponding to hidden structure (e.g., obscured by the polyimide film 157) and that otherwise would be denoted by dashed lines are shown using solid lines. Actual structure can be ascertained from FIGS. 56–58.

Figure 48:
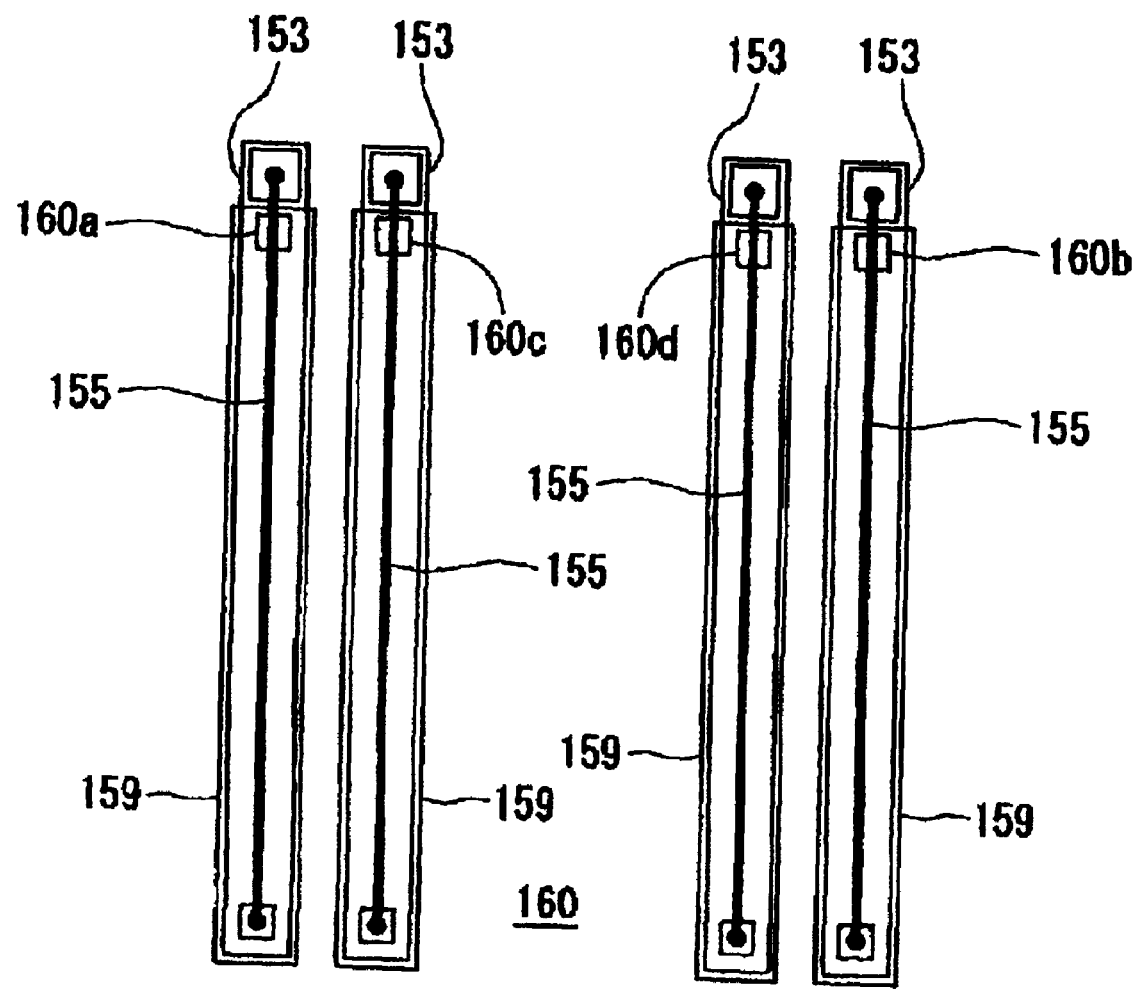
FIG. 48 is a schematic plan view showing results of a step, subsequent to the step shown in FIG. 47, in the method for fabricating a radiation detector according to the sixth representative embodiment.

A "temporary" layer 160 of resist is applied to the entire surface of the substrate, in the condition shown in FIG. 47. Openings 160a–160d are formed, by photolithography and etching, in the resist layer 160 that correspond with the connectors 70–73 (FIG. 48). In FIG. 48, lines corresponding to hidden structure (e.g., obscured by the resist layer 160) and that otherwise would be denoted by dashed lines are shown using solid lines. Actual structure can be ascertained from FIGS. 56–58.

Figure 49:
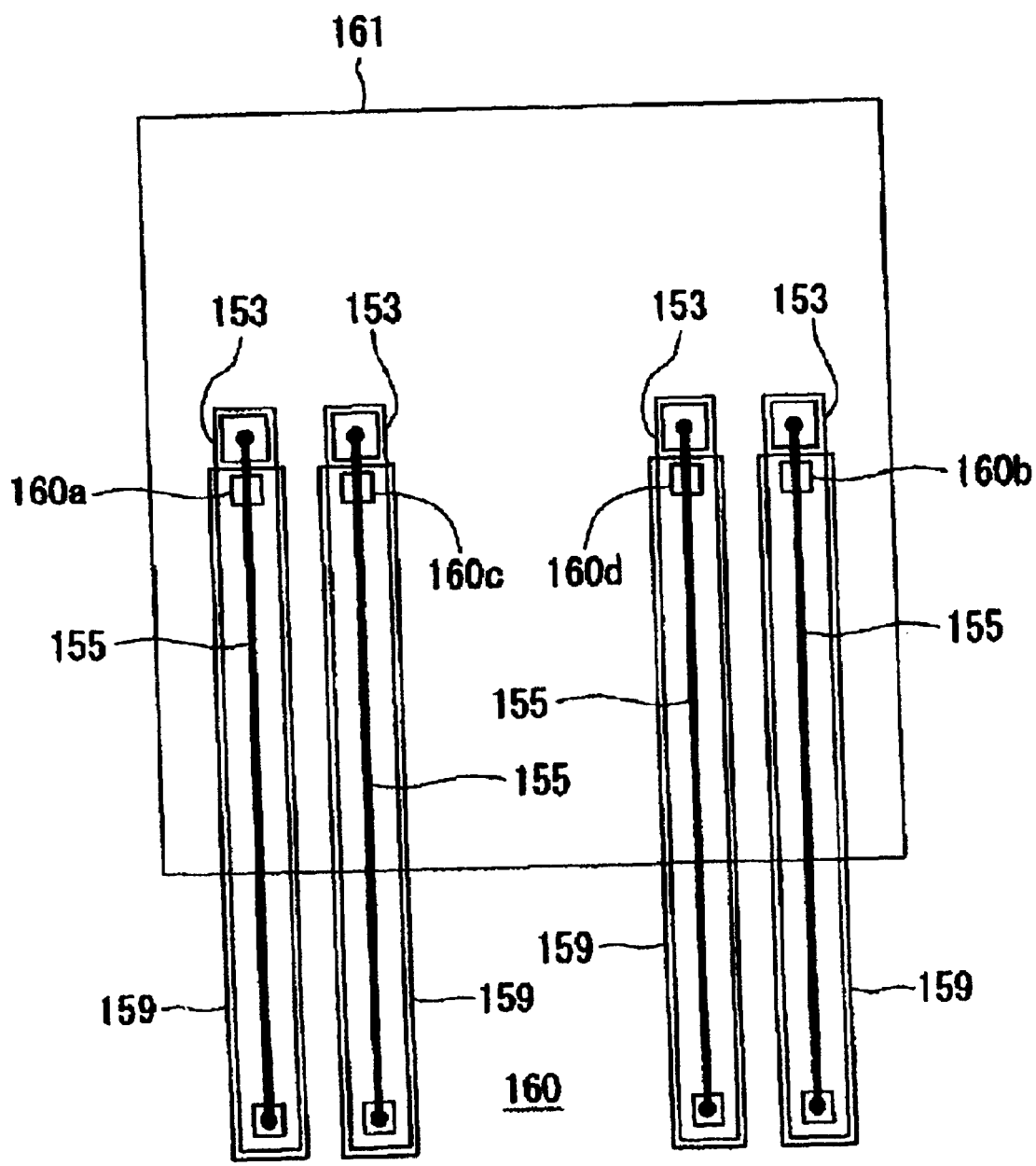
FIG. 49 is a schematic plan view showing results of a step, subsequent to the step shown in FIG. 48, in the method for fabricating a radiation detector according to the sixth representative embodiment.

Next, the entire surface of the substrate, in the condition shown in FIG. 48, is coated with a sacrificial polyimide film 161 applied by spin coating or the like. Portions of the polyimide film 161 (including respective regions corresponding to the openings 160a–160d) are removed by photolithography and etching. After such patterning, an island of the polyimide film 161 is left in a region corresponding to the planar portion 10a of the response electrode 10 (FIG. 49). In FIG. 49, lines corresponding to hidden structure (e.g., obscured by the polyimide layer 161) and that otherwise would be denoted by dashed lines are shown using solid lines. Actual structure can be ascertained from FIGS. 56–58.

A layer 162 of Al, destined to become the response electrode 10 and connectors 70, 71, is deposited by vapor deposition or the like. The Al layer 162 is patterned by photolithography and etching to the desired profiles of the response electrode 10. Patterning of the Al layer 162 is performed in a manner by which remaining regions of the Al layer 162 are slightly larger than the underlying islands of the polyimide layer 161. Thus, the planar portions 10a, side portions 10b, and (optionally) edge portions 10c of the response electrode 10 are formed. Next, a layer 163 of SiN, destined to become the insulating film 15, is deposited by P-CVD or the like. The SiN layer 163 is patterned by photolithography and etching to define the desired regions of insulating film 15 (FIG. 50).

Figure 50:
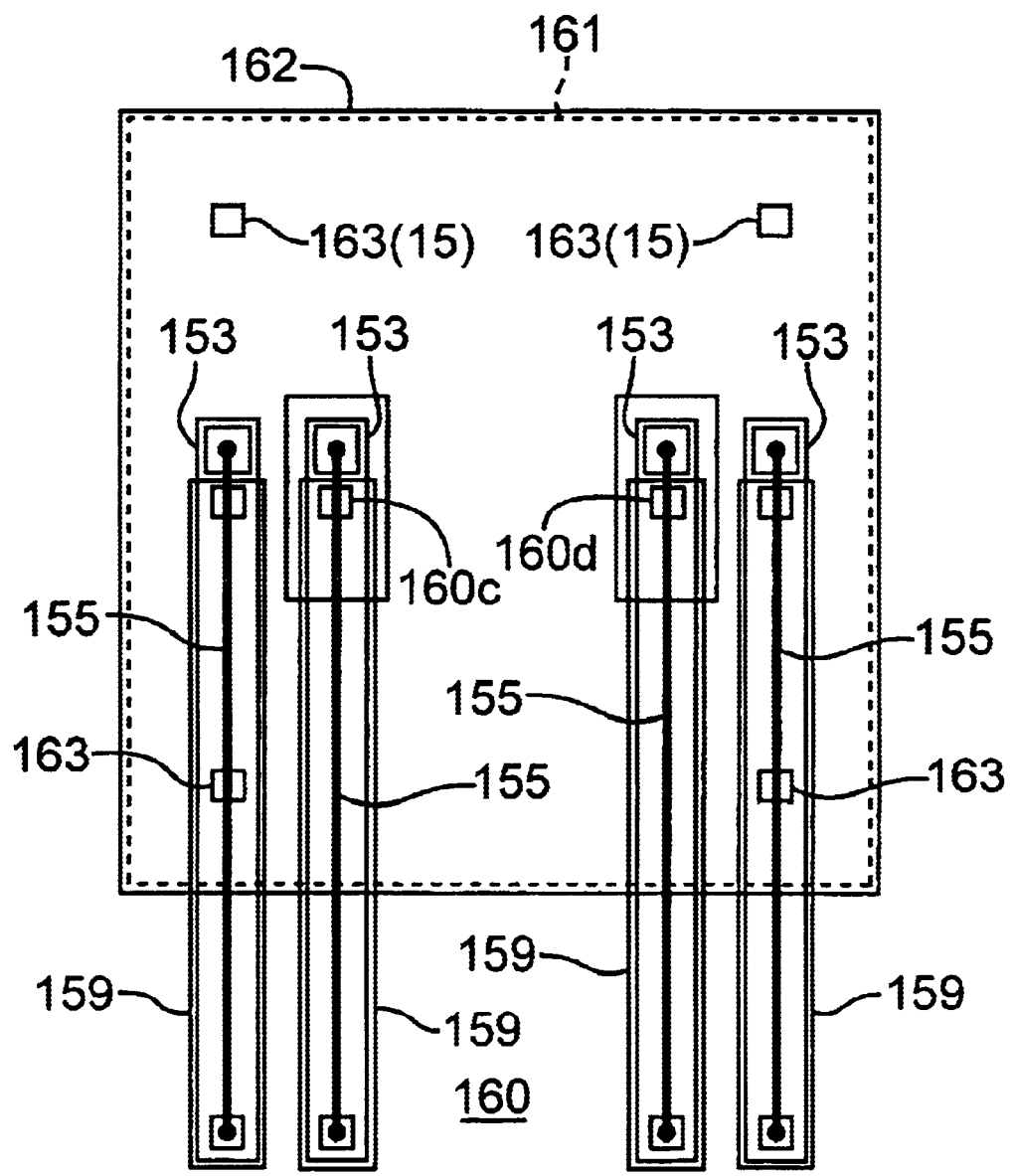
FIG. 50 is a schematic plan view showing results of a step, subsequent to the step shown in FIG. 49, in the method for fabricating a radiation detector according to the sixth representative embodiment.
Figure 51:
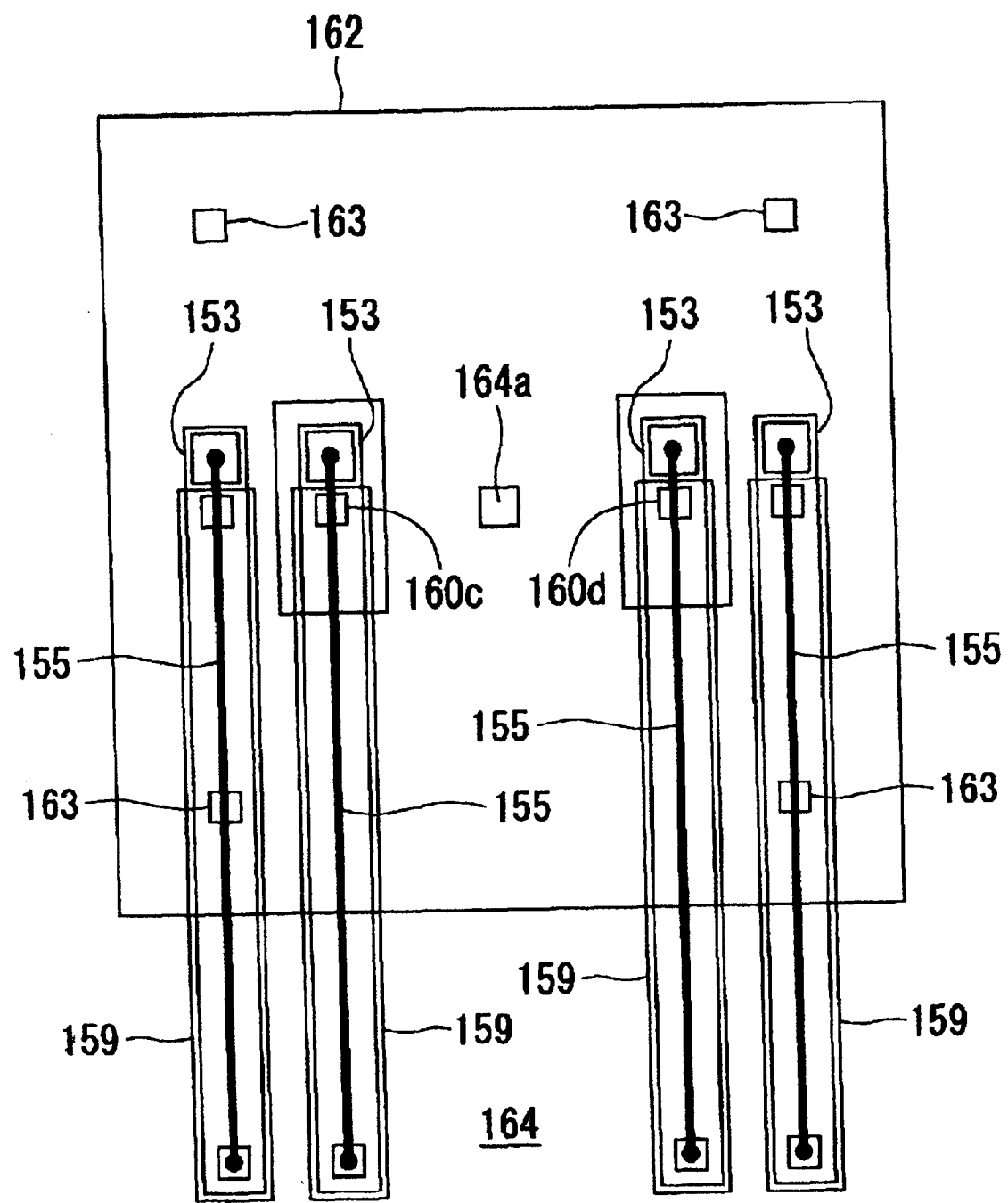
FIG. 51 is a schematic plan view showing results of a step, subsequent to the step shown in FIG. 50, in the method for fabricating a radiation detector according to the sixth representative embodiment.

Next, the entire surface of the substrate, in the condition shown in FIG. 50, is coated with a sacrificial polyimide film 164, applied by spin coating or the like. An opening 164a, corresponding to the connector 74, is formed in the polyimide layer 164 by photolithography and etching. In the same step, any polyimide film 164 that has entered the openings 160c, 160d is removed (FIG. 51). In FIG. 51, lines corresponding to hidden structure (e.g., obscured by the polyimide layer 164) and that otherwise would be denoted by dashed lines are shown using solid lines. Actual structure can be ascertained from FIGS. 56–58.

Figure 52:
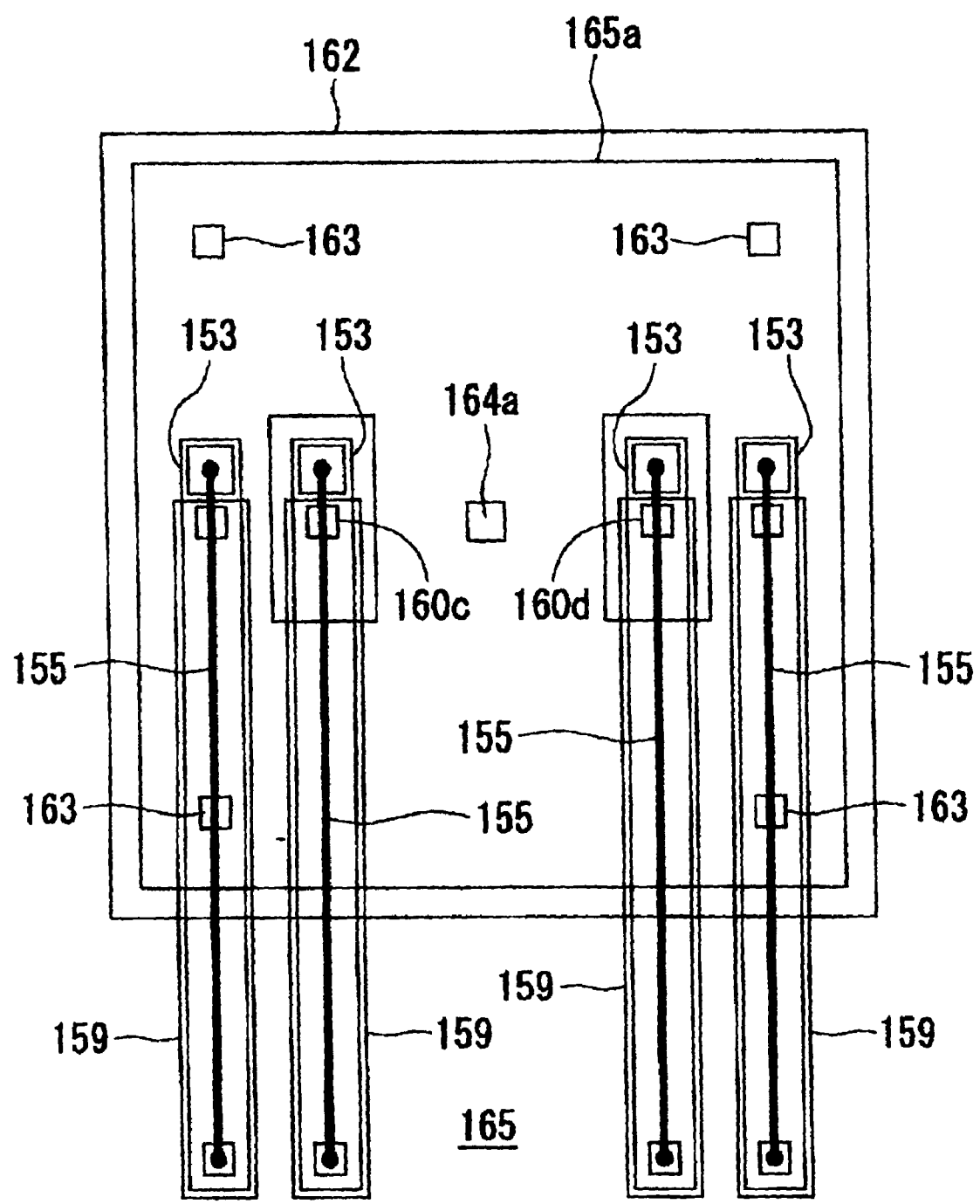
FIG. 52 is a schematic plan view showing results of a step, subsequent to the step shown in FIG. 51, in the method for fabricating a radiation detector according to the sixth representative embodiment.

A "temporary" resist layer 165 is applied to the entire surface of the substrate, in the condition shown in FIG. 51. An opening 165a, corresponding to the planar portion of the reference electrode 11, is formed in the resist 165 by photolithography and etching (FIG. 52). In the same step, any resist 165 that has entered the openings 160c, 160d, and 164a is removed. In FIG. 52, lines corresponding to hidden structure (e.g., obscured by the resist layer 165) and that otherwise would be denoted by dashed lines are shown using solid lines. Actual structure can be ascertained from FIGS. 56–58.

A layer 166 of Al, destined to become the reference electrode 11 and connectors 72, 73, is deposited by vapor deposition or the like. The Al layer is patterned by photolithography and etching into the profile of the reference electrode 11 (FIG. 53). As a result of this patterning, areas of the Al layer 166 that are left are sized slightly larger than the opening 165a in the resist 165. As a result, the planar portion 11a, side portions 11b, and (optionally) edge portions 11c of the reference electrode 11 are formed (FIGS. 56–58).

Next, the entire surface of the substrate, in the condition shown in FIG. 53, is coated with a sacrificial polyimide film 167 applied by spin coating or the like. Any of the polyimide film 167 that has entered the opening 164a is removed by photolithography and etching. A "temporary" layer 168 of resist is applied to the entire surface of the substrate, in this condition. All of the resist 167 is removed (including an area corresponding to the opening 164a), by photolithography and etching, except for an island of resist 168 that corresponds with the planar portion 12a of the radiation absorber 12 (FIG. 54).

A layer 169 of SiN, destined to become the radiation absorber 12 and the connector 74, is deposited by P-CVD or the like. The SiN layer 169 is patterned by photolithography and etching into the profile of the radiation absorber 12 (FIGS. 55–58). The area of the SiN layer 169 that is left after patterning is slightly larger than the corresponding region of the resist layer 168. Thus, the planar portion 12a, side portions 12b, and (optionally) edge portions 12c of the radiation absorber 12 are formed.

Finally, the substrate in this condition is cut into individual chips by dicing or the like. All the "temporary" layers of resist 151, 160, 165, 168 and the sacrificial layers of polyimide 152, 157, 161, 164, 167 are removed by ashing or the like to complete fabrication of the radiation detector of this embodiment.

This embodiment yields the same benefits as the first representative embodiment. In addition, in this embodiment, the legs 2, 3, 6, 7, displaceable members 4, 5, 8, 9, response electrode 10, reference electrode 11, and radiation absorber 12 are "stacked" in the Z-axis direction. As a result, the respective surface areas of the radiation absorber 12 and the electrodes 10, 11 can be made larger within a given pixel region, to improve detection sensitivity. This embodiment also reduces lateral spread of the overall detector, thereby producing pixel structures having good overall structural balance and high mechanical strength, while improving the fill factor of the detector compared to conventional detectors.

It will be understood that modifications, such as those described above, by which the first representative embodiment was modified to yield the third through fifth representative embodiments can be made in a similar manner to the sixth representative embodiment.

With a radiation detector according to any of the embodiments described above, the inter-electrode gap can be set to a desired distance, thereby enabling desired sensitivity characteristics and dynamic range in radiation detection to be achieved.

In addition, with any of the embodiments described above, changes in the electrical capacitance between the electrodes due to changes in the ambient temperature can be suppressed better than with conventional radiation detectors. Hence, even when strict temperature control of the detector is not performed, radiation detection is performed with greater accuracy than with conventional detectors.

Seventh Representative Embodiment

Figure 59:
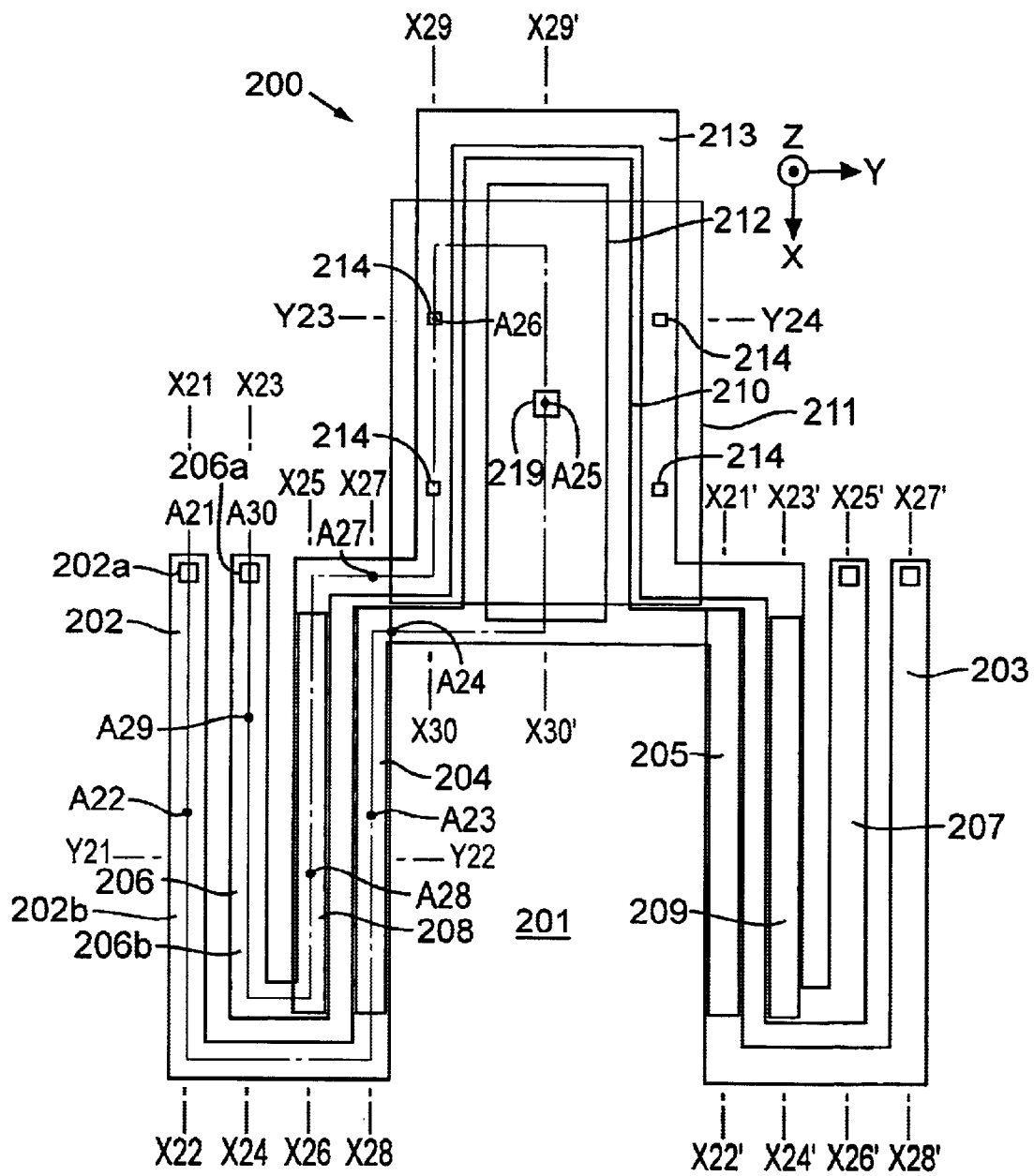
FIG. 59 is a schematic plan view of a unit pixel of a seventh representative embodiment of a radiation detector according to the invention.

FIG. 59 is a schematic plan view showing a unit pixel (unit element) of a radiation detector 200 according to this embodiment. To aid the discussion, in FIG. 59, hidden lines that otherwise would be indicated as broken lines, and lines denoting a difference in "height" (elevation from the plane of the page) have been omitted. The mutually orthogonal X-axis, Y-axis, and Z-axis referred to below are indicated in FIG. 59.

Figure 60:
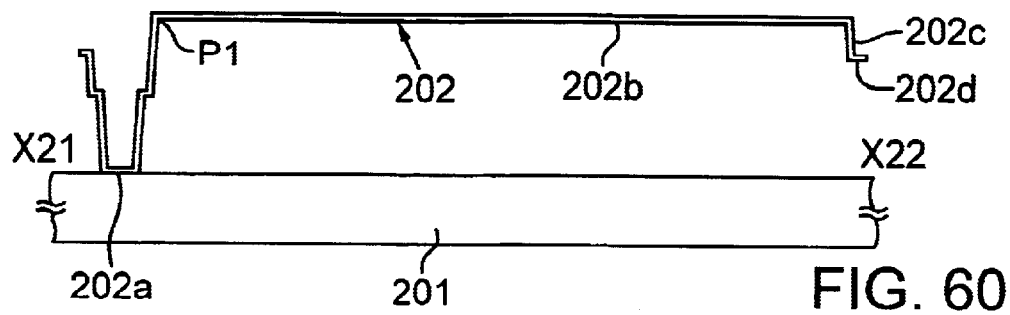
FIG. 60 is a schematic elevational section along the line X21–X22 in FIG. 59.
Figure 61:
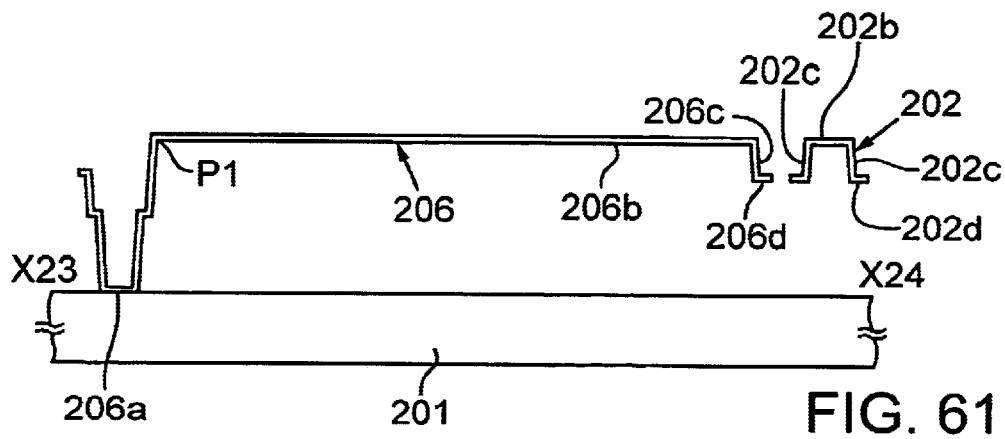
FIG. 61 is a schematic elevational section along the line X23–X24 in FIG. 59.
Figure 62:
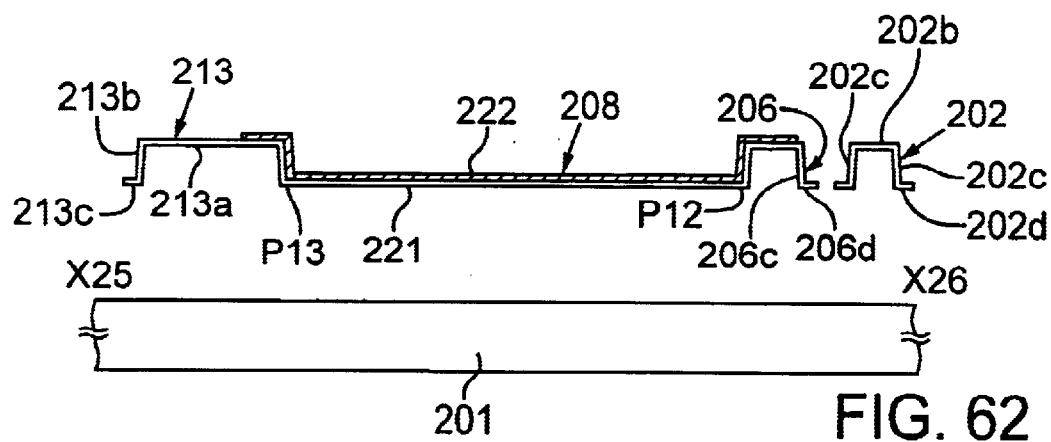
FIG. 62 is a schematic elevational section along the line X25–X26 in FIG. 59.
Figure 63:
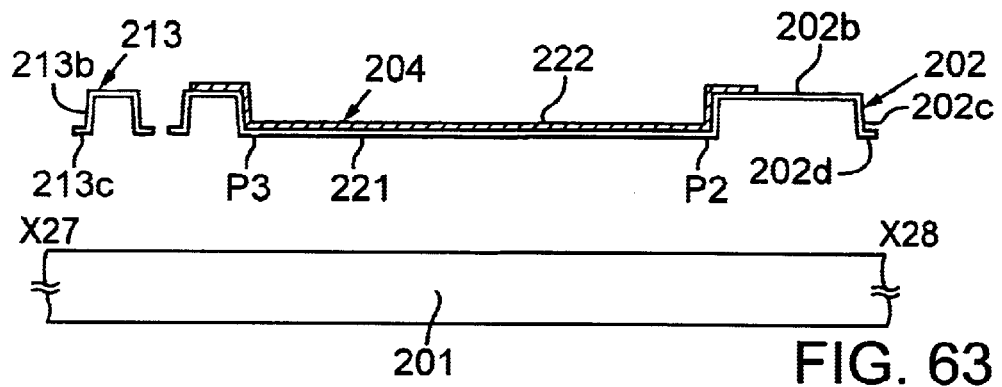
FIG. 63 is a schematic elevational section along the line X27–X28 in FIG. 59.
Figure 64:
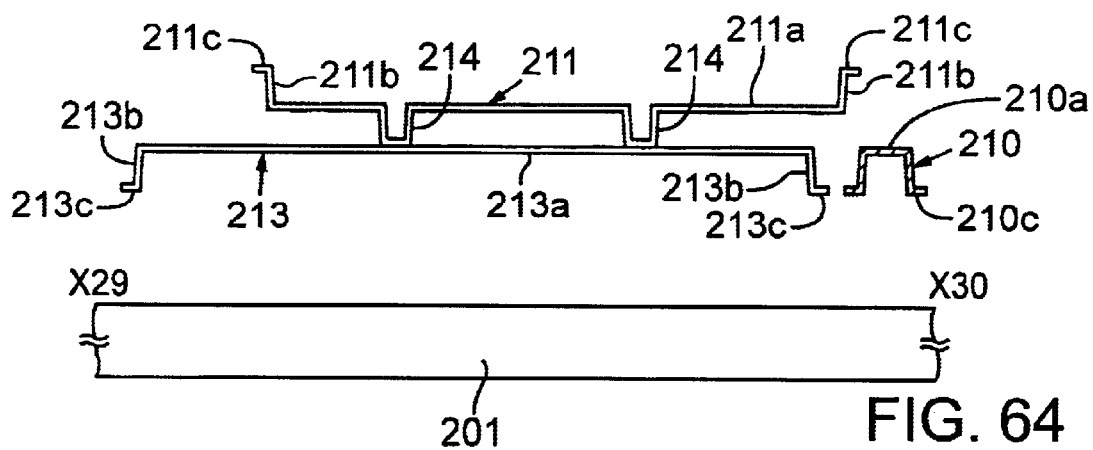
FIG. 64 is a schematic elevational section along the line X29–X30 in FIG. 59.
Figure 65:
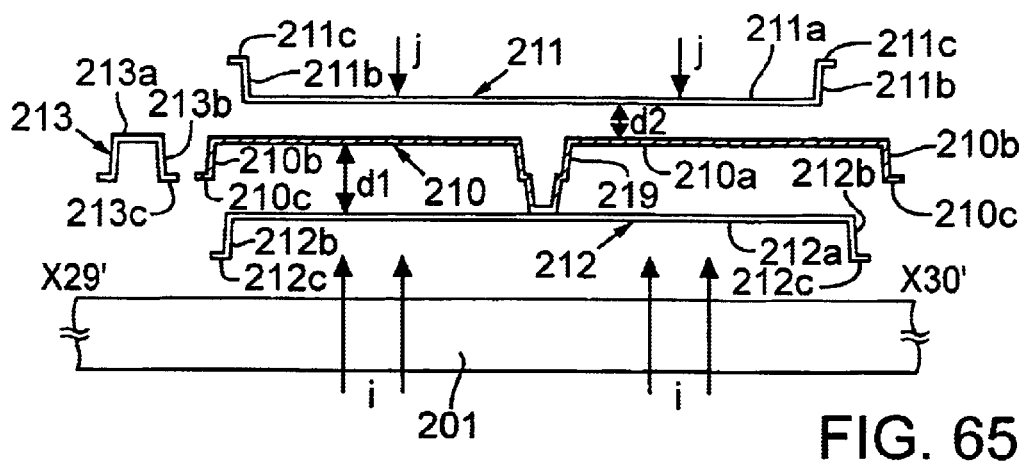
FIG. 65 is a schematic elevational section along the line X29'–X30' in FIG. 59.
Figure 66:
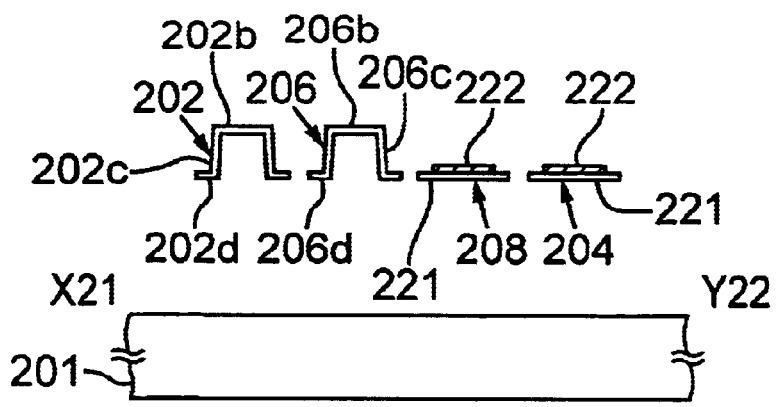
FIG. 66 is a schematic elevational section along the line Y21–Y22 in FIG. 59.
Figure 67:
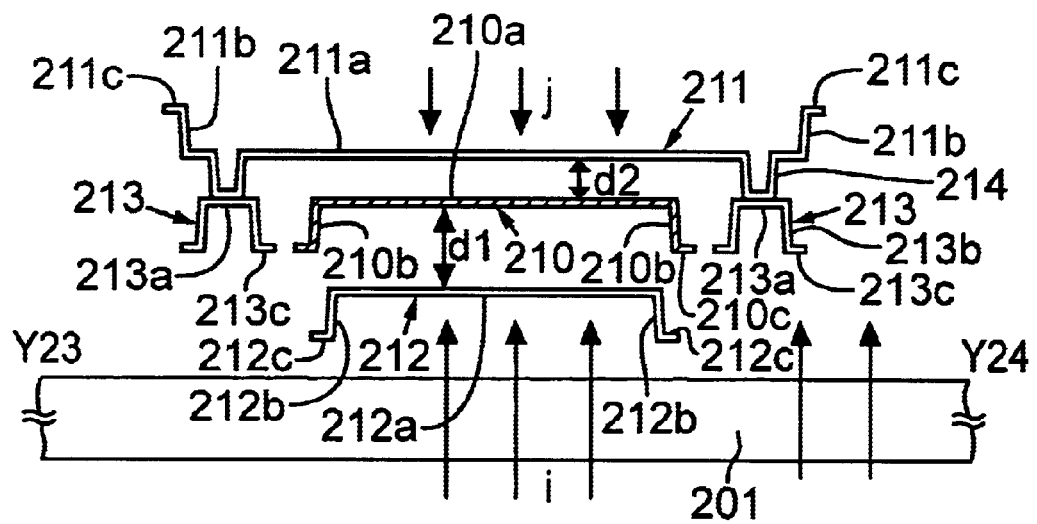
FIG. 67 is a schematic elevational section along the line Y23–Y24 in FIG. 59.
Figure 68:
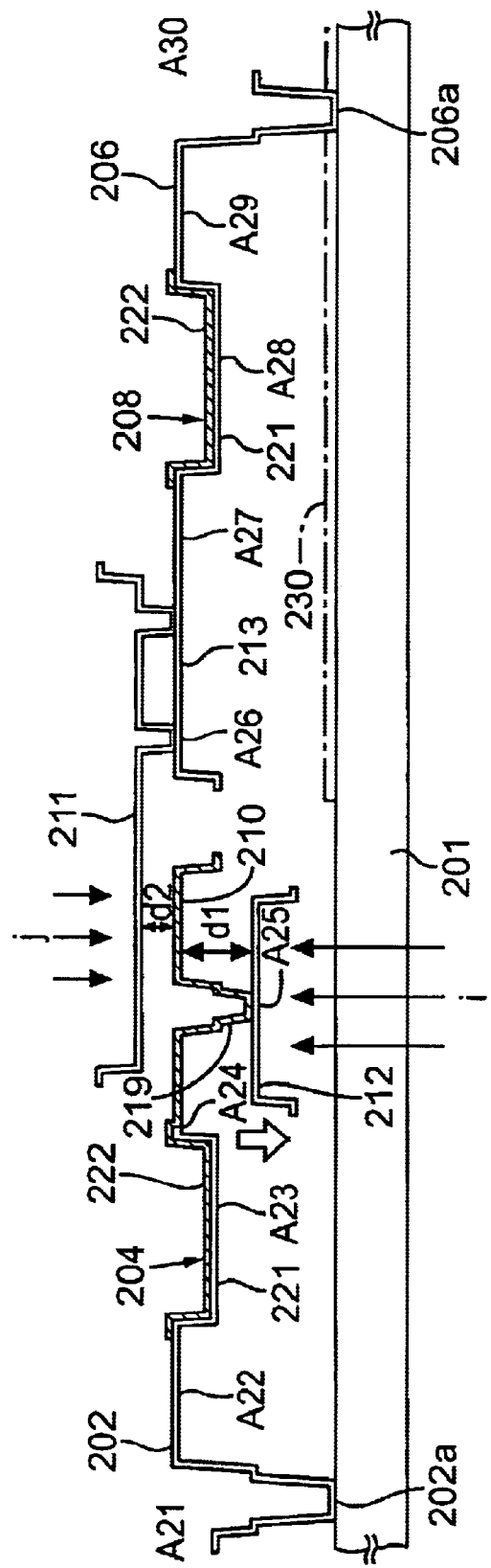
FIG. 68 is a schematic elevational section along the line A21–A30 in FIG. 59.

FIG. 60 is a schematic elevational section along the line X21–X22 in FIG. 59. FIG. 61 is a schematic elevational section along the line X23–X24 in FIG. 59. FIG. 62 is a schematic elevational section along the line X25–X26 in FIG. 59. FIG. 63 is a schematic elevational section along the line X27–X28 in FIG. 59. FIG. 64 is a schematic elevational section along the line X29–X30 in FIG. 59. FIG. 65 is a schematic elevational section along the line X29'–X30' in FIG. 59. FIG. 66 is a schematic elevational section along the line Y21–Y22 in FIG. 59. FIG. 67 is a schematic elevational section along the line Y23–Y24 in FIG. 59. FIG. 68 is a schematic elevational section along the convoluted line A21–A30 in FIG. 59. Points A22–A29 in FIG. 68 correspond to the points A22–A29 in FIG. 59. Although not illustrated in these figures, and with respect to FIG. 59, a schematic elevational section along the line X21'–X22' would be similar to FIG. 63, a schematic elevational section along the line X23'–X24' would be similar to FIG. 62, a schematic elevational section along the line X25'–X26' would be similar to FIG. 61, and a schematic elevational section along the line X27'–X28' would be similar to FIG. 60.

The radiation detector 200 of this embodiment comprises a substrate 201. The substrate 201 is understood to be a substantially planar body presenting a major surface extending parallel with the X-Y plane, upon which various layers comprising the structure of the radiation detector are formed during respective fabrication steps. The substrate 201 typically is made of silicon or other suitable material that desirably is transmissive to the incident radiation (e.g., IR radiation). In the depicted pixel, (FIG. 59), two first legs 202, 203 extend substantially parallel to the substrate 201 "up" from the substrate 201 in the Z-axis direction. The first legs 202, 203 support respective first displaceable members 204, 205 relative to the substrate 201. Similarly, two second legs 206, 207 extend substantially parallel to the substrate 201 "up" from the substrate 201 in the Z-axis direction. The second legs 206, 207 support respective second displaceable members 208, 209 relative to the substrate 201. A reflector 210, serving as a first optically effecting element, is attached to the first displaceable members 204, 205. Similarly, a half-mirror 211, serving as a second optically effecting element, is attached to the second displaceable members 208, 209. The half-mirror 211 faces the reflector 210 but is separated therefrom by a distance $d_2$ in the Z-axis direction. A radiation absorber 212 (that absorbs incident radiation i, such as IR radiation) is thermally connected to the first displaceable members 204, 205 but substantially not thermally connected to the second displaceable members 208, 209.

As shown in FIGS. 65 and 67–68, the half-mirror 211 receives readout light j from "above" the substrate 201, and reflects only a portion of the incident readout light j. The configuration of the optically effecting components in this embodiment is such that the half-mirror 211 and reflector 210 receive readout light j from "above." As a result of receiving the readout light j, a change (corresponding to the relative displacement between the half-mirror 211 and the reflector 210) is imparted to the received readout light j, and this changed readout light is emitted. More specifically, the half-mirror 211 and reflector 210 reflect the readout light as interference light having an interference intensity that corresponds to the distance $d_2$.

The depicted pixel in FIG. 59 indicates that each constituent pixel in the radiation detector 200 of this embodiment is bilaterally symmetrical. Hence, the legs 203, 207 and displaceable members 205, 209 correspond to the legs 202, 206 and displaceable members 204, 208, respectively. In view of these similarities, description of the legs 203, 207 and displaceable members 205, 209 is omitted in the discussion below. However, it will be understood that discussion below pertaining to the legs 202, 206 and displaceable members 204, 208 also is applicable to the legs 203, 207 and displaceable members 204, 208, respectively.

In this embodiment, two sets (each consisting of two respective legs and two displaceable members) are provided to confer mechanical stability to the pixel structure. More generally, the radiation detector 200 can comprise one or more sets of legs per pixel.

The legs 202, 206 are constructed of a thermally insulative material (e.g., SiN). Desirably, each leg 202, 206 is constructed of the same material and has the same width (in the Y-direction) and thickness (in the Z-direction). The legs 202, 206 are attached to the substrate 201 by respective contact points 202a, 206a. Thus attached to the substrate, the legs 202, 206 have respective planar portions 202b, 206b that extend substantially parallel to the substrate 201. The planar portions 202b, 206b have respective L-shaped configurations in which the respective long portion extends primarily in the X-axis direction. Extending from the planar portions 202b, 206b toward the substrate 201 are respective "vertical" side portions 202c, 206c (FIGS. 60–63 and 66). The side portions 202c, 206c can be edged with respective "horizontal" edge portions 202d, 206d that extend outward from the respective side portion 202c, 206c parallel to the substrate. In an alternative configuration, the edge portions 202d, 206d are deleted.

Since the planar portions 202b, 206b are reinforced structurally by the side portions 202c, 206c, the layers constituting the planar portions 202b, 206b can be made thinner than conventionally, while still providing substantial mechanical strength to the planar portions 202b, 206b. Consequently, deformation of the legs 202, 206 due to insufficient mechanical strength is prevented, and the heat-insulating properties of the legs 202, 206 are increased compared to conventional devices. Since the heat-insulating properties of the leg 202 (and leg 203) are increased, displacement of the displaceable member 204 (and displaceable member 205) accurately corresponds to the amount of incident radiation that is absorbed. This allows the S/N ratio of radiation detection using this embodiment to be increased compared to conventional radiation detectors.

As shown in FIGS. 62 and 63, each of the displaceable members 204, 208 is constructed of two films 221, 222 layered superposedly in the Z-axis direction (the "vertical" direction in the figures). One end of each displaceable member 204, 208 is connected to and supported by a respective leg 202, 206 to form a respective cantilevered structure in which the respective displaceable member 204, 208 is "horizontally" suspended (i.e., "floating") above the substrate 201. The displaceable members 204, 208 extend parallel to each other longitudinally along the X-axis. Thus, in this embodiment, the displaceable members 204, 208 are not arranged superposedly relative to each other when viewed from a Z-axis direction, but rather are disposed side-by-side, as shown in FIG. 59.

The films 221, 222 are constructed of different materials with mutually different coefficients of thermal expansion.

Hence, the displaceable members 204, 208 effectively comprise respective thermally bimorphous structures (also termed "bimetallic" elements). Whenever the coefficient of thermal expansion of the "lower" film 221 is lower than the coefficient of thermal expansion of the "upper" film 222, heating a displaceable member 204, 208 causes the respective displaceable member to bend or deflect "downward" (toward the substrate 201). Conversely, whenever the coefficient of thermal expansion of the lower film 221 is greater than the coefficient of thermal expansion of the upper film 222, heating a displaceable member 204, 208 causes the respective displaceable member to bend or deflect "upward" (away from the substrate). The degree of bending is a function of the amount of heating experienced by the respective displaceable member.

By way of example, in this embodiment, the lower film 221 is SiN and the upper film 222 is Al. As a result, whenever the displaceable members 204, 208 are heated, they bend "downward" (toward the substrate 201). The films 221, 222 constituting the displaceable member 204 are identical to respective films 221, 222 constituting the displaceable member 208. This identity extends not only to respective materials of which the films are made but also to respective widths, lengths, and thicknesses of the films.

The SiN lower film 221 of the displaceable member 204 is formed as an extension of the SiN film used to form the leg 202. Similarly, the SiN lower film 221 of the displaceable member 208 is formed as an extension of the SiN film used to form the leg 206.

The reflector 210 is configured as a metal (desirably Al) layer that is suspended above the substrate 201. To such end, the reflector 210 is attached at respective locations to free ends of the displaceable members 204 and 205 (these "free" ends are opposite respective ends that are connected to the legs 202, 203).

As shown in FIGS. 65 and 67, the reflector 210 comprises a planar portion 210a that extends roughly parallel with the substrate 201 and a "vertical" side portion 210b that extends around nearly the entire periphery of the planar portion 210a. The side portion 210b extends toward the substrate 201. The reflector 210 also can include an edge portion 210c extending outward, parallel to the substrate 201, from the "lower" edge of the side portion 210b. The edge portion 210c is optional and can be omitted. The side portion 210b serves to reinforce the planar portion 210a structurally, allowing the planar portion 210a to be made thinner (and thus with less thermal capacity) than conventionally without sacrificing the strength of the reflector 210.

As shown in FIGS. 59, 64, and 67 the half-mirror 211 is attached at respective locations to free ends of the displaceable members 208, 209 (these free ends are opposite respective ends of the displaceable members that are connected to the legs 206, 207, respectively). More specifically, in this configuration, the half-mirror 211 is attached to a support frame 213 that, in turn, is attached to the free ends. The support frame 213 is configured from a layer of SiN or other suitable thermally insulative material. Thus, the half-mirror 211 is disposed "above" and facing the reflector 210, with a "vertical" distance $d_2$ therebetween. This distance $d_2$ desirably is in the range of $\lambda_0/4$ to $\lambda_0/2$, for example, where $\lambda_0$ is the median wavelength of the desired wavelength band of the readout light j.

During fabrication, the support frame 213 is formed as an extension of the lower SiN films 221 of the displaceable members 208, 209. More specifically, the support frame 213 extends from the free ends of the displaceable members 208, 209, as shown in FIGS. 59, 62–65, and 67. The support frame 213 thus extends in a squared U-shaped profile (FIG. 59) around the periphery of the reflector 210. The support frame 213 includes a planar portion 213a extending roughly parallel to the substrate 201 and a side portion 213b extending along nearly the entire inner and outer periphery of the planar portion 213a. The side portion 213b extends roughly in the Z-axis direction from the planar portion 213a toward the substrate 201. The side portion 213b optionally can be edged with an edge portion 213c that extends parallel to the substrate slightly outward from the side portion 213b. The edge portion 213c may be omitted if desired. Since the planar portion 213a is reinforced structurally by the side portion 213b, the planar portion 213a can be made thinner than conventionally, without sacrificing the mechanical strength of the planar portion 213a.

The half-mirror 211 desirably is made from a film of silicon oxide (which is transmissive to the readout light j). A layer of a metal such as titanium desirably is applied over the silicon oxide film to obtain a desired reflectivity. As shown in FIGS. 64, 65, and 67, the half-mirror 211 defines a planar portion 211a that is roughly parallel with the substrate 201. The half-mirror 211 also includes a side portion 211b extending along nearly the entire edge of the planar portion 211a and projecting roughly in the Z-axis direction from the planar portion 211a. The side portion 211b optionally can be edged with an edge portion 211c that extends parallel to the substrate 201 slightly outward from the side portion 211b. The edge portion 211c can be omitted if desired. Since the planar portion 211a is reinforced structurally by the side portion 211b, the planar portion 211a can be made thinner than conventionally, without sacrificing the mechanical strength of the planar portion 211a.

As shown in FIGS. 59, 64, and 67, the half-mirror 211 is attached at each of its corners to the planar portion 213a of the support frame 213 via respective connecting posts 214 extending from the planar portion of the half-mirror 211. Thus, the half-mirror 211 is attached to the free ends 208, 209 via the support frame 213. The connecting posts 214 are extensions (roughly in the Z-axis direction) of the silicon oxide layer comprising the half-mirror 211.

In this embodiment, the incident radiation i to be detected passes through the substrate 201 from below, and is incident on the radiation absorber 212. For absorbing IR radiation, the radiation absorber 212 comprises a SiN film having a specific thickness and exhibiting partial reflection of the incident radiation i. Desirably, the reflectivity of the radiation absorber 212 to the incident radiation i is approximately 33%. As shown in FIGS. 65 and 67, the radiation absorber 12 defines a planar portion 212a that is roughly parallel with the substrate 201. The radiation absorber 212 also includes a side portion 212b extending along nearly the entire edge of the planar portion 212a and projecting roughly in the Z-axis direction from the planar portion 212a toward the substrate 201. The side portion 212b optionally can be edged with an edge portion 212c that extends parallel to the substrate 201 slightly outward from the side portion 212b. The edge portion 212c can be omitted if desired. Since the planar portion 212a is reinforced structurally by the side portion 212b, the planar portion 212a can be made thinner than conventionally, without sacrificing the mechanical strength of the planar portion 212a.

As shown in FIGS. 59 and 65, the middle of the planar portion 212a of the radiation absorber 212 is attached to the middle of the planar portion 210a of the reflector 210 via a connecting post 219. The radiation absorber 212 is disposed beneath the reflector 210 and separated therefrom by a distance $d_1$. Hence, in this embodiment, the radiation absorber 212 is thermally connected to the displaceable members 204, 205 via the connecting post 219 and the reflector 210. The connecting post 219 is formed by directly extending the aluminum film making up the reflector 210.

The radiation absorber 212 desirably is disposed so that the gap $d_1$ between the radiation absorber 212 and the reflector 210 is substantially equal to $n\lambda_0/4$, where n is an odd number and $\lambda_0$ is the median wavelength of the desired bandwidth of incident radiation i. For example, if $\lambda_0$ is 10 $\mu$m and n=1, then the gap $d_1$ is approximately 2.5 $\mu$m. In this embodiment, the reflector 210 also is used as a reflector that nearly completely reflects the incident radiation i. Hence, the radiation absorber 212 and the reflector 210 define an optical cavity therebetween that enhances absorption of incident radiation even though the thickness and thermal capacity of the radiation absorber 212 are reduced. Also, enhanced absorption of incident radiation provides improved detection response.

The radiation detector 200 according to this embodiment can be provided separately from the reflector 210. In addition, metal black (e.g., gold black) or the like can be used as a radiation absorber instead of the type of radiation absorber 212 discussed above. The metal black can be formed on the lower surface of the reflector 210, wherein incoming radiation to be detected is incident from the underside (as shown) of the substrate 201.

Although not illustrated in the figures, in a radiation detector 200 according to this embodiment, the displaceable members 204, 205, 208, 209, the legs 202, 203, 206, 207, the reflector 210, the half-mirror 211, and the radiation absorber 212 constitute a unit element (pixel). Normally, multiple pixels are arrayed one-dimensionally or two-dimensionally on the substrate 201.

Heat produced by the radiation absorber 212 is transmitted through the connecting post 219 and the reflector 210 to the displaceable members 204, 205. In response to the heat, the displaceable members 204, 205, which are cantilevered, tilt "downward" toward the substrate 201. The resulting degree of tilt of the reflector 210 corresponds to the amount of incident radiation i that was absorbed by the radiation absorber 212. Since the heat produced by the radiation absorber 212 is not transmitted to the displaceable members 208, 209, the displaceable members 208, 209 do not bend or tilt. As a result, the gap $d_2$ between the reflector 210 and the half-mirror 211 changes according to the amount of absorbed incident radiation i. Meanwhile, readout light j is incident from "above." Readout light j reflected from the reflector 210 and from the half-mirror 211 interferes to produce interference light before returning upward. The intensity of this interference light is a function of the gap $d_2$ between the half-mirror 211 and the reflector 210. Hence, the intensity of the interference light is a function of the amount of incident radiation i, which allows (for each pixel) the amount of incident radiation i absorbed by the pixel to be detected as a change in the intensity of the interference light produced by the pixel.

The first displaceable members 204, 205 and the second displaceable members 208, 209 are disposed so as not to overlap each other when viewed from above (i.e., from a position displaced in the Z-axis direction). As a result, the lower films 221 of the first displaceable members 204, 205 can be formed simultaneously with the lower films 221 of the second displaceable members 208, 209. Afterward, the upper films 222 of the first displaceable members 204, 205 can be formed simultaneously with the upper films 222 of the second displaceable members 208, 209. As a result of this simultaneous manufacture, even if the first displaceable members 204, 205 and the second displaceable members 208, 209 initially bend due to stress encountered during the formation of the films 221, 222, the degree of bending will be substantially the same in the first displaceable members 204, 205 as in the second displaceable members 208, 209. Therefore, even if the displaceable members 204, 205, 208, 209 initially bend due to stress encountered during the formation of the films 221, 222, the initial gap between the reflector 210 and the half-mirror 211 can be set consistently to a desired dimension (or positional relationship) regardless of the magnitude of the stress. As a result, the desired characteristics for radiation detection are consistently obtained with this embodiment.

As discussed above, the radiation i is incident from beneath the substrate 201. As indicated by the broken line in FIG. 68, a radiation-blocking film 230 (for blocking IR radiation, the film 230 comprises an Al film or the like) may be formed on the substrate 201 in the manner of a mask for shielding the second displaceable members 208, 209, the legs 206, 207, and the support frame 213 (or only the second displaceable members 208, 209, for example) from the incident radiation i. With such a configuration, the SiN films that make up the lower films 221 of the displaceable members 208, 209, the legs 206, 207, and the support frame 213 are IR-absorbent, but nevertheless do not produce a decreased detection sensitivity. The IR-blocking film 230 is not necessary. As an alternative, only a portion of the IR-blocking film 230 may be provided (e.g., as noted above, for shielding only the second displaceable members 208, 209 from the incident radiation, for instance).

Also, in this embodiment, the support frame 213 can be a film of SiN that absorbs IR incident radiation. Under certain conditions, it is desirable that the support frame 213 be made of a material (e.g., Al film) that does not absorb the incident radiation and that would not produce a decrease in detection sensitivity if the IR-blocking film 230 were not formed.

Figure 69:
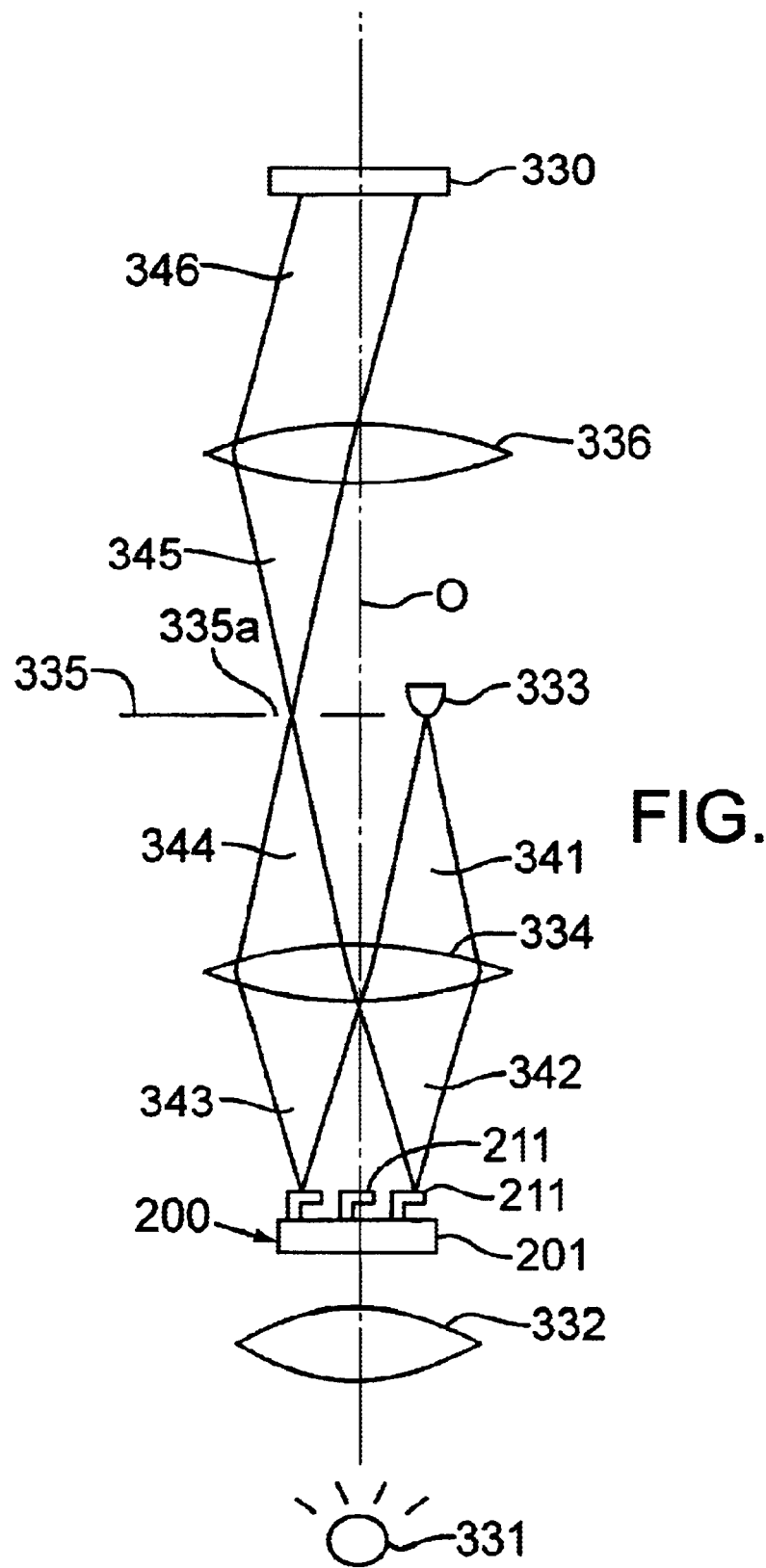
FIG. 69 is an optical diagram of an imaging device that can be used with an optical-readout type of radiation detector according to an aspect of the invention, such as any of the detectors of the seventh, eighth, and ninth representative embodiments.

An example of an imaging device utilizing a radiation detector 200 according to this embodiment is shown in FIG. 69. In FIG. 69 the radiation detector 200 is situated relative to a readout-optical system (described below), a readout-light source 333, a two-dimensional CCD 330 that serves as an image pickup means, and an imaging lens 332 that converges the incident radiation i from a source 331 serving as an observation subject (target object). The radiation detector 200 forms an image of the source 331 on a surface over which the radiation absorber 212 is distributed.

The readout-light source 333 is laser diode. The readout-optical system comprises a first lens system 334 for guiding the readout light from the source 333 to the half-mirrors 211 of the pixels of the radiation detector 200. The readout-optical system also comprises a second lens system 336 that, in cooperation with the first lens system 334, defines a conjugate location relative to the half-mirrors 211 (or reflectors 210) of each of the pixels and guides the readout-light flux to the conjugate location. The light-receiving plane of the CCD 330 is situated at the conjugate location.

The source 333 is disposed to one side (on the right in FIG. 69) of the optical axis O of the first lens system 334, and directs the readout light to propagate through the corresponding laterally displaced region. In the depicted embodiment the source 333 is disposed near the focal plane of the first lens system 334 situated between the first and second lens systems. The readout light passing through the first lens system 334 irradiates the half-mirrors 211 of the pixels of the radiation detector 200 as a substantially collimated readout-light flux. In the depicted embodiment, the radiation detector 200 is situated such that the plane of the substrate 201 (oriented parallel to the plane of the film 210 serving as the reflector whenever no incident radiation is emanating from the target object 331) is perpendicular to the optical axis O. Other configurations are also possible, however.

With the readout-light system shown in FIG. 69, the readout-light flux 341 emitted from the source 333 is incident on the first lens system 334, which collimates the readout-light flux 342. The collimated readout-light flux 342 is incident at a certain angle, relative to a line normal to the substrate 201, on the half-mirrors 211 of the pixels of the radiation detector 200. The readout-light flux reflected from the reflectors 210 and the half-mirrors 211 of the pixels is emitted as interference light from the half-mirrors 211. The interference-light flux 343 passes through the first lens system 334 on the side opposite the side on which the readout-light flux 341 was incident. From the interference-light flux 343, the first lens system 334 produces a convergent-light flux 344 that converges at convergence point. Light from the convergence point is a scattered-light flux 345 that is incident on the second lens system 336. From the scattered-light flux 345 the second lens system 336 produces a collimated light flux 346 that is incident on the light-receiving surface of the CCD 330. Since the light-receiving surface of the CCD 330 and the half-mirrors 211 of the various pixels are in a conjugate relationship by the lens systems 334, 336, the images of the various half-mirrors 211 are formed at corresponding locations on the light-receiving surface of the CCD 330. Thus, an optical image comprising a distribution of individual images of the respective half-mirrors 211 of the pixels is formed.

Meanwhile, radiation i from the source 331 is converged by the imaging lens 332 to form an "image" of the distribution of radiation from the source 331 on the surface of the detector 200 over which the radiation absorber 212 is distributed. This causes the radiation i to be incident on the respective radiation absorbers 212 of the pixels of the radiation detector 200. At each pixel, the respective incident rays are "converted" into a corresponding gap between the respective half-mirror 211 and the respective reflector 210. Thus, the intensity of the interference light emitted from the respective half-mirror 211 of each pixel is changed according to the amount of incident radiation received by the pixel. Hence, of the overall optical image formed on the CCD 330, the amount of light in the respective image portion contributed by the half-mirror 211 of each pixel varies according to the amount of radiation i incident to the respective pixel.

Therefore, the optical image produced by readout light as formed on the light-receiving surface of the CCD 330 represents an image of the radiation incident on the radiation detector 200. This optical image is captured by the CCD 330. As an alternative to using the CCD 330, this optical image can be observed directly using an ocular lens or the like.

The readout-light system described above is exemplary of various readout systems that could be used. Hence, the embodiment shown in FIG. 69 is not intended to be limiting in any way.

This embodiment of a radiation detector was described in the context of an image sensor having multiple pixels arranged in the X-axis and Y-axis directions (i.e., arranged as a two-dimensional image sensor). However, it will be understood that the pixels can be arranged in only one dimension. Further alternatively, the radiation detector 200 can have as few as one pixel. In the latter instance, a photodetector having only one light-receiving element can be used instead of the two-dimensional CCD 330, thereby providing a so-called "point sensor" for the incident radiation.

Figure 70:
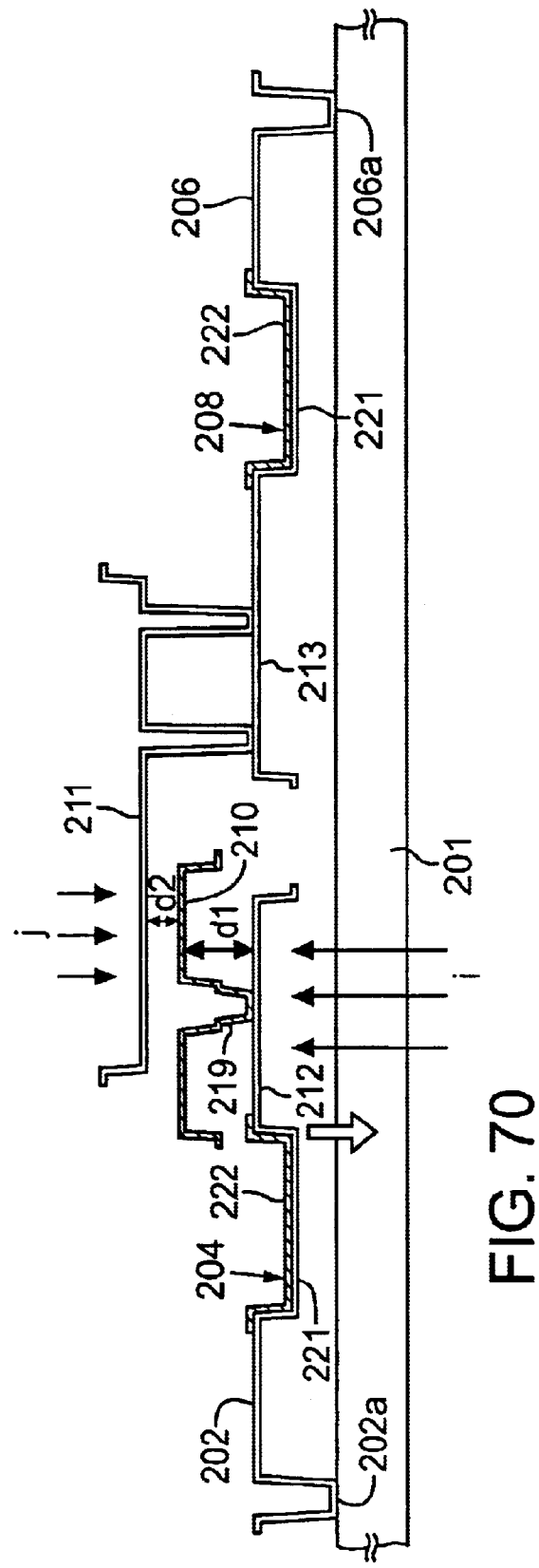
FIG. 70 is an elevational section (similar to FIG. 68) of an alternative configuration of the seventh representative embodiment.

In this representative embodiment, the reflector 210 is affixed to the free end of the first displaceable member 204, and the radiation absorber 212 depended "downward" from the reflector 210. Alternatively, as shown in FIG. 70, the radiation absorber 212 can be affixed to the free end of the first displaceable member 204, and the reflector 210 placed on "top" of the radiation absorber 212.

Eighth Representative Embodiment

Figure 71:
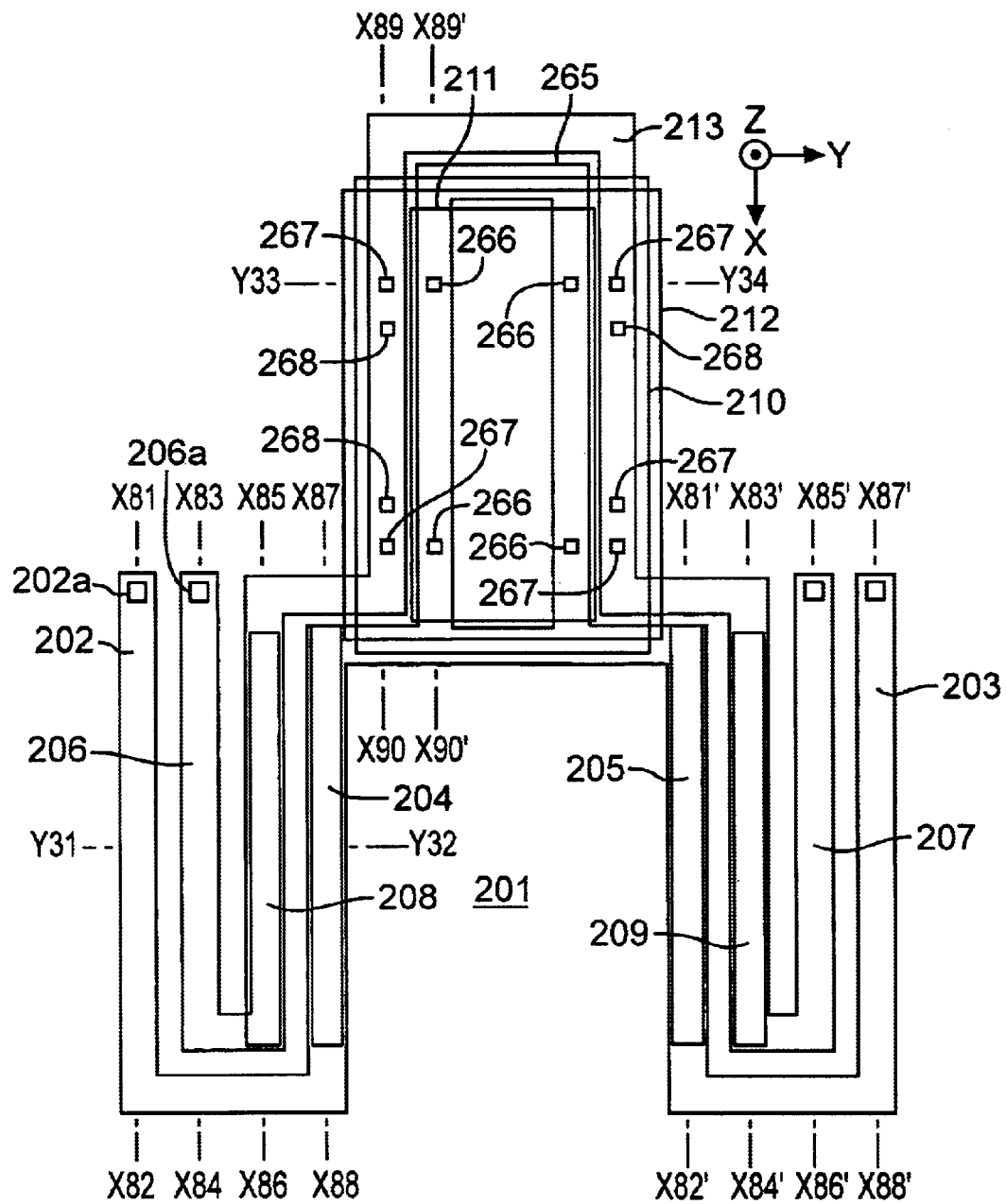
FIG. 71 is a schematic plan view of a unit pixel of an eighth representative embodiment of a radiation detector according to the invention.

FIG. 71 is a schematic plan view of a unit "pixel" of a radiation detector according to this embodiment. To aid the discussion, in FIG. 71, hidden lines that otherwise would be indicated as broken lines are shown as solid lines, and lines denoting a difference in "height" (elevation from the plane of the page) have been omitted. The mutually orthogonal X-axis, Y-axis, and Z-axis referred to below are as indicated in FIG. 71.

Figure 72:
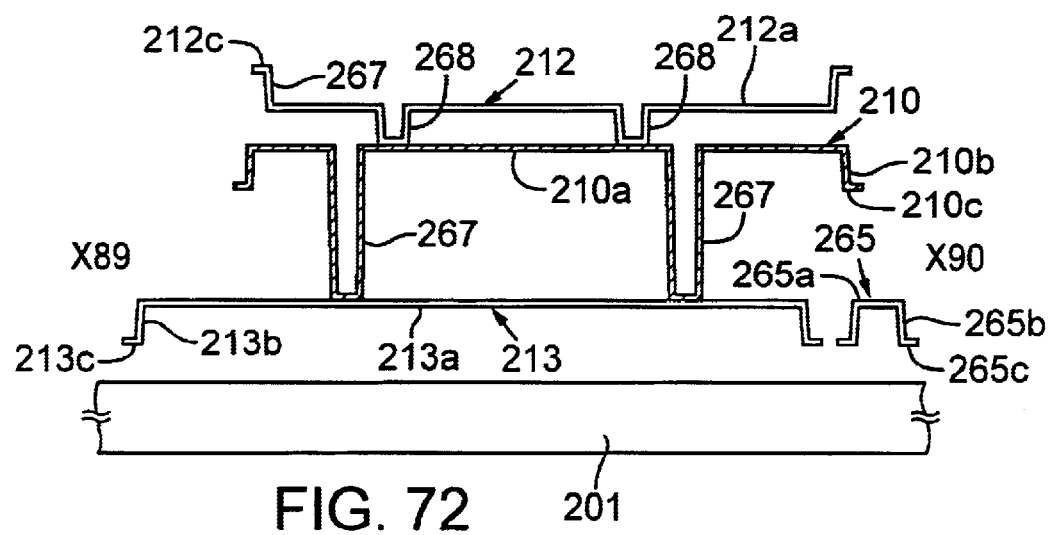
FIG. 72 is a schematic elevational section along the line X89–X90 of FIG. 71.
Figure 73:
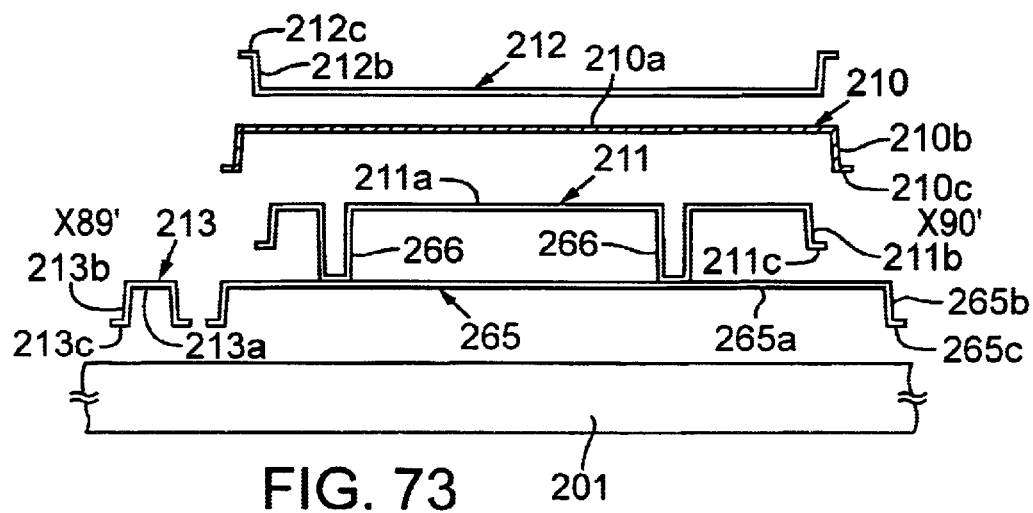
FIG. 73 is a schematic elevational section along the line X89'–X90' of FIG. 71.
Figure 74:
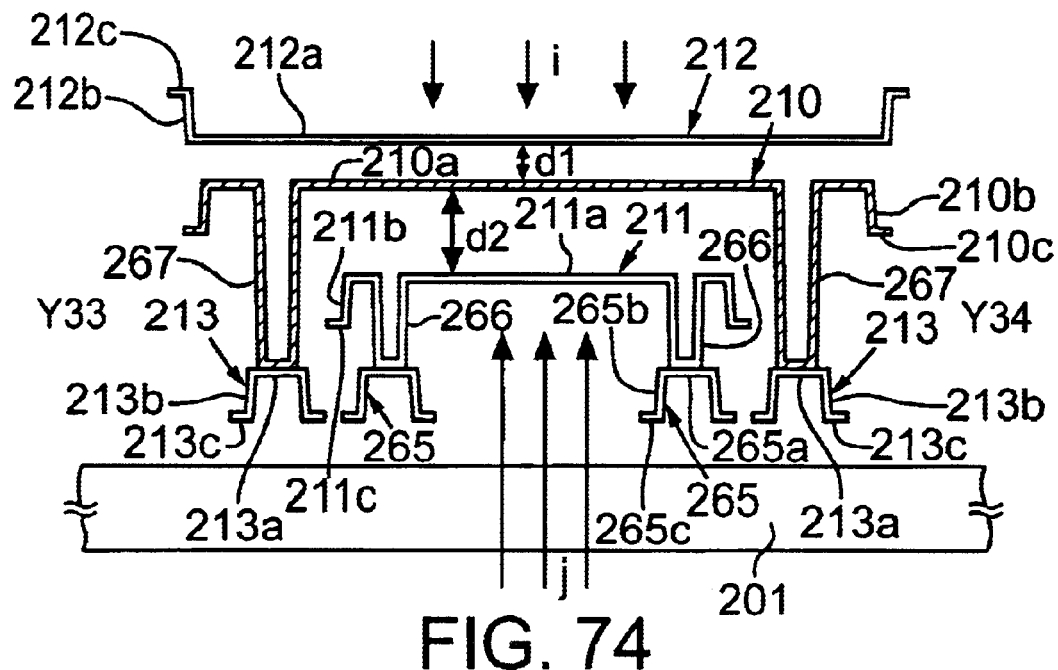
FIG. 74 is a schematic elevational section along the line Y33–Y34 of FIG. 71.

FIG. 72 is a schematic elevational section along the line X89–X90 in FIG. 71. FIG. 73 is a schematic elevational section along the line X89'–X90' in FIG. 71, and FIG. 74 is a schematic elevational section along the line Y33–Y34 in FIG. 71. In these figures, components that are the same as corresponding components described in the sixth representative embodiment have the same respective reference numerals and are not described further.

Although not illustrated in respective figures, and with respect to FIG. 71, a schematic elevational section along the line X81–X82 line would be similar to FIG. 60, a schematic elevational section along the line X83–X84 would be similar to FIG. 61, a schematic elevational section along the line X85–X86 would be similar to FIG. 62, a schematic elevational section along the line X87–X88 would be similar to FIG. 63, a schematic elevational section along the line X81'–X82' would be similar to FIG. 63, a schematic elevational section along the line X83'–X84' would be similar to FIG. 62, a schematic elevational section along the line X85'–X86' would be similar to FIG. 61, a schematic elevational section along the line X87'–X88' would be similar to FIG. 60, and a schematic elevational section along the line Y31–Y32 would be similar to FIG. 66.

The main difference between this embodiment and the seventh representative embodiment is that, in the seventh representative embodiment, the radiation absorber 212, the reflector 210, and the half-mirror 211 were provided in the stated order, up from the substrate 201. In the eighth representative embodiment, in contrast, the half-mirror 211, the reflector 210, and the radiation absorber 212 are provided in a reversed order, up from the substrate 201. Furthermore, in this embodiment, the substrate 201 is made of glass or other material that transmits readout light j. Thus, the substrate 201 is irradiated with the readout light j from below, and the radiation i to be detected is incident from above.

In this embodiment, a support frame 265 is formed as a continuous extension of the respective lower SiN films 221 of the displaceable members 204, 205 from the free ends of the displaceable members 204, 205. The support frame 265 has a substantially square profile around the inside of the support frame 213. The support frame 265 comprises a planar portion 265a, side portions 265b, and optional edge portions 265c.

The half-mirror 211 is configured such that the planar portion 211a is affixed at four places to the planar portion 265a of the support frame 265 via connecting posts 266. As a result the half-mirror 211 is affixed to the free ends of the displaceable members 204, 205 (i.e., the ends opposite the ends connected to the legs 202, 203) via the support frame 265. The connecting posts 266 are formed as respective extensions of the silicon oxide film of the half-mirror 211.

The reflector 210 is configured such that the planar portion 210a is affixed at four places to the planar portion 213a of the support frame 213 via connecting posts 267. As a result, the half-mirror 211 is affixed to the free ends of the displaceable members 208, 209 (i.e., the ends opposite the ends connected to the legs 206, 207) via the support frame 213. The connecting posts 267 are formed as extensions of the aluminum film of the reflector 210.

The radiation absorber 212 is configured such that the planar portion 212a is affixed at four places to the planar portion 210a of the reflector 210 via connecting posts 268.

This embodiment provides the same advantages as the seventh representative embodiment. Moreover, in the eighth representative embodiment, the respective surface areas of the radiation absorber 212 and the reflector 210 can be increased without these components obstructing or striking other components. Consequently, the numerical aperture of the detector can be increased substantially with respect to incident radiation. (For convenience, the respective surface areas of the radiation absorber 212 and the reflector 210 are not depicted as being increased substantially in FIGS. 71–74.)

This embodiment can be modified in manners similar to the modifications described above with respect to the seventh representative embodiment.

Ninth Representative Embodiment

Figure 75:
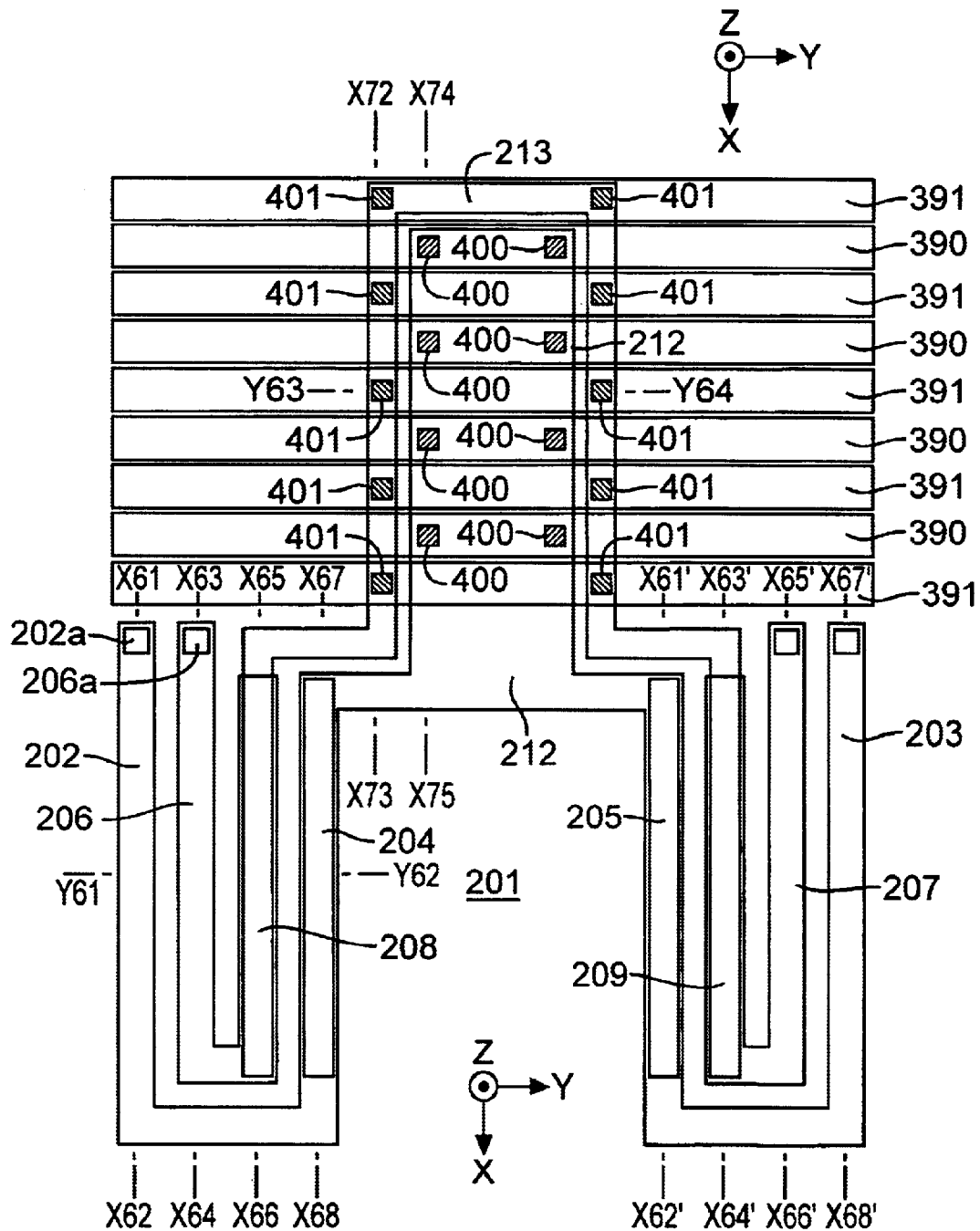
FIG. 75 is a schematic plan view of a unit pixel of a ninth representative embodiment of a radiation detector according to the invention.

FIG. 75 is a schematic plan view showing a unit "pixel" of a radiation detector 400 according to this embodiment. To aid the discussion, in FIG. 75, hidden lines that otherwise would be indicated as broken lines are shown as solid lines, and lines denoting a difference in "height" (elevation from the plane of the page) have been omitted. The mutually orthogonal X-axis, Y-axis, and Z-axis referred to below are as indicated in FIG. 75. In this embodiment, components that are similar to corresponding components in the seventh representative embodiment have the same respective reference numerals and are not described further.

Figure 83:
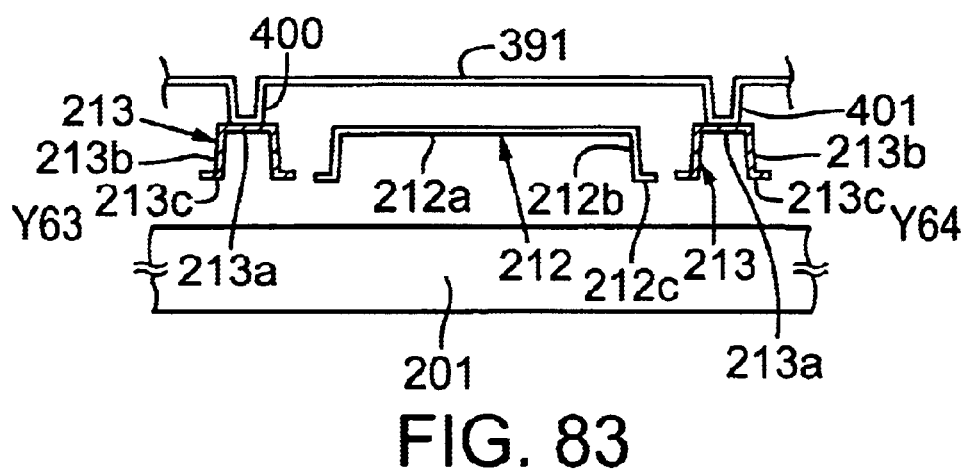
FIG. 83 is a schematic elevational section along the line Y63–Y64 of FIG. 75.
Figure 76:
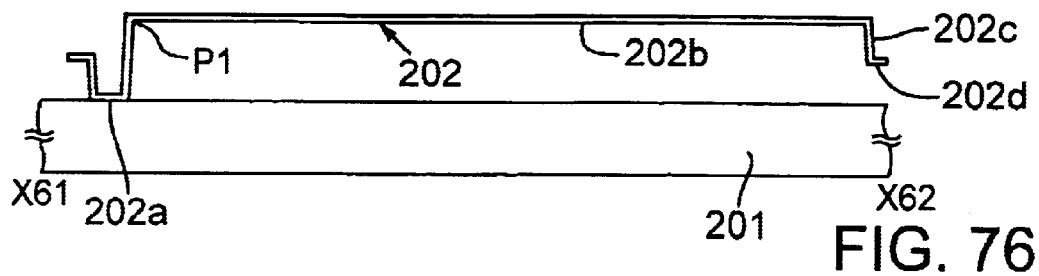
FIG. 76 is a schematic elevational section along the line X61–X62 of FIG. 75.
Figure 77:
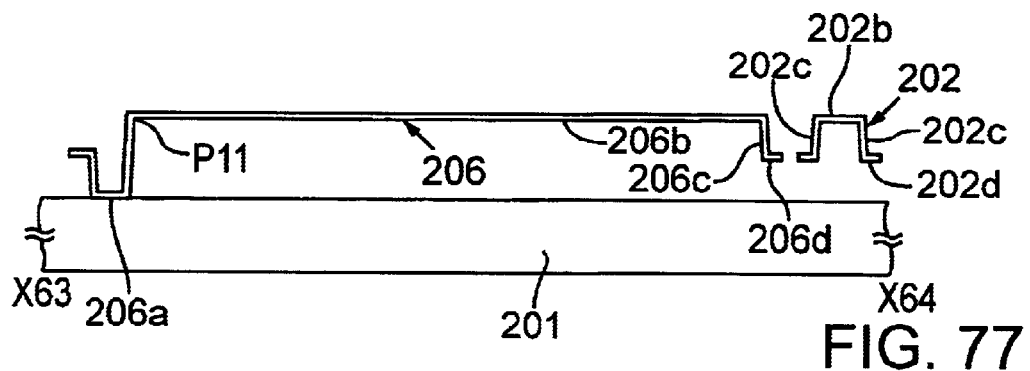
FIG. 77 is a schematic elevational section along the line X63–X64 of FIG. 75.
Figure 78:
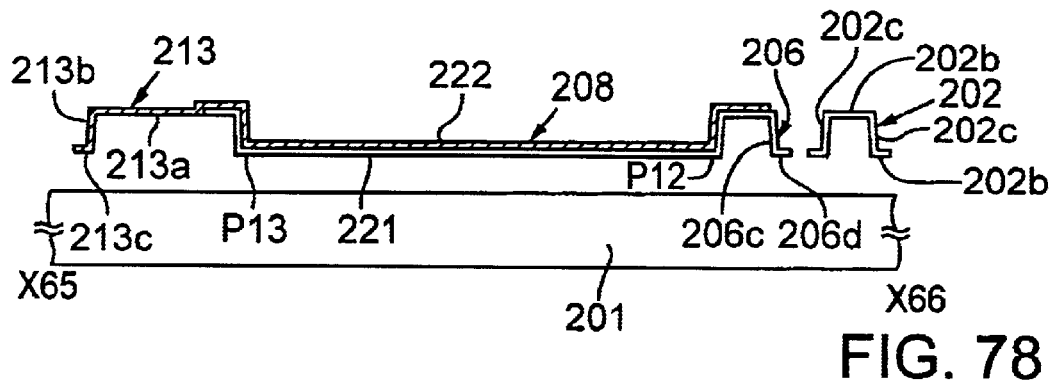
FIG. 78 is a schematic elevational section along the line X65–X66 of FIG. 75.
Figure 79:
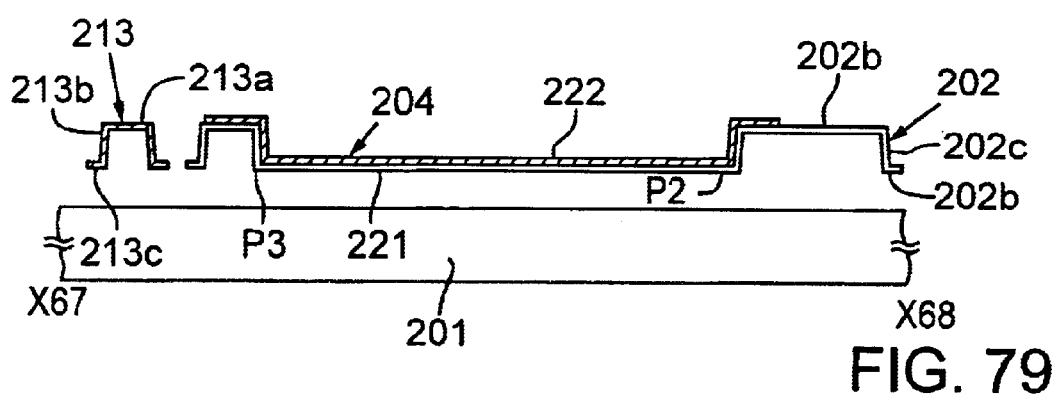
FIG. 79 is a schematic elevational section along the line X67–X68 of FIG. 75.
Figure 80:
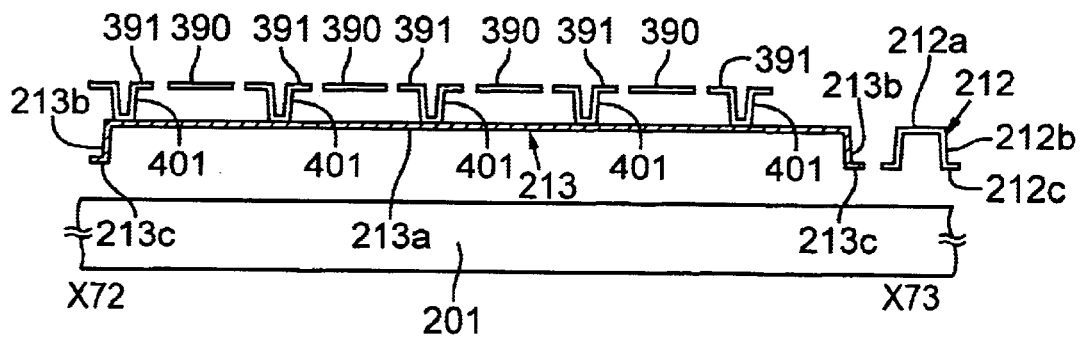
FIG. 80 is a schematic elevational section along the line X72–X73 of FIG. 75.
Figure 81:
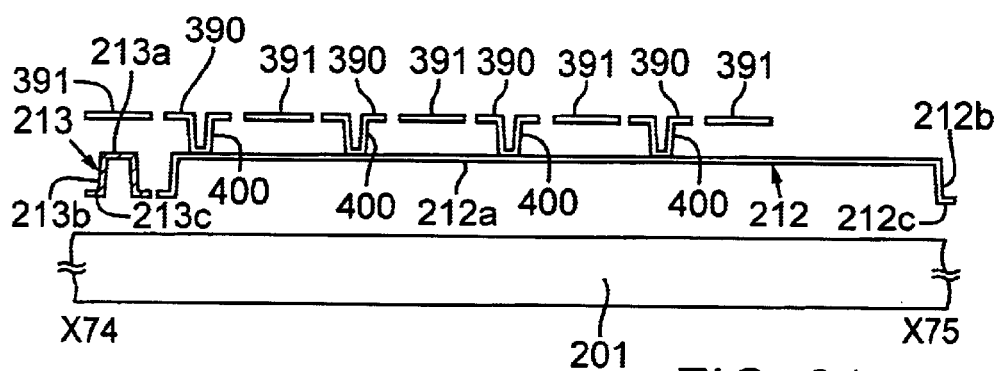
FIG. 81 is a schematic elevational section along the line X74–X75 of FIG. 75.
Figure 82:
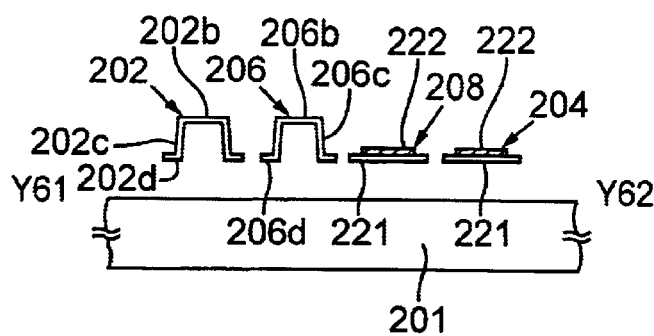
FIG. 82 is a schematic elevational section along the line Y61–Y62 of FIG. 75.

FIG. 76 is a schematic elevational section along the line X61–X62 in FIG. 75. FIG. 77 is a schematic elevational section along the line X63–X64 in FIG. 75. FIG. 78 is a schematic elevational section along the line X65–X66 in FIG. 75. FIG. 79 is a schematic elevational section along the line X67–X68 in FIG. 75. FIG. 80 is a schematic elevational section along the line X72–X73 in FIG. 75. FIG. 81 is a schematic elevational section along the line X74–X75 in FIG. 75. FIG. 82 is a schematic elevational section along the line Y61–Y62 in FIG. 75. FIG. 83 is a schematic elevational section along the line Y63–Y64 in FIG. 40. Although not illustrated in these figures, and with respect to FIG. 75, a schematic elevational section along the line X61'–X62' in FIG. 75 would be similar to FIG. 79, a schematic elevational section along the line X63'–X64' in FIG. 75 would be similar to FIG. 78, a schematic elevational section along the line X65'–X66' in FIG. 75 would be similar to FIG. 77, and a schematic elevational section along the line X67'–X68' in FIG. 75 would be similar to FIG. 76.

In this embodiment, the radiation absorber 212 is configured as an extension of the lower SiN films 221 of the displaceable members 204, 205. A portion of the radiation absorber 212 is fixed with respect to the free ends of the displaceable members 204, 205, thereby supporting the radiation absorber 212 in a manner by which it extends over the substrate 201. The support frame 213 is configured as an extension not of the SiN films but rather of the upper aluminum films 222 of the displaceable members 208, 209 from the respective free ends of the displaceable members 208, 209. The support frame 213 has a substantially U-shape and extends around the periphery of the radiation absorber 212.

Instead of the reflector 210 and half-mirror 211 in the seventh representative embodiment, this ninth representative embodiment comprises multiple band-shaped first reflectors 390 and multiple band-shaped second reflectors 391. The first reflectors 390 are affixed to the planar portion 212a of the radiation absorber 212 via connecting posts 400 formed as respective extensions of the aluminum films that make up the first reflectors 390. Similarly, the second reflectors 391 are affixed to the planar portion 213a of the support frame 213 via connecting posts 401 formed as respective extensions of the aluminum films that make up the second reflectors 391. The first reflectors 390 are all disposed within the same respective X-Y plane, and the second reflectors 391 are all disposed within the same respective X-Y plane. (In this embodiment the first reflectors 390 and the second reflectors 391 are disposed substantially in the same X-Y plane.) The first reflectors 390 and the second reflectors 391 extend in the Y-axis direction. As a result of this configuration, the first reflectors 390 and the second reflectors 391 collectively constitute a reflection-type diffraction grating. The amount of reflected and diffracted readout light j, incident from above (e.g., diffracted light of the +1 diffraction order), varies according to the height differential between the first reflectors 390 and the second reflectors 391.

The first and second reflectors 390, 391, respectively, double as reflectors for reflecting substantially all of the incident radiation i. The radiation absorber 212 and the reflectors 390, 391 constitute an optical cavity structure.

Whenever no radiation i to be detected is incident from the target object, the first reflectors 390 remain parallel to the second reflectors 391, and all the reflectors 390, 391 are at a constant height relative to the substrate 201. Whenever radiation i from the target object is incident to the detector, the first reflectors 390 tilt according to the amount of incident radiation, accompanied by a corresponding change in the amount of diffracted light of the +1 diffraction order, for example.

The radiation detector of this embodiment can be used, for example, instead of the radiation detector 200 in the imaging device shown in FIG. 69. In such an instance, a light-flux limiter 335 can be positioned near the point of convergence of the light flux 344. The light flux limiter 335 is defined, for example, as an aperture 335a configured so as to selectively transmit only the diffracted light of the +1 diffraction order, for example, out of all the orders of diffracted light reflected by the reflectors 390, 391 when irradiated with readout light j. The light-flux limiter 335 does not limit the light of the +1 diffraction order in any way. Thus, the optical image produced from the readout light as formed on the light-receiving surface of the CCD 330 is representative of the incident infrared image.

The orientation of the first reflectors 390 and of the second reflectors 391 may be shifted by 90° (from the orientation shown in FIG. 75) so that the first reflectors 390 and the second reflectors 391 extend in the X-axis direction and arranged alternatingly in the Y-axis direction.

With this as well as other embodiments described herein, even under conditions in which temperature is not strictly controlled, changes in the relative positional relationship between the two optically effecting elements caused by a temperature change are suppressed better than conventionally. This allows radiation to be detected more accurately and precisely.

Whereas the invention has been described in connection with multiple representative embodiments, it will be understood that the invention is not limited to those embodiments.

On the contrary, the invention is intended to encompass all modifications, alternatives, and equivalents as may be included within the spirit and scope of the invention, as defined by the appended claims.

What is claimed is:

1. A radiation detector including a substrate on which at least one unit pixel is formed, the unit pixel comprising:
   first and second displaceable members attached to the substrate and having similar respective thermally bimorphous structures;
   a first effecting element attached to the first displaceable member and a second effecting element attached to the second displaceable member such that at least a portion of the second effecting element faces the first effecting element;
   a radiation absorber configured to absorb incident radiation to be detected, the radiation absorber being thermally coupled to the first displaceable member but substantially not to the second displaceable member so as to enable the radiation absorber, when heated by absorption of incident radiation, to transfer heat to the first displaceable member but substantially not to the second displaceable member;
   each of the first and second displaceable members including at least a first and a second layer laminated together in a stacking direction normal to the substrate to form the respective thermally bimorphous structure, the first and second layers being formed of respective first and second materials having different respective coefficients of thermal expansion so as to cause a displaceable member to exhibit a bending response when heated, the bending response in one displaceable member but substantially not in the other displaceable member resulting in a change in a gap distance between the first and second effecting elements, wherein the change in gap produces a measurable corresponding change in an effecting parameter; and
   the first and second displaceable members being disposed so as not to overlap each other when viewed in the stacking direction.

2. The radiation detector of claim 1, wherein the first and second effecting elements are first and second electrodes, respectively.

3. The radiation detector of claim 2, wherein the first and second electrodes are configured to allow an electrical capacitance to be measured between the first and second electrodes, the electrical capacitance exhibiting a change with a respective change in the gap distance.

4. The radiation detector of claim 1, wherein the first and second effecting elements are first and second optically effecting elements, respectively.

5. The radiation detector of claim 4, wherein the first and second optically effecting elements are configured as a reflector and half-mirror, respectively, of a readout light.

6. The radiation detector of claim 1, wherein the first and second displaceable members are situated relative to each other such that the first and second layers of each of the first and second displaceable members are formable simultaneously during respective fabrication steps.

7. The radiation detector of claim 1, wherein the radiation absorber is absorptive to infrared radiation.

8. The radiation detector of claim 1, wherein the second displaceable member is disposed substantially parallel to the first displaceable member.

9. A radiation detector including a substrate on which at least one unit pixel is formed, the unit pixel comprising:
   first and second displaceable members attached to the substrate and having similar respective thermally bimorphous structures;
   a first electrode attached to the first displaceable member and a second electrode attached to the second displaceable member such that at least a portion of the second electrode faces the first electrode;
   a radiation absorber configured to absorb incident radiation to be detected, the radiation absorber being thermally coupled to the first displaceable member but substantially not to the second displaceable member so as to enable the radiation absorber, when heated by absorption of incident radiation, to transfer heat to the first displaceable member but substantially not to the second displaceable member;
   each of the first and second displaceable members including at least a first and a second layer laminated together in a stacking direction normal to the substrate to form the respective thermally bimorphous structure, the first and second layers being formed of respective first and second materials having different respective coefficients of thermal expansion so as to cause a displaceable member to exhibit a bending response when heated, the bending response in one displaceable member but substantially not in the other resulting in a change in a gap distance between the first and second electrodes, wherein the change in gap produces a measurable corresponding change in an electrical parameter of the first and second electrodes; and
   the first and second displaceable members being disposed so as not to overlap each other when viewed in the stacking direction.

10. The radiation detector of claim 9, wherein the first and second electrodes are configured to allow an electrical capacitance to be measured between the first and second electrodes, the electrical capacitance exhibiting a change with a respective change in the gap distance.

11. The radiation detector of claim 9, wherein the first and second displaceable members are situated relative to each other such that the first and second layers of each of the first and second displaceable members are formable simultaneously during respective fabrication steps.

12. The radiation detector of claim 9, wherein the first and second displaceable members are situated parallel to each other.

13. The radiation detector of claim 9, further comprising a radiation reflector, wherein:
   the radiation absorber reflects a portion of radiation incident to it; and
   the radiation reflector is situated relative to the radiation absorber to define a gap of substantially $n\lambda_0/4$ between the radiation absorber and the radiation reflector, wherein n is an odd integer and $\lambda_0$ is the center wavelength of a wavelength band of radiation detectable by the radiation detector.

14. The radiation detector of claim 13, wherein:
   the radiation reflector is one of the first and second electrodes; and
   the radiation absorber is situated in the stacking direction relative to the first and second electrodes.

15. The radiation detector of claim 14, wherein:
   the first and second electrodes and the radiation absorber are aligned with each other and arranged in the stacking direction in an order of (a) radiation absorber, first electrode, then second electrode, or (b) radiation absorber, second electrode, then first electrode; and the first displaceable member, when heated, exhibits a bending response that that displaces the second electrode away from the first electrode.

16. The radiation detector of claim 9, wherein:
the first electrode comprises a planar portion and a side portion, the planar portion having a periphery and the side portion extending at least partially around the periphery, the side portion projecting from the planar portion away from the second electrode; and
the second electrode comprises a planar portion and a side portion, the planar portion having a periphery and the side portion extending at least partially around the periphery, the side portion extending from the planar portion away from the first electrode.

17. The radiation detector of claim 9, wherein one of the first and second electrodes is affixed via a support frame to the respective first or second displaceable member, the support frame being made of a thermally insulative material and comprising a planar portion having a periphery, the side portion being configured to extend from the planar portion along at least a portion of the periphery.

18. The radiation detector of claim 9, further comprising an electrically insulative film situated between the first electrode and the second electrode.

19. The radiation detector of claim 9, further comprising first and second legs, wherein the first displaceable member is mounted to the substrate via the first leg, and the second displaceable member is mounted to the substrate via the second leg.

20. The radiation detector of claim 19, wherein:
each leg has a respective length direction, start point, and end point; and
with respect to the first leg, a distance along the respective length direction from the respective start point to the respective end point is substantially equal to, with respect to the second leg, a distance along the respective length direction from the respective start point to the respective end point.

21. The radiation detector of claim 20, wherein:
the end point of the first leg is located in the first displaceable member; and
the end point of the second leg is located in the second displaceable member.

22. The radiation detector of claim 19, wherein:
each leg has a respective length direction, start point, and end point; and
with respect to the second leg, a distance along the respective length direction from the respective start point to the respective end point is shorter than, with respect to the first leg, a distance along the respective length direction from the respective start point to the respective end point.

23. The radiation detector of claim 22, wherein the second leg has zero length, along the length direction, between the start point and the end point.

24. The radiation detector of claim 19, wherein the first and second legs, the first and second displaceable members, the first and second electrodes, and the radiation absorber are disposed in the stacking direction with respective intervening spaces therebetween.

25. The radiation detector of claim 9, wherein:
each of the first and second displaceable members has a width direction, a respective start point, and a respective end point; and
the start point of the first displaceable member and the start point of the second displaceable member have substantially identical positions when viewed from the width direction of the first and second displaceable members.

26. The radiation detector of claim 9, wherein:
each of the first and second displaceable members has a width direction, a respective start point, and a respective end point; and
the start point of the first displaceable member and the start point of the second displaceable member are shifted relative to each other to form a gap between the first and second displaceable members, the gap being narrowed when viewed from the width direction of the first and second displaceable members.

27. A radiation detector including a substrate on which at least one unit pixel is formed, the unit pixel comprising:
first and second displaceable members attached to the substrate and having similar respective thermally bimorphous structures;
a first electrode attached to the first displaceable member and a second electrode attached to the second displaceable member such that at least a portion of the second electrode faces the first electrode;
a radiation absorber configured to absorb incident radiation to be detected, the radiation absorber being thermally coupled to the first displaceable member but substantially not to the second displaceable member so as to enable the radiation absorber, when heated by absorption of incident radiation, to transfer heat to the first displaceable member but not to the second displaceable member;
each of the first and second displaceable members including at least a first and a second layer laminated together in a stacking direction perpendicular to the substrate to form the respective thermally bimorphous structure, the first and second layers being formed of respective first and second materials having different respective coefficients of thermal expansion so as to cause a respective displaceable member to exhibit a bending response when heated, the bending response causing a change in a gap distance between the first and second electrodes;
the first and second electrodes being configured to allow an electrical capacitance to be measured between the first and second electrodes, the electrical capacitance exhibiting a change with a respective change in the gap distance; and
the first and second displaceable members being situated relative to each other without mutual overlap when viewed from a direction normal to the substrate.

28. A radiation detector including a substrate on which at least one unit pixel is formed, the unit pixel comprising:
first and second displaceable members attached to the substrate;
a first optically effecting element attached to the first displaceable member and a second optically effecting element attached to the second displaceable member such that the second optically effecting element is substantially parallel to the first optically effecting element, the first and second optically effecting elements collectively receiving a readout light;
a radiation absorber configured to absorb incident radiation to be detected, the radiation absorber being thermally coupled to the first displaceable member but substantially not to the second displaceable member so as to enable the radiation absorber, when heated by absorption of incident radiation, to transfer heat to the first displaceable member but substantially not to the second displaceable member; and each of the first and second displaceable members having similar respective structures each including at least a first and a second layer laminated together in a stacking direction normal to the substrate to form a respective thermally bimorphous structure, the first and second layers being formed of respective first and second materials having different respective coefficients of thermal expansion so as to cause a displaceable member to exhibit a bending response when heated; wherein the bending response in one displaceable member but substantially not in the other displaceable member results in a change in a gap distance between the first and second optically effecting elements;

the first and second optically effecting components collectively impart a change to the readout light corresponding to the change in the gap distance and emit the changed readout light; and the first and second displaceable members are disposed so as not to overlap each other when viewed in the stacking direction.

29. The radiation detector of claim 28, wherein the radiation absorber comprises a reflector for reflecting at least part of the incident radiation, the reflector being separated from the radiation absorber by a gap of substantially $n\lambda_0/4$, where n is an odd number and $\lambda_0$ is a median wavelength of a desired wavelength band of the incident radiation.

30. The radiation detector of claim 29, wherein the reflector reflects substantially all of the incident radiation.

31. The radiation detector of claim 29, wherein:

the radiation reflector is at least one of the first and second optically effecting elements; and the radiation absorber is disposed in the stacking direction relative to at least one of the first and second optically effecting elements.

32. The radiation detector of claim 28, wherein:

at least one of the first and second optically effecting elements is fixed with respect to the respective displaceable member via a support frame; and the support frame comprises a planar portion and a side portion extending peripherally along at least part of the planar portion.

33. The radiation detector of claim 28, further comprising first and second legs, wherein:

the first displaceable member is mounted to the substrate by the first leg having a first end, a second end, and a length between the first and second ends; and the second displaceable member is mounted to the substrate by the second leg having a first end, a second end, and a length between the first and second ends.

34. The radiation detector of claim 33, wherein a distance along the length of the first leg between the respective first and second ends of the first leg is substantially equal to the length of the second leg between the respective first and second ends.

35. The radiation detector of claim 33, wherein the length of the second leg is shorter than the length of the first leg, or is substantially zero length.

36. The radiation detector of claim 33, wherein:

each of the first and second displaceable members has a respective length between respective first and second ends; and the length of the first displaceable member is substantially equal to the length of the second displaceable member.

37. The radiation detector of claim 36, wherein when viewed in a width direction of the first and second displaceable members, the first end of the first displaceable member is at substantially the same location as the first end of the second displaceable member.

38. The radiation detector of claim 28, wherein:

the first displaceable member is mounted to the substrate by a first leg;

the second displaceable member is mounted to the substrate by a second leg; and the first and second legs, the first and second displaceable members, and the first and second optically effecting elements are each disposed with respective spaces therebetween in the stacking direction.

39. The radiation detector of claim 28, wherein:

at least one of the first and second optically effecting elements is a reflector;

the other of the first and second optically effecting elements faces the reflector and is configured as a half-mirror that reflects only part of the received readout light; and the reflector and the half-mirror reflect the received readout light as an interference light.

40. The radiation detector of claim 28, wherein:

the first optically effecting element is a first reflector;

the second optically effecting element is a second reflector; and the first and second reflectors substantially constitute a reflection-type diffraction grating for reflecting the received readout light as diffracted light.

41. In combination:

a radiation detector as recited in claim 28; and a readout-light optical system situated and configured to direct a readout light to the radiation detector and to detect readout light reflected from the radiation detector.

42. In a method for fabricating, on a substrate, a radiation detector including at least one unit pixel, the method comprising for each pixel of the detector:

in a first layer-forming step, forming a first layer, of a first material having a respective coefficient of thermal expansion, of each of first and second displaceable members;

in a second layer-forming step, forming a second layer, of a second material having a respective coefficient of thermal expansion that is different from the coefficient of thermal expansion of the first material, of each of the first and second displaceable members to form respective thermally bimorphous structures in which the respective first and second layers are laminated together;

forming a first effecting element attached to the first displaceable member;

forming a second effecting element attached to the second displaceable member such that at least respective portions of each of the first and second effecting elements face each other in a stacking direction with a space therebetween, and such that an effecting parameter can be measured between the first and second effecting elements; and forming a radiation absorber in a manner and location such that the radiation absorber is thermally coupled to the first displaceable member but substantially not to the second displaceable member, the radiation absorber being formed of a material that absorbs incident radiation that causes heating of the radiation absorber with resultant conduction of the heat to the first displaceable member.

43. The method of claim 42, wherein the first and second effecting elements are formed as first and second electrodes, respectively.

44. The method of claim 43, further comprising the step, between forming the first and second electrodes, of forming an electrically insulative layer configured to be situated between the first and second electrodes.

45. The method of claim 42, wherein the first and second effecting elements are formed as first and second optically effecting elements, respectively.

46. The method of claim 42, wherein the first effecting element, second effecting element, and radiation absorber are formed in an order, from the substrate in a stacking direction, of first effecting element, second effecting element, and radiation absorber.

47. The method of claim 42, wherein the first effecting element, second effecting element, and radiation absorber are formed in an order, from the substrate in a stacking direction, of second effecting element, first effecting element, and radiation absorber.

48. The method of claim 42, wherein the first effecting element, second effecting element, and radiation absorber are formed in an order, from the substrate in a stacking direction, of radiation absorber, first effecting element, and second effecting element.

49. The method of claim 42, wherein the first effecting element, second effecting element, and radiation absorber are formed in an order, from the substrate in a stacking direction, of radiation absorber, second effecting element, and first effecting element.

50. The method of claim 42, wherein the first and second displaceable members are formed parallel to each other.

51. The method of claim 42, further comprising the steps of:

forming a first leg attaching the first displaceable member to the substrate; and forming a second leg attaching the second displaceable member to the substrate.

52. The method of claim 42, further comprising the step of forming each of the first effecting element, the second effecting element, and the radiation absorber with a respective planar portion extending parallel to the substrate and having a respective periphery, and a respective side portion extending along at least a portion of the respective periphery.

* * * * *

UNITED STATES PATENT AND TRADEMARK OFFICE
CERTIFICATE OF CORRECTION

PATENT NO.    : 6,828,557 B2
DATED         : December 7, 2004
INVENTOR(S)   : Ishizuya et al.

It is certified that error appears in the above-identified patent and that said Letters Patent is hereby corrected as shown below:

Column 19,
Lines 47 and 48, "capacitance's" should be -- capacitances--.
Line 66, "51 a are " should be -- 51 a are --.

Column 26,
Line 33, "to as to" should be -- so as to --.

Column 28,
Line 22, "151 a are" should be -- 151a are --.
Lines 57-58, "connectors 80-83 are formed in the polyimide film 157." should read -- connectors 80-83.--.

Coulmn 40,
Lines 56-57, "and arranged" should read -- and are arranged --.

Column 43,
Line 2, "that that displaces" should read -- that displaces --.

Signed and Sealed this

Twenty-sixth Day of April, 2005

JON W. DUDAS
*Director of the United States Patent and Trademark Office*